(12) United States Patent
Fukutomi et al.

(10) Patent No.: US 9,666,109 B2
(45) Date of Patent: May 30, 2017

(54) PROJECTOR

(71) Applicant: JVC KENWOOD Corporation, Yokohama-shi (JP)

(72) Inventors: Hironobu Fukutomi, Yokosuka (JP); Katsumi Watanuki, Machida (JP); Takayuki Sugahara, Yokosuka (JP); Kenji Yasui, Yokohama (JP); Ryo Nishima, Yokohama (JP); Shunichi Shichijo, Yokosuka (JP)

(73) Assignee: JVC KENWOOD Corporation, Yokohama-shi (JP)

(*) Notice: Subject to any disclaimer, the term of this patent is extended or adjusted under 35 U.S.C. 154(b) by 0 days.

(21) Appl. No.: 14/496,875

(22) Filed: Sep. 25, 2014

(65) Prior Publication Data
US 2015/0009218 A1    Jan. 8, 2015

Related U.S. Application Data

(63) Continuation of application No. PCT/JP2013/059351, filed on Mar. 28, 2013.

(30) Foreign Application Priority Data

Mar. 30, 2012  (JP) ................ 2012-083317
Mar. 30, 2012  (JP) ................ 2012-083318

(51) Int. Cl.
*G06T 17/00*        (2006.01)
*G09G 3/00*         (2006.01)
(Continued)

(52) U.S. Cl.
CPC ........... *G09G 3/003* (2013.01); *G03B 21/145* (2013.01); *G06T 3/4007* (2013.01); *G09G 5/37* (2013.01);
(Continued)

(58) Field of Classification Search
None
See application file for complete search history.

(56) References Cited

U.S. PATENT DOCUMENTS

| 7,909,470 B2 | 3/2011 | Yonezawa |
| 2005/0052376 A1 | 3/2005 | Shivji |
(Continued)

FOREIGN PATENT DOCUMENTS

| JP | H07-295097 A | 10/1995 |
| JP | 2004-086277 A | 3/2004 |
(Continued)

OTHER PUBLICATIONS

International Search Report in PCT International Application No. PCT/JP2013/059351, dated May 7, 2013.

*Primary Examiner* — Peter Hoang
(74) *Attorney, Agent, or Firm* — Venable LLP; Michael A. Sartori; Laura G. Remus

(57) ABSTRACT

A projector includes, a projecting unit that converts image data into light and projects the light at a predetermined angle of view, a projecting direction changing unit that changes the projecting direction of the projecting unit from a first projecting direction to a second projecting direction, a projection angle derivation unit that derives a projection angle between the first projecting direction and a projecting direction after changed, and an image cutting out unit that generates cut-out image data that a part of a region of an image of the inputted image data is cut out based on the angle of view and the projection angle as image data to be projected, when the projecting unit projects the image of the inputted image data stored on the storage unit across the first projecting direction and the second projecting direction.

3 Claims, 31 Drawing Sheets

(51) Int. Cl.
    *G03B 21/14*     (2006.01)
    *H04N 9/31*     (2006.01)
    *G06T 3/40*     (2006.01)
    *G09G 5/37*     (2006.01)
    G03B 21/16     (2006.01)
    G03B 21/00     (2006.01)

(52) U.S. Cl.
    CPC ......... *H04N 9/3144* (2013.01); *H04N 9/3188* (2013.01); *G03B 21/005* (2013.01); *G03B 21/16* (2013.01); *G06T 2210/36* (2013.01); *G09G 2320/10* (2013.01); *G09G 2340/0492* (2013.01)

(56) References Cited

U.S. PATENT DOCUMENTS

| | | |
|---|---|---|
| 2011/0279879 A1 | 11/2011 | Wakabayashi |
| 2012/0165077 A1 | 6/2012 | Ueno et al. |
| 2013/0155113 A1* | 6/2013 | Kotani .................... G09G 5/34 345/649 |

FOREIGN PATENT DOCUMENTS

| | | |
|---|---|---|
| JP | 2006-251182 A | 9/2006 |
| JP | 2007-503021 A | 2/2007 |
| JP | 2007-214701 A | 8/2007 |
| JP | 2011-237707 A | 11/2011 |
| JP | 2012-138686 A | 7/2012 |
| JP | 2013-020199 A | 1/2013 |

* cited by examiner

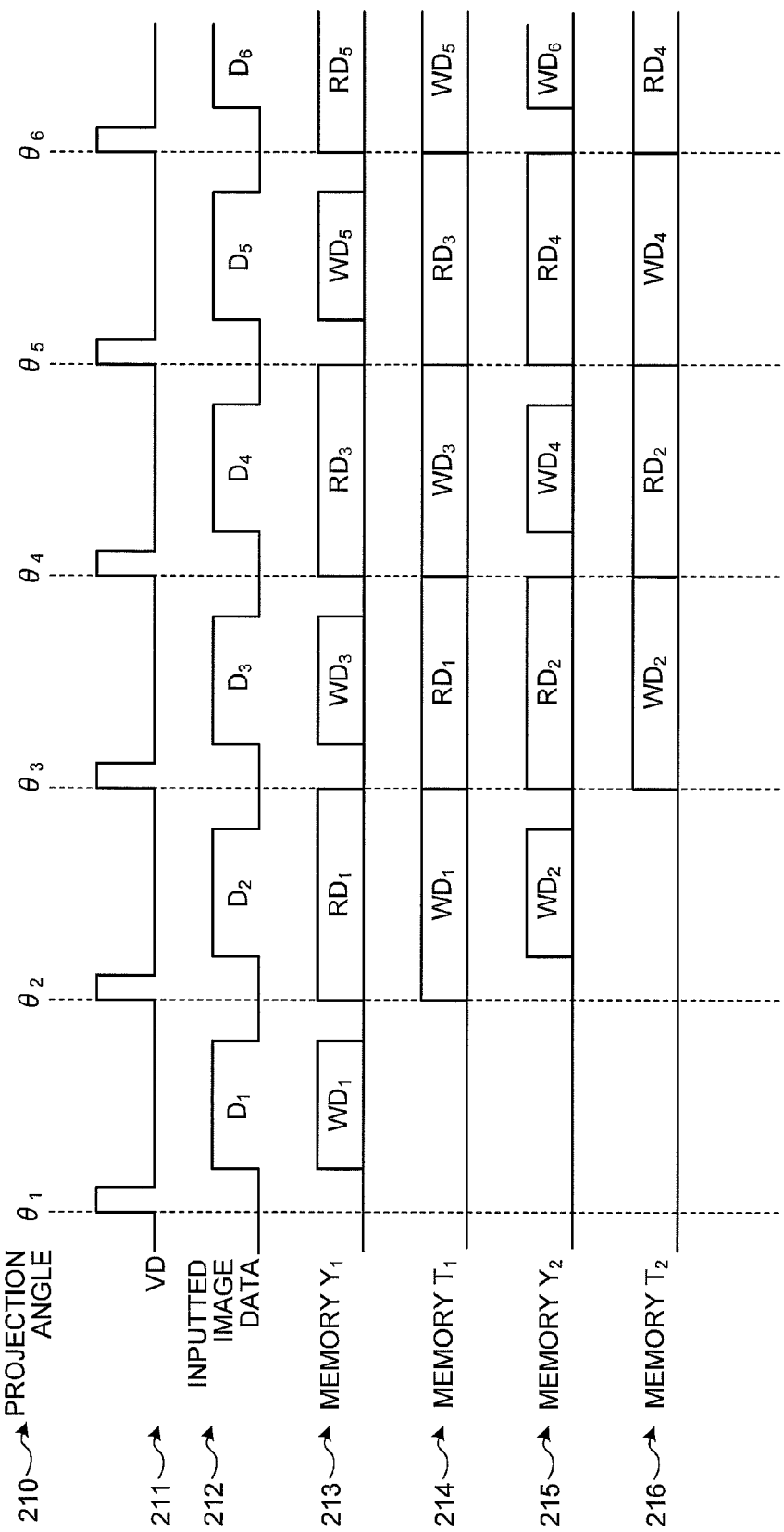

PROJECTOR

CROSS-REFERENCE TO RELATED APPLICATION(S)

This application is a continuation of International Application No. PCT/JP2013/059351, filed on Mar. 28, 2013 which claims the benefit of priority of the prior Japanese Patent Application No. 2012-083317, filed on Mar. 30, 2012 and Japanese Patent Application No. 2012-083318, filed on Mar. 30, 2012, the entire contents of which are incorporated herein by reference.

BACKGROUND OF THE INVENTION

1. Field of the Invention

The present invention relates to a projector that projects an image onto a projected medium.

2. Description of the Related Art

Heretofore, there is known a projector that drives a display device based on an inputted image signal and projects the image of the image signal onto a screen, a wall surface, or the like. In the conventional projector, a limitation is also imposed on the projectable amount of information because of a limitation on a mechanism that defines a projecting direction of a projecting unit included in the projector, and a limitation of the resolution of the display device, for example.

Therefore, in the conventional projector, in the case where the resolution of the image of the inputted image signal is greater than the resolution of the display device included in the projector, the amount of information of the image to be projected is reduced, and the image is projected. For example, Japanese Patent Application Laid-open No. 2007-214701 discloses a projector in which the resolution of an image of an inputted image signal is scaled down to the projectable resolution based on the resolution of a display device using a scaler and then the scaled down image is projected.

Moreover, in the other projectors, a part of a region is cut out of the image of an inputted image signal and only the image of the cut out region is projected. For example, Japanese Patent Application Laid-open No. 2004-086277 discloses a projector system in which a part of a region is cut out of the entire image and only the image of the cut out region is projected. This projector system enables the projection of the entire image signals by continuously changing regions to be cut out and projected, by so-called scrolling, for example.

Meanwhile, the projector according to Japanese Patent Application Laid-open No. 2007-214701 described above can project the entire image of inputted image data on one hand, and the quality of the image displayed on a projected medium is degraded because of the scale-down process for the size of the image based on the reduction in resolution on the other hand. From another aspect, a high resolution of the inputted image signal is wasted because of the scale-down process for the size of the image.

Moreover, in the projection system according to Japanese Patent Application Laid-open No. 2004-086277 described above, since the region on the projected medium, onto which the image of the cut out region is projected, is stationary and fixed, it is difficult for a person who sees the image to grasp the position of a subject in the image in the entire image.

SUMMARY OF THE INVENTION

It is an object of the present invention to at least partially solve the problems in the conventional technology.

The present invention provides a projector that includes: a projecting unit configured to convert image data into light and project the light at a predetermined angle of view; a projecting direction changing unit configure to move a projecting direction of the projecting unit from a first projecting direction to a second projecting direction; a projection angle derivation unit configured to derive a projection angle between the first projecting direction and a projecting direction moved by the projecting direction changing unit; a storage unit configured to store inputted image data that is inputted; and an image cutting out unit configured to generate cut-out image data that a part of a region of an image of the inputted image data stored on the storage unit is cut out as the image data projected by the projecting unit based on at least the projection angle and a number of pixels corresponding to a unit angle in the angle of view when the projection direction is moved by the unit angle, when the projecting unit projects the image of the inputted image data stored on the storage unit while moving the image of the inputted image data from the first projecting direction to the second projecting direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a schematic diagram illustrating the access control of a memory according to the embodiment.

DETAILED DESCRIPTION OF THE PREFERRED EMBODIMENTS

Embodiment

In the following, a projector according to an embodiment will be described with reference to the drawings. Specific numeric values, appearance configurations, or the like described in the embodiment are merely examples for easily understanding the present invention, and do not limit the present invention unless otherwise stated. It is noted that the detailed description and drawings of components not directly related to the present invention are omitted.

The Appearance of the Projector

Figure 1A:
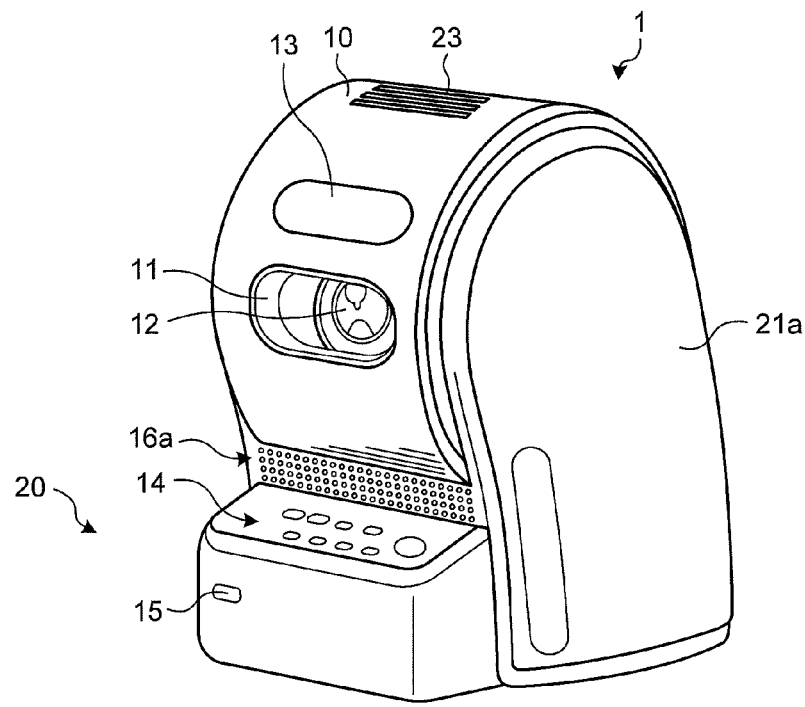
FIG. 1A is a schematic diagram illustrating an exemplary appearance of a projector apparatus applicable to an embodiment.
Figure 1B:
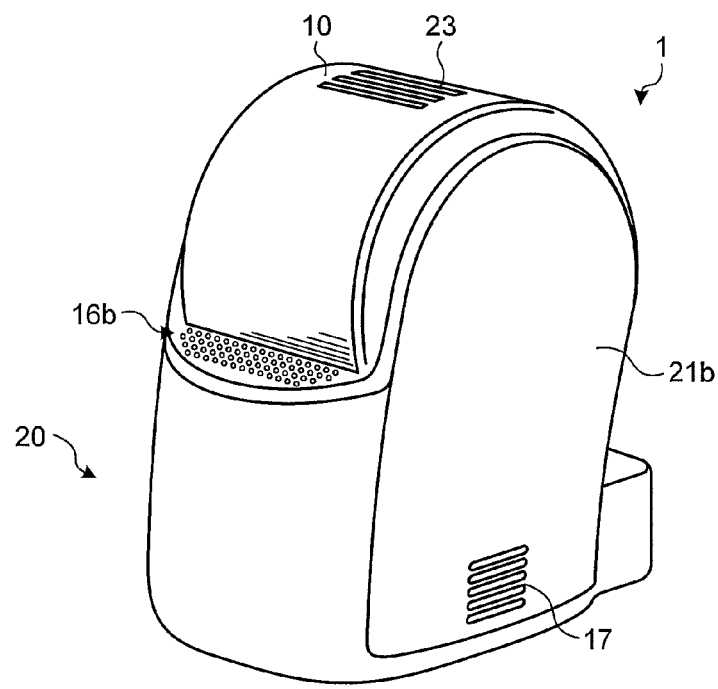
FIG. 1B is a schematic diagram illustrating an exemplary appearance of the projector apparatus applicable to the embodiment.

FIGS. 1A and 1B are diagrams illustrating the appearance of an exemplary projector (a projector apparatus) 1 according to the embodiment. FIG. 1A is a perspective view of the projector apparatus 1 seen from a first face side on which a manipulating unit is provided, and FIG. 1B is a perspective view of the projector apparatus 1 seen from a second face side facing the manipulating unit. The projector apparatus 1 includes a drum unit 10 and a base 20. The drum unit 10 is a rotator that can be rotationally driven with respect to the base 20. The base 20 includes a support that rotatably supports the drum unit 10 and a circuit unit that controls the drum unit 10 to be rotationally driven and controls image processing in various manners.

The drum unit 10 is supported by a rotating shaft, not illustrated, formed of a bearing or the like and provided on the inner side of side plate portions 21a and 21b, which are a part of the base 20, in such a manner that the drum unit 10 can be rotationally driven. The drum unit 10 includes a light source, a display device that modulates light emitted from the light source in accordance with image data, a drive circuit that drives the display device, an optical engine unit including an optical system that externally projects the light modulated at the display device, and a cooling unit that cools the light source or the like and is formed of a fan, for example, in the inside thereof.

The drum unit 10 is provided with windows 11 and 13. The window 11 is provided in such a manner that light projected from a projector lens 12 of the optical system described above is externally applied. The window 13 is provided with a distance sensor that derives a distance to a projected medium using infrared rays or ultrasonic waves, for example. Moreover, the drum unit 10 includes an air intake and exhaust hole 23 for air intake and exhaust for heat dissipation using a fan.

Various substrates for the circuit unit, a power supply unit, a drive unit for rotationally driving the drum unit 10, or the like are provided in the base 20. It is noted that the rotational driving of the drum unit 10 by the drive unit will be described later. The first face side of the base 20 is provided with a manipulating unit 14 to which a user inputs various manipulations for controlling the projector apparatus 1 and a receiving unit 15 that receives a signal sent from a remote control commander, not illustrated, when the user remotely controls the projector apparatus 1 using the remote control commander. The manipulating unit 14 includes various operators to receive user manipulation inputs and a display unit that displays the state of the projector apparatus 1, for example.

The air intake and exhaust holes 16a and 16b are provided on the first face side and the second face side of the base 20, respectively, and are used for air intake or air exhaust in order not to degrade heat dissipation efficiency in the drum unit 10 even in the case where the drum unit 10 is rotationally driven and takes the attitude that the air intake and exhaust hole 23 of the drum unit 10 is directed to the base 20 side. Moreover, an air intake and exhaust hole 17 provided on the side surface of a case takes and exhausts air for the heat dissipation of the circuit unit.

Rotational Driving of the Drum Unit

Figure 2A:
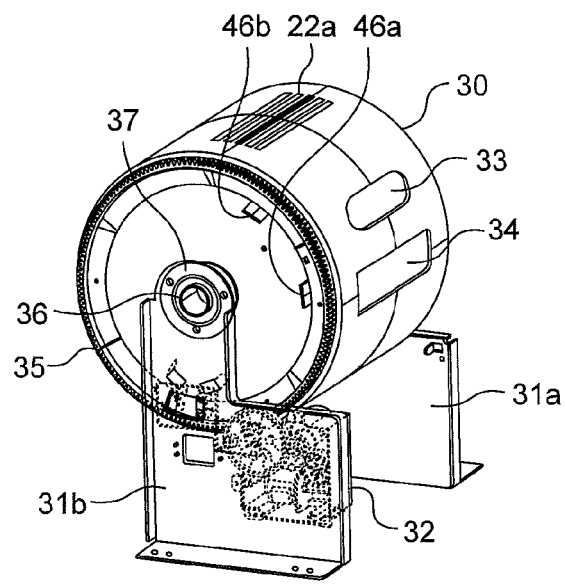
FIG. 2A is a schematic diagram illustrating an exemplary configuration for rotationally driving a drum unit according to the embodiment.
Figure 2B:
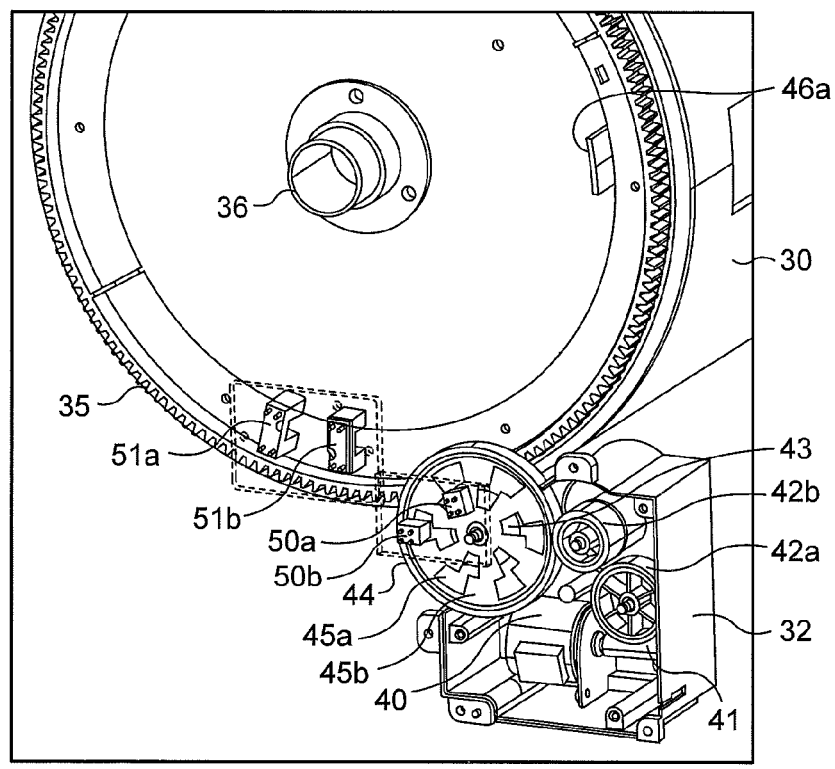
FIG. 2B is a schematic diagram illustrating an exemplary configuration for rotationally driving the drum unit according to the embodiment.

FIGS. 2A and 2B are diagrams illustrating the drum unit 10 rotationally driven by a drive unit 32 provided on the base 20. FIG. 2A is a diagram illustrating the configuration of the drum 30 in the state in which the cover or the like of the drum unit 10 is removed and the drive unit 32 provided on the base 20. The drum 30 is provided with a window 34 corresponding to the window 11 described above, a window 33 corresponding to the window 13, and an air intake and exhaust hole 22a corresponding to the air intake and exhaust hole 23. The drum 30 has a rotating shaft 36, and the drum 30 is mounted on a bearing 37 provided on supports 31a and 31b and using a bearing through the rotating shaft 36 in such a manner that the drum 30 can be rotationally driven.

A gear 35 is provided on the circumference of a circle on one side of the drum 30. The drum 30 is rotationally driven by the drive unit 32 provided on the support 31b through the gear 35. Projections 46a and 46b on the inner circumferential portion of the gear 35 are provided for detecting the starting point and the end point of the rotation operation of the drum 30.

FIG. 2B is an enlarged diagram illustrating the more detailed configuration of the drum 30 and the drive unit 32 provided on the base 20. The drive unit 32 includes a motor 40 and a gear group including a worm gear 41 directly driven by the rotating shaft of the motor 40, gears 42a and 42b that transmit rotation caused by the worm gear 41, and a gear 43 that transmits the rotation transmitted from the gear 42b to the gear 35 of the drum 30. The rotation of the motor 40 is transmitted to the gear 35 by the gear group, so that the drum 30 can be rotated according to the rotation of the motor 40. For the motor 40, a stepping motor can be adapted which controls rotation for every predetermined angle using a drive pulse, for example.

Photointerrupters 51a and 51b are provided on the support 31b. The photointerrupters 51a and 51b detect the projections 46b and 46a provided on the inner circumferential portion of the gear 35, respectively. The output signals of the photointerrupters 51a and 51b are supplied to a rotation control unit 104, described later. In the embodiment, the projection 46b is detected by the photointerrupter 51a, and the rotation control unit 104 determines that the attitude of the drum 30 is the attitude that the end point of the rotation operation is reached. Moreover, the projection 46a is detected by the photointerrupter 51b, and the rotation control unit 104 determines that the attitude of the drum 30 is the attitude that the starting point of the rotation operation is reached.

In the following, a normal direction is defined as a direction in which the drum 30 is rotated from the position at which the projection 46a is detected by the photointerrupter 51b to the position at which the projection 46b is detected by the photointerrupter 51a through an arc whose length is greater on the circumference of the drum 30. In other words, the rotation angle of the drum 30 is increased toward the normal direction.

It is noted that in the embodiment, the photointerrupters 51a and 51b and the projections 46a and 46b are disposed in such a manner that an angle including the rotating shaft 36 and formed between the detection position at which the photointerrupter 51b detects the projection 46a and the detection position at which the photointerrupter 51a detects the projection 46b is at an angle of 270°.

For example, in the case where the stepping motor is adapted for the motor 40, the attitude of the drum 30 is specified based on the timing of detecting the projection 46a by the photointerrupter 51b and the number of drive pulses for driving the motor 40, and the projection angle of the projector lens 12 can be determined.

It is noted that for the motor 40, a DC motor may be adapted, for example, not limited to a stepping motor. In this case, for example, as illustrated in FIG. 2B, a code wheel 44 that rotates together with the gear 43 is provided on the same axis as that of the gear 43, and photoreflectors 50a and 50b are provided on the support 31b, and a rotary encoder is configured.

The code wheel 44 is provided with a transmission portion 45a and a reflection portion 45b in different phases in the radial direction, for example. The photoreflectors 50a and 50b receive reflected light beams in different phases from the code wheel 44, so that the rotation speed and rotation direction of the gear 43 can be detected. The rotation speed and rotating direction of the drum 30 are then derived based on the detected rotation speed and rotation direction of the gear 43. The attitude of the drum 30 is specified based on the derived rotation speed and rotating direction of the drum 30 and the result of detecting the projection 46b by the photointerrupter 51a, and the projection angle of the projector lens 12 can be determined.

Figure 3:
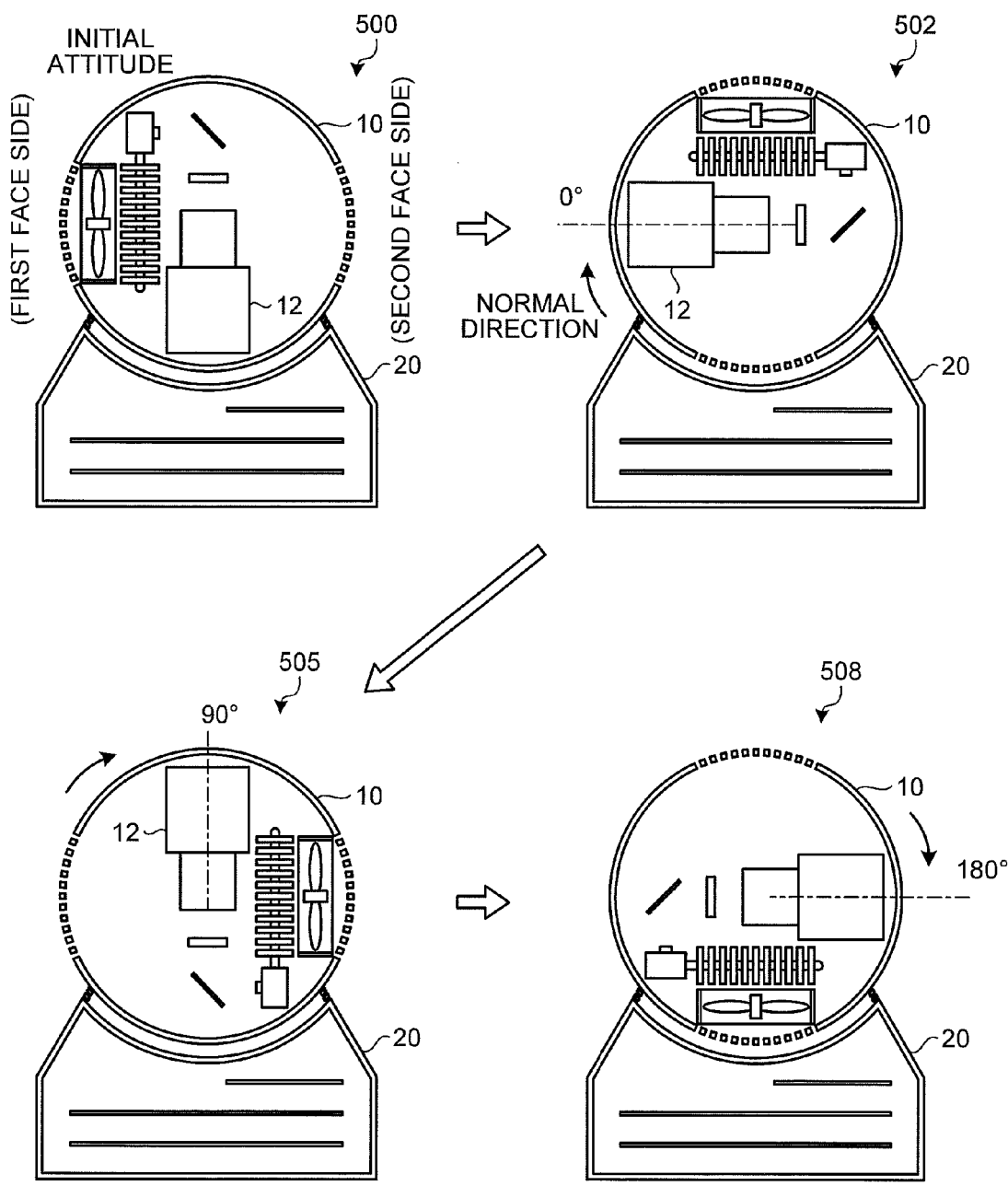
FIG. 3 is a schematic diagram illustrating the attitudes of the drum unit according to the embodiment.

In the configuration as described above, the initial attitude of the drum unit 10 is defined as the attitude that the projecting direction of the projector lens 12 is directed to the vertical direction. Therefore, in the initial state, the projector lens 12 is completely hidden behind the base 20. The upper left in FIG. 3 is a state 500 of the drum unit 10 in the initial attitude. In the embodiment, the projection 46a is detected by the photointerrupter 51b in the initial attitude, and the rotation control unit 104, described later, determines that the drum 30 reaches the starting point of the rotation operation.

It is noted that in the following, suppose that the phrase "the direction of the drum unit 10" is synonymous with the phrase "the projecting direction of the projector lens 12" and the phrase "the angle of the drum unit 10" is synonymous with the phrase "the projection angle of the projector lens 12", unless otherwise specified.

When the projector apparatus 1 is started, for example, the drive unit 32 starts the rotation of the drum unit 10 in such a manner that the projecting direction of the projector lens 12 faces the first face side. After that, suppose that the drum unit 10 is rotated in the direction of the drum unit 10, that is, the drum unit 10 is rotated to the position at which the projecting direction of the projector lens 12 becomes horizontal on the first face side, for example, and the rotation is temporarily stopped. The projection angle of the projector lens 12 in the case where the projecting direction of the projector lens 12 becomes horizontal on the first face side is defined as a projection angle of 0°. The upper right in FIG. 3 is a state 502 of the attitude of the drum unit 10 (the projector lens 12) when the projection angle is at an angle of 0°. In the following, the attitude of the drum unit 10 (the projector lens 12) at a projection angle θ relative to the attitude at a projection angle of 0° is referred to as a θ attitude.

For example, suppose that image data is inputted in the zero-degree attitude and the light source is lit. In the drum unit 10, light emitted from the light source is modulated in accordance with the image data by the display device driven by the drive circuit, and entered into the optical system. The light modulated in accordance with the image data is then projected in the horizontal direction from the projector lens 12, and applied onto a non-projected medium such as a screen and a wall surface.

The user manipulates the manipulating unit 14 or the like, so that the user can rotate the drum unit 10 about the rotating shaft 36 while performing projection of image data from the projector lens 12. For example, light from the projector lens 12 can be projected in the vertically upward orientation with respect to the bottom face of the base 20 as the drum unit 10 is rotated from the zero-degree attitude to a rotation angle of 90° (a 90-degree attitude) in the normal direction. The lower left in FIG. 3 is a state 505 of the drum unit 10 in the attitude when the projection angle θ is at an angle of 90°, that is, in the 90-degree attitude.

The drum unit 10 can be further rotated in the normal direction from the 90-degree attitude. In this case, the projecting direction of the projector lens 12 is changed from the direction of the vertically upward orientation with respect to the bottom face of the base 20 to the direction of the second face side. The lower right in FIG. 3 is a state 508 in which the drum unit 10 is further rotated in the normal direction from the 90-degree attitude in the lower left in FIG. 3, and takes the attitude when the projection angle θ is at an angle of 180°, that is, takes a 180-degree attitude. In the projector apparatus 1 according to the embodiment, the projection 46b is detected by the photointerrupter 51a in the 180-degree attitude, and the rotation control unit 104, described later, determines that the end point of the rotation operation of the drum 30 is reached.

Although the detail will be described later, the projector apparatus 1 according to the embodiment can change (move) the projection region of image data in accordance with the projection angle of the projector lens 12 by rotating the drum unit 10 as illustrated in the upper right, the lower left, and the lower right in FIG. 3, for example, while performing projection. Thus, the content of the projected image and a change on the projection position of the projected image on the projected medium can be associated with the content of a cut-out image region which is an image to be projected in the entire image region of the inputted image data and a change in the position. Therefore, the user can intuitively grasp which region in the entire image region of the inputted image data is projected based on the position of the projected image on the projected medium and can intuitively make a manipulation to change the content of the projected image.

Moreover, the optical system includes an optical zoom mechanism that can increase and decrease the size of the projection image when projected onto the projected medium by manipulating the manipulating unit 14. It is noted that in the following, increasing and decreasing the size of the projection image when projected onto the projected medium in the optical system is sometimes simply referred to as "zooming". For example, in the case where the optical system performs zooming, the projection image is scaled up and down about the optical axis of the optical system at the point in time when the zooming is performed.

When the user finishes the projection of the projection image by the projector apparatus 1, makes a manipulation to instruct the manipulating unit 14 to stop the projector apparatus 1, and stops the projector apparatus 1, first, the rotation is controlled in such a manner that the drum unit 10 is returned to the initial attitude. When it is detected that the drum unit 10 is directed to the vertical direction and returned in the initial attitude, the light source is turned off, and the power supply is turned off after a predetermined time period necessary to cool the light source. The drum unit 10 is directed to the vertical direction, and then the power supply is turned off, so that it is possible to prevent the surface of the projector lens 12 from being soiled when not used.

The Internal Configuration of the Projector Apparatus 1

Figure 4:
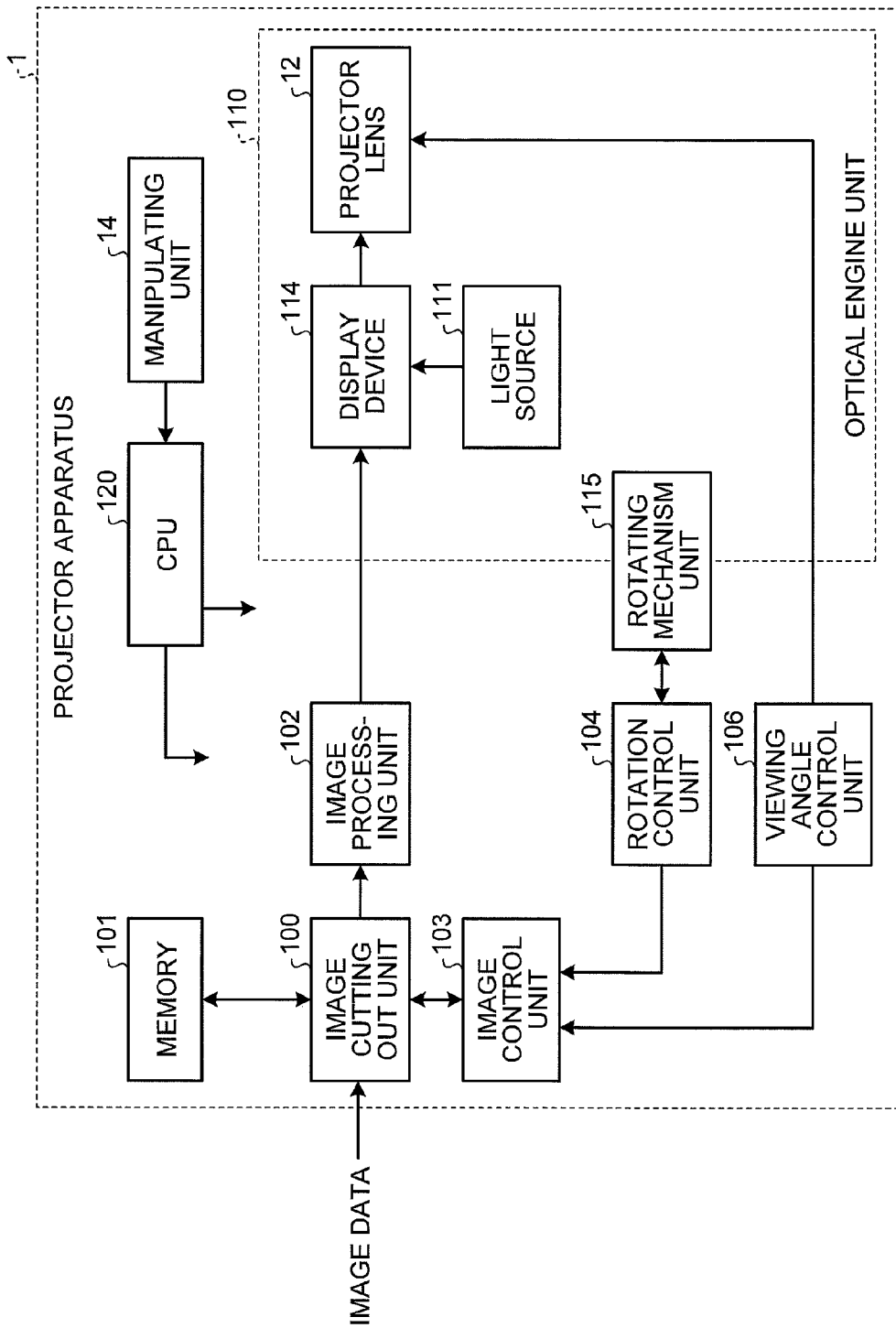
FIG. 4 is a block diagram illustrating an exemplary configuration of a circuit unit and an optical engine unit according to the embodiment.

Next, the configuration to implement the operation of the projector apparatus 1 according to the embodiment described above will be described. FIG. 4 is an exemplary configuration of a circuit unit provided in the base 20 and an optical engine unit 110 provided in the drum unit 10 in the projector apparatus 1.

The optical engine unit 110 includes a light source 111, a display device 114, and the projector lens 12. The light source 111 includes three LEDs (Light Emitting Diodes) emitting, for example, red (R), green (G) and blue (B) lights. The R, G, and B ray bundles emitted from the light source 111 are applied to the display device 114 through an optical system, not illustrated.

In the following description, suppose that the display device 114 is a transmissive liquid crystal display device in the size of an array of 1,280 pixels wide×800 pixels high, for example. Of course, the size of the display device 114 is not limited to this example. The display device 114 is driven by a drive circuit, not illustrated, and modulates, reflects, and emits the R, G, and B ray bundles in accordance with image data. The R, G, and B ray bundles emitted from the display device 114 and modulated in accordance with the image data are entered to the projector lens 12 through the optical system, not illustrated, and projected to the outside of the projector apparatus 1.

It is noted that the display device 114 may be configured of a reflective liquid crystal display device using LCOS (Liquid Crystal on Silicon) or a DMD (Digital Micromirror Device), for example. In this case, the projector apparatus is to be configured of an optical system and a drive circuit according to a display device to be adapted.

The projector lens 12 includes a plurality of assembled lenses and a lens drive unit that drives the lenses according to a control signal. For example, the lens drive unit drives the lenses included in the projector lens 12 according to the measured result based on the output signal from the distance sensor provided on the window 13, and controls focus. Moreover, the lens drive unit drives the lenses according to a zoom instruction supplied from a viewing angle control unit 106, described later, changes the angle of view, and controls optical zooming.

As described above, the optical engine unit 110 is provided in the drum unit 10 that can be rotated at an angle of 360° by a rotating mechanism unit 115. The rotating mechanism unit 115 includes the drive unit 32 described with reference to FIG. 2 and the gear 35 included in the configuration on the drum unit 10 side, and rotates the drum unit 10 in a predetermined manner using the rotation of the motor 40. In other words, the rotating mechanism unit 115 is to change the projecting direction of the projector lens 12.

The circuit unit of the projector apparatus 1 includes an image cutting out unit 100, a memory 101, an image processing unit 102, an image control unit 103, the rotation control unit 104, a viewing angle control unit 106, and a CPU 120. A ROM (Read Only Memory) and a RAM (Random Access Memory), not illustrated in the drawing, are connected to the CPU (Central Processing Unit) 120, in which the RAM is used as a work memory according to a program stored in the ROM in advance and the CPU 120 controls various processes of the projector apparatus 1 in a unified manner including the projection of the projection image, changing the projection angle, and cutting out an image.

For example, the CPU 120 controls the units of the projector apparatus 1 according to a program based on a control signal supplied from the manipulating unit 14 in accordance with a user manipulation. Thus, the projector apparatus 1 can be operated in accordance with a user manipulation. The CPU 120 controls the units of the projector apparatus 1 according to a script inputted from a data input unit, not illustrated, for example, not limited to this. Thus, the operation of the projector apparatus 1 can be automatically controlled.

Image data of a still image or a moving image is inputted to the projector apparatus 1, and supplied to the image cutting out unit 100. The image cutting out unit 100 stores the supplied image data on the memory 101. The memory 101 stores the image data in units of images. In other words, in the case where image data is still image data, the memory 101 stores corresponding data for every single still image, whereas in the case where image data is moving image data, the memory 101 stores corresponding data for individual frame images configuring the moving image data. The memory 101 complies with the digital high-definition broadcast standard, for example, and can store one or a plurality of frame images in the size of an array of 1,920 pixels×1,080 pixels. The image cutting out unit 100 cuts (extracts) an image region specified by the image control unit 103 out of the entire region of the frame image of image data stored on the memory 101, and outputs the image region as image data.

It is noted that preferably, the size of the inputted image data is shaped in advance in the size corresponding to the unit of storing image data on the memory 101 and then the image data is inputted to the projector apparatus 1. In this example, the image size of the inputted image data is shaped in the size of an array of 1,920 pixels×1,080 pixels in advance, and the image data is inputted to the projector apparatus 1. It may be fine to provide an image shaping unit that shapes image data inputted in a given size into image data in the size of an array of 1,920 pixels×1,080 pixels on the stage previous to the image cutting out unit 100 of the projector apparatus 1, not limited to this.

The image data outputted from the image cutting out unit 100 is supplied to the image processing unit 102. The image processing unit 102 applies image processing to the supplied image data using a memory, not illustrated, for example. For example, the image processing unit 102 applies a size conversion process to the image data supplied from the image cutting out unit 100 in such a manner that the size is matched with the size of the display device 114. The image processing unit 102 can apply various manners of image processing other than the size conversion process. For example, the size conversion process to image data can be performed using a general linear conversion process. It is noted that in the case where the size of the image data supplied from the image cutting out unit 100 is matched with the size of the display device 114, the image data may be outputted as it is.

Moreover, a process of so-called keystone correction may be applied to the image to be projected.

Furthermore, it may be fine that the aspect ratio of the image is made constant for interpolation (oversampling) to apply an interpolation filter of a predetermined characteristic and a part or all the image is enlarged, that a lowpass filter according to a reduction ratio is applied for decimation (subsampling) in order to remove aliasing noise and a part or all the image is scaled down, or that the size is not changed as it is without filtering.

In addition, in order to prevent an event that out focus occurs at the peripheral portion and an image is blurred when the image is obliquely projected, an edge enhancement process can be performed using an operator such as a Laplacian or an edge enhancement process can be performed by applying a linear filter horizontally and vertically. The edge of the projected, blurred image portion can be enhanced by the edge enhancement process.

Moreover, in order to prevent an event that the brightness of the entire screen is changed because the projection size (area) is changed by keystone correction or the like described above, it may be fine to perform adaptive brightness adjustment so as to maintain uniform brightness. It may be fine that in the case where the peripheral portion of the texture of the image to be projected includes oblique lines, the image processing unit 102 mixes a local halftone so as not to make edge jaggies conspicuous or applies a local lowpass filter to blur the edge jaggies, so that the oblique lines can be prevented from being observed as jagged lines.

The image data outputted from the image processing unit 102 is supplied to the display device 114. Practically, the image data is supplied to the drive circuit that drives the display device 114. The drive circuit drives the display device 114 in accordance with the supplied image data.

The rotation control unit 104 gives an instruction to the rotating mechanism unit 115 according to an instruction from the CPU 120 in accordance with the user manipulation to the manipulating unit 14, for example. The rotating mechanism unit 115 includes the drive unit 32 and the photointerrupters 51a and 51b described above. The rotating mechanism unit 115 follows the instruction supplied from the rotation control unit 104 to control the drive unit 32, and controls the rotation operation of the drum unit 10 (the drum 30). For example, the rotating mechanism unit 115 follows the instruction supplied from the rotation control unit 104 to generate a drive pulse, and drives the motor 40, which is a stepping motor, for example.

On the other hand, the rotation control unit 104 is supplied with the outputs of the photointerrupters 51a and 51b described above and the drive pulse to drive the motor 40 from the rotating mechanism unit 115. The rotation control unit 104 includes a counter, for example, and counts the number of pulses of the drive pulse. The rotation control unit 104 acquires the timing of detecting the projection 46a based on the output of the photointerrupter 51b, and resets the number of pulses counted on the counter at the timing of detecting the projection 46a. The rotation control unit 104 can sequentially find the angle of the drum unit 10 (the drum 30) based on the number of pulses counted on the counter, and can acquire the attitude (the angle) of the drum unit 10. Information expressing the angle of the drum unit 10 is supplied to the image control unit 103. In this manner, in the case where the projecting direction of the projector lens 12 is changed, the rotation control unit 104 can derive an angle between the projecting direction before changed and the projecting direction after changed.

The viewing angle control unit 106 follows an instruction from the CPU 120 in accordance with the user manipulation to the manipulating unit 14, for example, and gives a zooming instruction to the projector lens 12, that is, gives an instruction to change the angle of view. The lens drive unit of the projector lens 12 follows the zooming instruction to drive the lens, and controls zooming. The viewing angle control unit 106 supplies the zooming instruction and information about the angle of view derived from the zooming magnification of the zooming instruction, for example, to the image control unit 103.

The image control unit 103 specifies the cut-out region of the image by the image cutting out unit 100 based on the information about the angle supplied from the rotation control unit 104 and the information about the angle of view supplied from the viewing angle control unit 106. At this time, the image control unit 103 specifies the cut-out region of image data based on the line position according to the angle between the projecting directions before and after changing the projector lens 12.

It is noted that in the description above, the image cutting out unit 100, the image processing unit 102, the image control unit 103, the rotation control unit 104, and the viewing angle control unit 106 are described as if the units are separate pieces of hardware. However, the units are not limited to this example. For example, the units may be implemented by the modules of a program operated on the CPU 120.

The Cutting Out Process for Image Data

Figure 5:
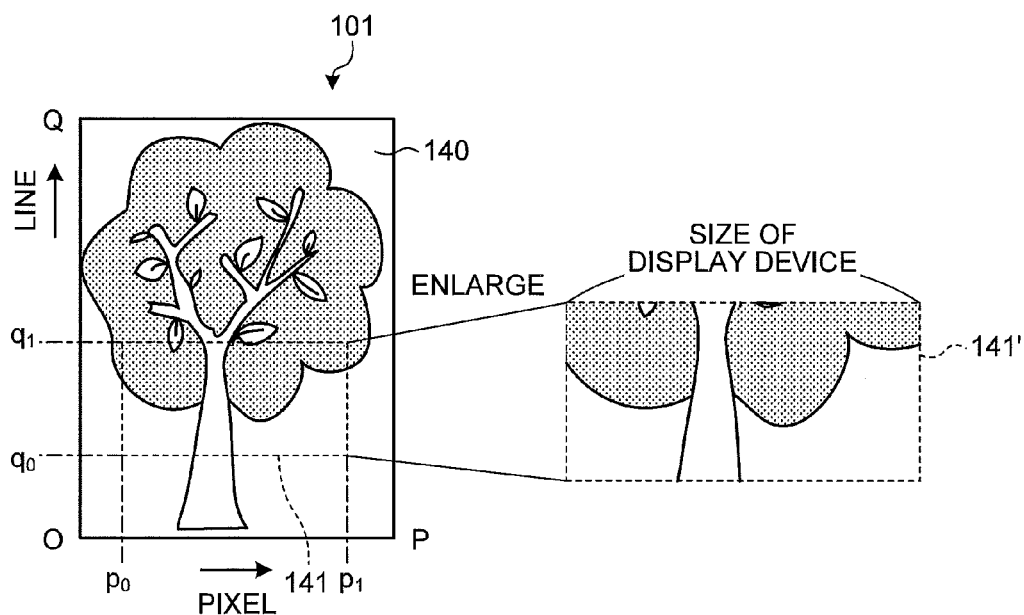
FIG. 5 is a schematic diagram schematically illustrating a cutting out process for image data stored on a memory according to the embodiment.

Next, the cutting out process for image data stored on the memory 101 by the image control unit 103 and the image cutting out unit 100 according to the embodiment will be described. FIG. 5 is a conceptual diagram illustrating the cutting out process for image data stored on the memory 101 according to the embodiment. An example will be described with reference to a diagram on the left side of FIG. 5 in which image data 141 that is a specified cut-out region is cut out of image data 140 stored on the memory 101.

Suppose that in the memory 101, an address is set in units of lines in the vertical direction and in units of pixels in the horizontal direction, for example, in which the line address is increased from the lower end of the image (the screen) to the top end, and the pixel address is increased from the left end to the right end of the image.

The image control unit 103 specifies addresses of line $q_0$ and line $q_1$ in the vertical direction and addresses of pixels $p_0$ and $p_1$ in the horizontal direction with respect to the image cutting out unit 100 for the cut-out region of the image data 140 stored on the memory 101 in the size of an array of Q lines×P pixels. The image cutting out unit 100 follows the specified addresses, and reads the lines in the range of lines $q_0$ to $q_1$ out of the memory 101 across pixels $p_0$ to $p_1$. At this time, suppose that the order of reading is that the lines are read from the top end to the lower end of the image, and the pixels are read from the left end to the right end of the image, for example. The detail of the access control over the memory 101 will be described later.

The image cutting out unit 100 supplies the image data 141 in the range of lines $q_0$ to $q_1$ and pixels $p_0$ to $p_1$ read out of the memory 101 to the image processing unit 102. The image processing unit 102 performs the size conversion process in which the size of the image of the supplied image data 141 is matched with the size of the display device 114. For an example, in the case where the size of the display device 114 is the size of an array of V lines×H pixels, the maximum magnification m is found, which satisfies both of Expression (1) and Expression (2) below. The image processing unit 102 then enlarges the image data 141 at the magnification m, and obtains image data 141' whose size is converted as illustrated on the right side in FIG. 5.

$$m \times (p_1 - p_0) \leq H \quad (1)$$

$$m \times (q_1 - q_0) \leq V \quad (2)$$

Figure 6:
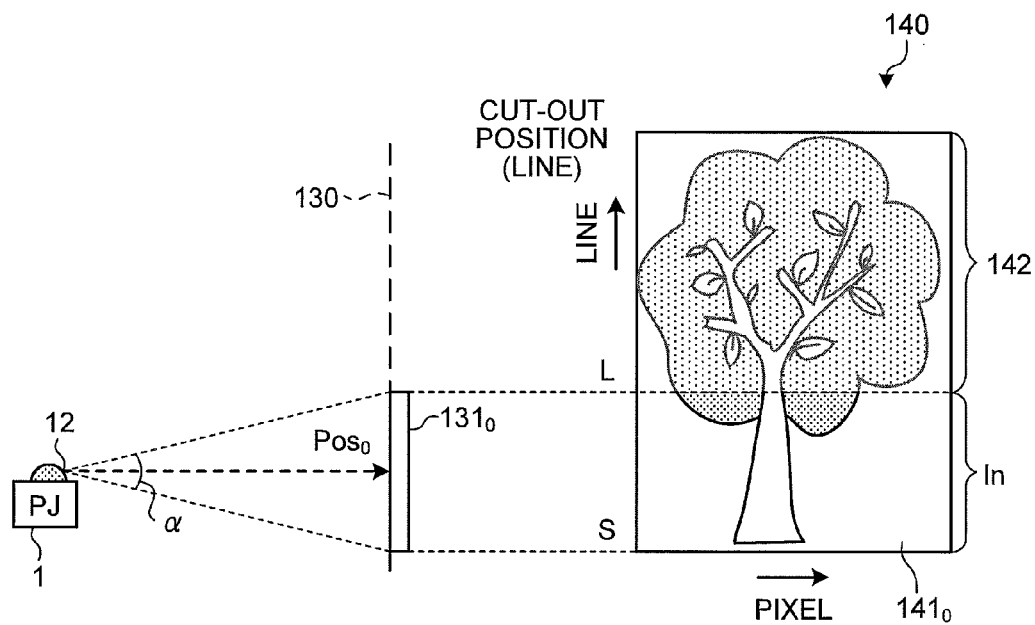
FIG. 6 is a schematic diagram illustrating an example of specifying a cut-out region in the case where the drum unit is located at an initial position according to the embodiment.

Next, the specification (updating) of the cut-out region in accordance with the projection angle according to the embodiment will be described. FIG. 6 is an example of specifying the cut-out region in the case where the drum unit 10 is in the zero-degree attitude according to the embodiment, that is, the projection angle is at an angle of 0°. In the projector apparatus (PJ) 1, suppose that a projection position in the case where an image $131_0$ is projected onto a projection plane 130, which is a projected medium such as a screen, at a projection angle of 0° through the projector lens 12 at a viewing angle α is a position $Pos_0$ corresponding to the center of the ray bundle of light projected from the projector lens 12. Moreover, at a projection angle of 0°, suppose that the image of image data from the Sth line to the Lth line of image data stored on the memory 101 at the lower end of a region specified in advance so as to perform projection in the attitude of the projection angle of 0° is projected. Suppose that the region from the Sth line to the Lth line includes ln of lines. For example, ln of lines corresponds to the number of pixels in the vertical direction of the display device 114, that is, the number of lines.

Furthermore, suppose that a value expressing the line position such as the Sth line and the Lth line is defined as a value that is increased from the lower end to the top end of the display device 114 as the line at the lower end of the display device 114 is the zeroth line, for example.

The image control unit 103 instructs the image cutting out unit 100 to cut out and read the image data 140 stored on the memory 101 from line S to line L. It is noted that here, suppose that all the image data of the image data 140 is read from the left end to the right end in the horizontal direction. The image cutting out unit 100 follows the instruction from the image control unit 103, sets the region of the image data 140 from the Sth line to the Lth line to the cut-out region, and reads and supplies the image data 141 of the set cut-out region to the image processing unit 102. The image $131_0$ formed of ln of lines of image data $141_0$ from the Sth line to the Lth line of the image data 140 is projected onto the projection plane 130. In this case, in the entire region of the image data 140, the image of image data 142 in a region formed of the lines from the Lth line to the line on the top end is not projected.

Next, the case will be described where the drum unit 10 is rotated by a user manipulation to the manipulating unit 14, for example, and the projection angle of the projector lens 12 is at the angle θ. In the embodiment, in the case where the drum unit 10 is rotated and the projection angle of the projector lens 12 is changed, the cut-out region of the image data 140 to be cut out of the memory 101 is changed in accordance with the projection angle θ.

Figure 7:
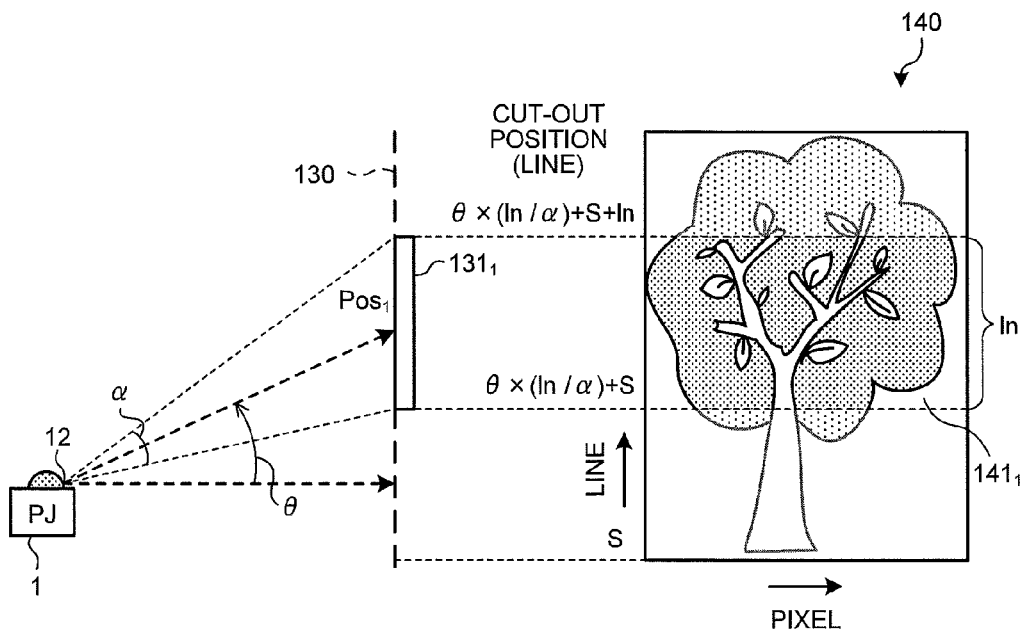
FIG. 7 is a schematic diagram illustrating the setting of a cut-out region with respect to a projection angle θ according to the embodiment.

The setting of the cut-out region with respect to the projection angle θ will be described more in detail with reference to FIG. 7. For example, let us consider the case where the drum unit 10 is rotated in the normal direction from the zero-degree attitude at the projection position of the projector lens 12 and the projection angle of the projector lens 12 is the angle θ (>0°). In this case, the projection position with respect to the projection plane 130 is moved to a projection position $Pos_1$ above the projection position $Pos_0$ at a projection angle of 0°. At this time, the image control unit 103 specifies the cut-out region for the image data 140 stored on the memory 101 to the image cutting out unit 100 according to Expression (3) and Expression (4) below. Expression (3) expresses the $R_S$th line at the lower end of the cut-out region, and Expression (4) expresses the $R_L$th line at the top end of the cut-out region.

$$R_S = \theta \times (\ln/\alpha) + S \quad (3)$$

$$R_L = \theta \times (\ln/\alpha) + S + \ln \quad (4)$$

It is noted that in Expression (3) and Expression (4), the value ln expresses the number of lines (the number of lines of the display device 114, for example) included in the projection region. Moreover, the value α expresses the angle of view of the projector lens 12, and the value S expresses the value expressing the line position at the lower end of the cut-out region in the zero-degree attitude described with reference to FIG. 6.

In Expression (3) and Expression (4), (ln/α) expresses the number of lines included in the viewing angle α. In other words, (ln/α) expresses the number of lines per unit angle in the projector apparatus 1. Therefore, θ×(ln/α) expresses the number of lines corresponding to the angle θ in the projector apparatus 1. In other words, Expression (3) and Expression (4) correspond to a change in the read addresses (lines) with respect to the memory 101 in the case where the projection angle is changed by the angle θ with respect to the zero-degree attitude (the angle θ=0°).

As described above, in the embodiment, the address in reading the image data 140 out of the memory 101 is specified in accordance with the projection angle θ. Thus, the image data $141_1$ of the image data 140 at the position in accordance with the projection angle θ is read out of the memory 101, and the image $131_1$ of the read image data $141_1$ is projected onto the projection position $Pos_1$ corresponding to the projection angle θ on the projection plane 130.

Therefore, according to the embodiment, in the case where the image data 140 in the size greater than the size of the display device 114 is projected, the correspondence relationship between the position in the image to be projected and the position in the image data is maintained. Moreover, the projection angle θ is found based on the drive pulse of the motor 40 for rotationally driving the drum 30, so that the projection angle θ can be obtained in the state in which there is almost no delay with respect to the rotation of the drum unit 10 and the projection angle θ can be obtained with no influence of the projection image or the surrounding environment.

Next, the setting of the cut-out region will be described in the case where the projector lens 12 performs optical zooming. As already explained, in the case of the projector apparatus 1, the lens drive unit is driven, the viewing angle α of the projector lens 12 is increased or decreased, and then optical zooming is performed. An increase in the angle of view caused by optical zooming is defined as an angle Δ, and the angle of view of the projector lens 12 after optical zooming is defined as a viewing angle (α+Δ).

In this case, even though the angle of view is increased by optical zooming, the cut-out region with respect to the memory 101 is not changed. In other words, the number of lines included in the projection image at the viewing angle α before optical zooming is the same as the number of lines included in the projection image at the viewing angle (α+Δ) after optical zooming. Therefore, the number of lines included per unit angle is changed after optical zooming.

Figure 8:
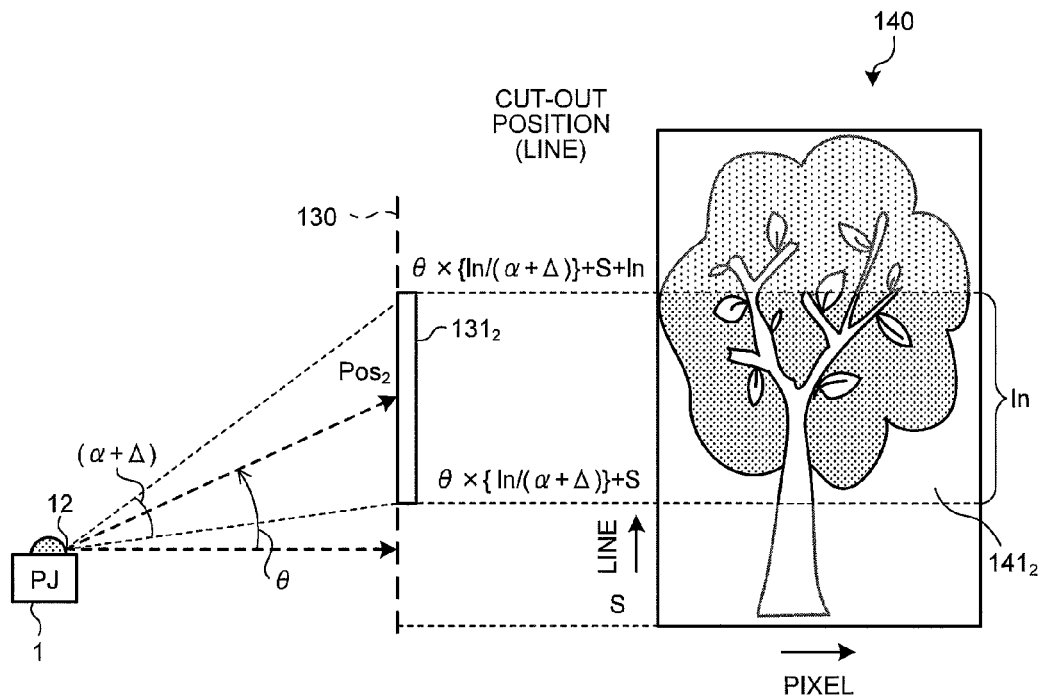
FIG. 8 is a schematic diagram illustrating the specification of a cut-out region in the case where optical zooming is performed according to the embodiment.

The specification of the cut-out region in the case where optical zooming is performed will be described more in detail with reference to FIG. 8. In the example in FIG. 8, optical zooming is performed in which the viewing angle Δ is increased with respect to the viewing angle α in the state of the projection angle θ. Optical zooming is performed, and the projection image projected onto the projection plane 130 is enlarged by the viewing angle Δ as compared with the case where optical zooming is not performed as the center of the ray bundle of light (a projection position $Pos_2$) is shared which is projected onto the projector lens 12, for example, as illustrated in an image $131_2$.

In the case where optical zooming is performed by the viewing angle Δ, the number of lines specified as the cut-out region with respect to the image data 140 is defined as ln lines. The number of lines included per unit angle is expressed by {ln/(α+Δ)}. Therefore, the cut-out region with respect to the image data 140 is specified by Expression (5) and Expression (6) below. It is noted the meanings of the variables in Expression (5) and Expression (6) are the same as ones in Expression (3) and Expression (4) described above.

$$R_S = \theta \times \{\ln/(\alpha+\Delta)\} + S \quad (5)$$

$$R_L = \theta \times \{\ln/(\alpha+\Delta)\} + S + \ln \quad (6)$$

The image data $141_2$ of the region expressed by Expression (5) and Expression (6) is read out of the image data 140, and the image $131_2$ of the read image data $141_2$ is projected onto the projection position Pos$_2$ on the projection plane 130 through the projector lens 12.

In the case where optical zooming is performed in this manner, the number of lines included per unit angle is changed as compared with the case where optical zooming is not performed, and the amount of a change in the lines with respect to a change in the projection angle θ is different as compared with the case where optical zooming is not performed. This is the state in which the gain of the viewing angle Δ increased by optical zooming is changed in specifying the read address in accordance with the projection angle θ with respect to the memory 101.

In the embodiment, the address in reading the image data 140 out of the memory 101 is specified in accordance with the projection angle θ and the viewing angle α of the projector lens 12. Thus, even in the case where optical zooming is performed, the addresses of the image data 141$_2$ to be projected can be appropriately specified with respect to the memory 101. Therefore, even in the case where optical zooming is performed, the correspondence relationship between the position in the image to be projected and the position in the image data is maintained when the image data 140 having a size greater than the size of the display device 114 is projected.

Figure 9:
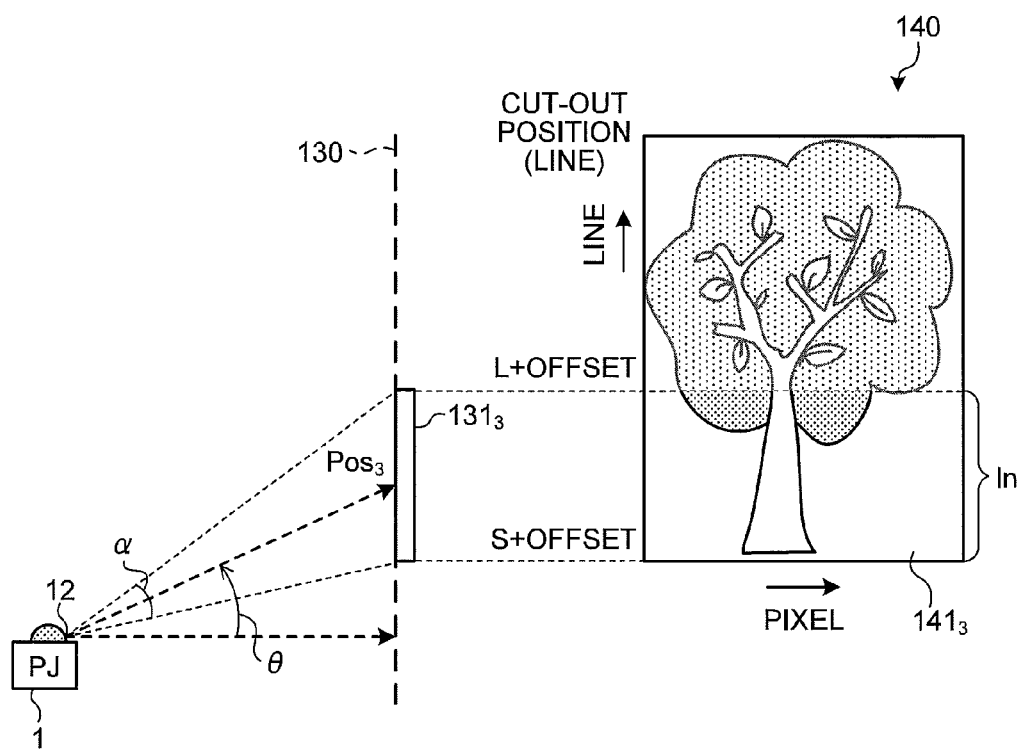
FIG. 9 is a schematic diagram illustrating the case where an offset is given to the projection position of an image according to the embodiment.

Next, the case where an offset is given to the projection position of an image will be described with reference to FIG. 9. In the use of the projector apparatus 1, the zero-degree attitude (a projection angle of 0°) is not always the lowermost end of the projection position. For example, as illustrated in FIG. 9, the case can also be considered where a projection position Pos$_3$ at a predetermined projection angle θ$_{ofst}$ is changed to the projection position at the lowermost end. The projection angle θ in projecting the image having the line at the lowermost end of the image data 140 as the lowermost end is defend as an offset angle θ$_{ofst}$ by an offset.

In this case, for example, it can be considered that the offset angle θ$_{ofst}$ is regarded as a projection angle of 0° and the cut-out region is specified with respect to the memory 101. This is applied to Expression (3) and Expression (4) described above, and then Expression (7) and Expression (8) below are held. It is noted that the meanings of the variables in Expression (7) and Expression (8) are the same as ones in Expression (3) and Expression (4) described above.

$$R_S = (θ - θ_{ofst}) \times (\ln/α) + S \quad (7)$$

$$R_L = (θ - θ_{ofst}) \times (\ln/α) + S + \ln \quad (8)$$

The image data 141$_3$ of the region expressed by Expression (7) and Expression (8) is read out of the image data 140, and an image 131$_3$ of the read image data 141$_3$ is projected onto the projection position Pos$_3$ on the projection plane 130 through the projector lens 12.

Meanwhile, the method for specifying the cut-out region by Expression (3) and Expression (4) described above is based on a cylindrical model in which the projection plane 130 onto which image data is projected through the projector lens 12 is supposed to be a cylinder about the rotating shaft 36 of the drum unit 10. However, practically, it is considered that the projection plane 130 is often a vertical plane forming an angle of 90° with respect to the projection angle θ=0° (in the following, simply referred to as "a vertical plane"). In the case where the image data of the same number of lines is cut out of the image data 140 and projected onto the vertical plane, the image to be projected onto the vertical plane extends in the vertical direction as the projection angle θ is increased. Therefore, the following image processing is performed at the image processing unit after the cutting out unit.

Figure 10:
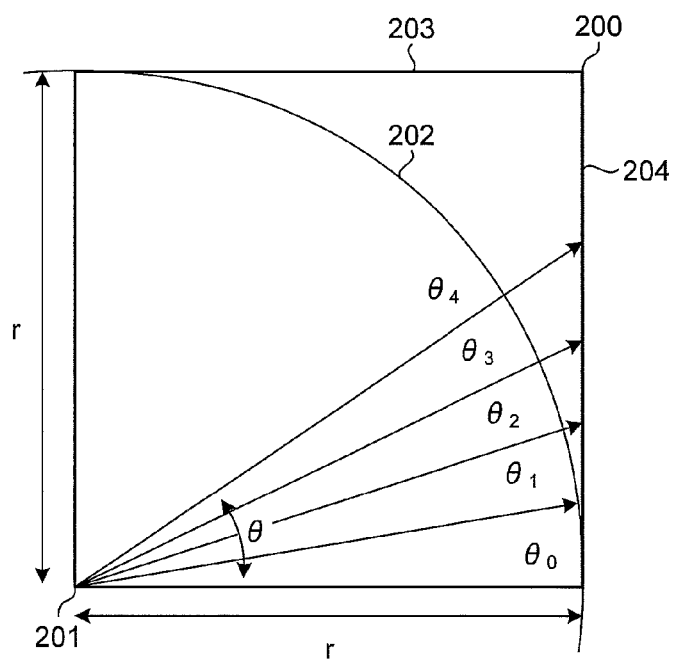
FIG. 10 is a schematic diagram illustrating an image to be projected onto a vertical plane.

The image to be projected onto the vertical plane will be described with reference to FIGS. 10 and 11. In FIG. 10, let us consider the case where a position 201 is defined as the position of the rotating shaft 36 of the drum unit 10 and an image is projected onto a projection plane 204 with a distance r apart from the position 201 through the projector lens 12.

In the cylindrical model described above, the projection image is projected as the projection plane is an arc 202 having a radius r about the position 201. The points of the arc 202 are set at equal distances from the position 201, and the center of the ray bundle of light projected from the projector lens 12 has the radius of a circle including the arc 202. Therefore, even though the projection angle θ is increased from the angle θ$_0$ at an angle of 0° to the angle θ$_1$, the angle θ$_2$, and so on, the projection image is always projected onto the projection plane in the same size.

On the other hand, in the case where an image is projected from the projector lens 12 with respect to the projection plane 204, which is a vertical plane, when the projection angle θ is increased from the angle θ$_0$ to the angle θ$_1$, the angle θ$_2$, and so on, the position at which the center of the ray bundle of light projected from the projector lens 12 is applied to the projection plane 204 is changed by the function of the angle θ according to the characteristics of the tangent function. Therefore, the projection image extends upward as the projection angle θ is increased, in accordance with a ratio M expressed in Expression (9) below.

$$M = (180 \times \tan θ)/(θ \times π) \quad (9)$$

According to Expression (9), for example, in the case of the projection angle θ=45°, the projection image extends at a ratio of about 1.27 times. Moreover, in the case where a projection plane W is higher than the length of the radius r and the image can be projected at the projection angle θ=60°, the projection image extends at a ratio of about 1.65 times at the projection angle θ=60°.

Figure 11:
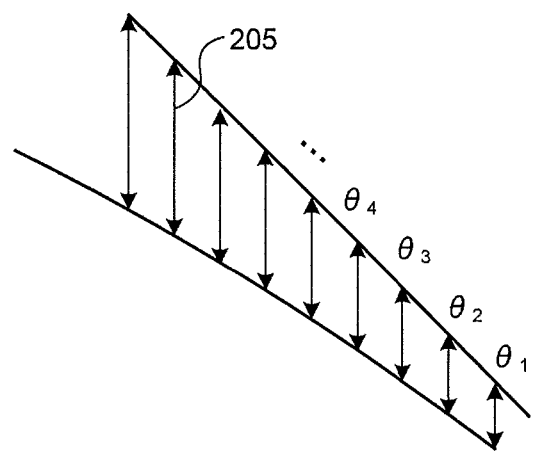
FIG. 11 is a schematic diagram illustrating an image to be projected onto a vertical plane.

Furthermore, as illustrated in FIG. 11, a line spacing 205 on the projection image on the projection plane 204 is also increased as the projection angle θ is increased. In this case, the line spacing 205 is increased according to the position on the projection plane 204 in a single projection image in accordance with Expression (9) described above.

Therefore, in the projector apparatus 1, a scale-down process is performed to the image data of the image to be projected at the ratio of the reciprocal of Expression (9) described above in accordance with the projection angle θ of the projector lens 12. Desirably, in the scale-down process, the image data is slightly greater than the image data cut out based on the cylindrical model. That is, although depending on the height of the projection plane 204, which is a vertical plane, since the projection image extends at the ratio of about 1.27 times in the case of the projection angle θ=45°, the image data is scaled down at about 78% of the reciprocal. Therefore, desirably, in order to fully use the image memory, the image data is cut including a little extra number of lines, about 22% or more in advance, the region greater than the region of the image data corresponding to the image to be projected is read into the image of the cut-out region, and then the image data is inputted to the image processing unit.

For an example, the image control unit 103 applies the scale-down process in advance to the image data for the individual lines of the image in projecting the image data using the ratio of the reciprocal of Expression (9) described above in storing the image data inputted to the projector apparatus 1 on the memory 101 using the image cutting out unit 100. In the scale-down process, lines are thinned out by applying lowpass filtering using a few taps of lowpass filters to lines (pixels in the vertical direction) at the reduction ratio in accordance with the projection angle θ. Strictly speaking, preferably, in lowpass filtering, the limiting value in the lowpass filter band is also changed in accordance with the projection angle θ. A typical linear interpolation can be used in such a manner that the filter characteristics are uniformly determined at a reduction ratio corresponding to the maximum projection angle θ, or the filter characteristics are uniformly determined at a reduction ratio corresponding to nearly the half of the maximum projection angle θ, not limited to this. Moreover, preferably, after the filtering, subsampling is performed also to the lines to be thinned out in accordance with the projection angle θ of the screen. The lines may be uniformly decimated at the reduction ratio corresponding to the maximum projection angle θ, or the lines may be uniformly decimated at the reduction ratio corresponding to nearly the half of the maximum projection angle θ, not limited to this. In the case where the scale-down process is performed accurately as much as possible without uniformly performing lowpass filtering and decimation, such a method is effective to derive more excellent characteristics in which image data is divided into some areas in the line direction and the divided areas are individually and uniformly processed.

It is noted that image processing using Expression (9) is not limitedly performed in storing image data on the memory 101. For example, image processing is performed at the image processing unit 102.

It is noted that in the environment in which the projector apparatus 1 is practically used, it is considered that a limitation is imposed on the height of the projection plane 204, the plane is folded at an angle of 90° at a position 200 at a certain height, and a plane 203 is sometimes formed. The plane 203 can also be used for the projection plane for the projector apparatus 1. In this case, the image to be projected onto the plane 203 is scaled down by the characteristics reverse to the characteristics of the image to be projected onto the projection plane 204 described above, as the projection angle θ is further increased, and the projection position goes to the direction directly above (the projection angle θ=an angle of 90°) beyond the position 200.

Therefore, in the case where the image of the image data is projected at a projection angle of 0° and an angle of 90°, the image data to be projected is not subjected to the scale-down process using Expression (9). Moreover, in the case where the length (the height) of the projection plane 204 is nearly equal to the length of the plane 203, the scale-down process using Expression (9) is applied to the image data to be projected as a symmetrical process formed of a scale-down process from a projection angle of 0° to the position 200 at the uppermost part of the projection plane 204 and a scale-down process from the position 200 to the projection angle of 90°. Thus, the load applied to the scale-down process at the image control unit 103 can be reduced.

In the example described above, the description is made as the vertical plane forming an angle of 90° with respect to the projection angle θ=0° is assumed. It can also be considered that an image is projected onto the plane forming an angle of 180° with respect to the projection angle θ=0° depending on the rotation angle of the drum unit 10. In the case where the image data of the same number of lines is cut out of the image data 140 and projected onto the plane, the image to be projected is scaled down in the vertical direction as the projection angle θ is increased. Therefore, image processing reverse to the description above is performed at the image processing unit after the cutting out unit.

In other words, when the projection angle θ is increased from the angle $θ_0$ to the angle $θ_1$, the angle $θ_2$, and so on, a distance from a projecting unit to the projection plane is changed as the distance is reduced. Therefore, the projector apparatus 1 applies a scale-up process to the image data of the image to be projected in accordance with the projection angle θ of the projector lens 12 in a reverse manner to the description above.

As described above, it may be fine that in the case where the distance from the projector lens 12 to the projection plane is reduced as the projecting direction is changed from a first projecting direction to a second projecting direction, the image cutting out unit of the projector apparatus 1 applies the scale-up process for the individual pixels of the cut-out image data based on the projection angle.

Memory Control

Next, the access control of the memory 101 will be described with reference to FIGS. 12 to 17. For the image data, the pixels are sequentially transmitted from the left end to the right end of the image for the individual lines in the horizontal direction on the screen for individual vertical synchronization signals VD, and the lines are sequentially transmitted from the top end to the lower end of the image. It is noted that in the following, the case will be described as an example that the image data has the size of an array of 1,920 pixels wide×1,080 pixels (lines) high, complied with the digital high-definition standard.

Figure 12:
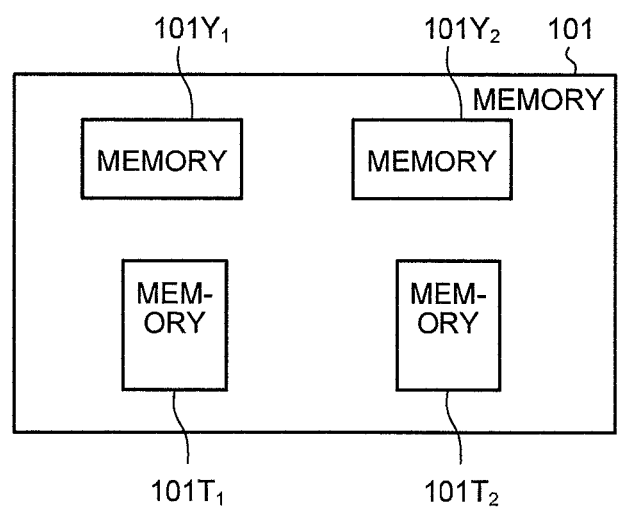
FIG. 12 is a schematic diagram illustrating the access control of a memory according to the embodiment.

In the following, an example of access control will be described in the case where the memory 101 includes four memory regions that are separated and whose access is controllable. In other words, as illustrated in FIG. 12, the memory 101 is provided with regions of memories $101Y_1$ and $101Y_2$ in the size of an array of 1,920 pixels wide×1,080 pixels (lines) high for use in writing and reading image data and regions of memories $101T_1$ and $101T_2$ in the size of an array of 1,080 pixels wide×1,920 pixels (lines) high for use in writing and reading image data. In the following, the memories $101Y_1$, $101Y_2$, $101T_1$, and $101T_2$ will be described as a memory $Y_1$, a memory $Y_2$, a memory $T_1$, and a memory $T_2$, respectively.

FIG. 13 is an exemplary time chart illustrative of access control over the memory 101 by the image cutting out unit 100 according to the embodiment. A chart 210 expresses the projection angle θ of the projector lens 12, and a chart 211 expresses the vertical synchronization signal VD. Moreover, a chart 212 expresses the timing of inputting image data items $D_1$, $D_2$, and so on, which are inputted to the image cutting out unit 100, and a chart 213 to a chart 216 express examples of access from the image cutting out unit 100 to the memories $Y_1$, $Y_2$, $T_1$, and $T_2$, respectively. It is noted that in the chart 213 to the chart 216, a block denoted with "R" expresses reading, and a block denoted with "W" expresses writing.

The image data items $D_1$, $D_2$, $D_3$, $D_4$, $D_5$, $D_6$, and so on in the image size of an array of 1,920 pixels×1,080 lines are inputted to the image cutting out unit 100 for the individual vertical synchronization signals VD. The image data items $D_1$, $D_2$, and so on are inputted after the vertical synchronization signal VD in synchronization with the vertical synchronization signal VD. Moreover, the projection angles of the projector lens 12 corresponding to the vertical synchronization signals VD are defined as projection angles $θ_1$, $θ_2$, θ$_3$, θ$_4$, θ$_5$, θ$_6$, and so on. The projection angle θ is thus acquired for the individual vertical synchronization signals VD.

First, the image data item D$_1$ is inputted to the image cutting out unit 100. As described above, in the projector apparatus 1 according to the embodiment, the drum unit 10 is rotated, and the projection angle θ of the projector lens 12 is changed to move the projection position of the projection image, and the read position of the image data is specified in accordance with the projection angle θ. Therefore, it is convenient that the image data is long in the vertical direction. Typically, the size of image data in the horizontal direction is often greater than the size in the vertical direction. Therefore, it can be considered that for example, the user rotates a camera at an angle of 90° for imaging and image data obtained by this imaging is inputted to the projector apparatus 1.

Figure 14A:
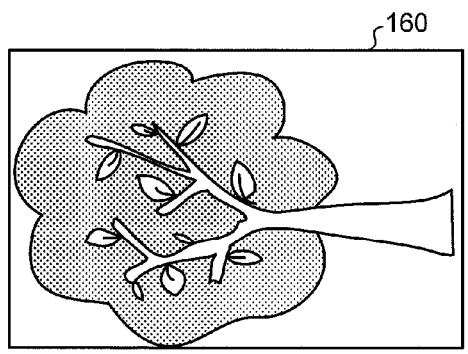
FIG. 14A is a schematic diagram illustrating the access control of a memory according to the embodiment.

In other words, the image of the image data items D$_1$, D$_2$, and so on inputted to the image cutting out unit 100 is an image in the horizontal orientation rotated at an angle of 90° from the image in the correct orientation determined from the content of the image as an image 160 illustrated as an image in FIG. 14A.

Figure 14B:
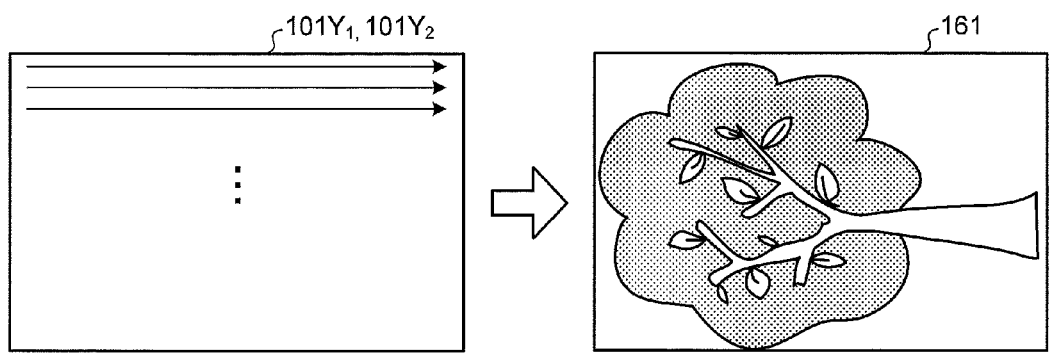
FIG. 14B is a schematic diagram illustrating the access control of a memory according to the embodiment.

The image cutting out unit 100 first writes the inputted image data item D$_1$ on the memory Y$_1$ at timing WD$_1$ corresponding to the timing of inputting the image data item D$_1$ (at timing WD$_1$ in the chart 213 in FIG. 13). The image cutting out unit 100 writes the image data item D$_1$ on the memory Y$_1$ in order of the lines toward the horizontal direction as illustrated in the left side in FIG. 14B. The right side in FIG. 14B is an image 161 of the image data item D$_1$ thus written on the memory Y$_1$ as an image. The image data item D$_1$ is written on the memory Y$_1$ as the same image 161 as the image 160 when inputted.

Figure 14C:
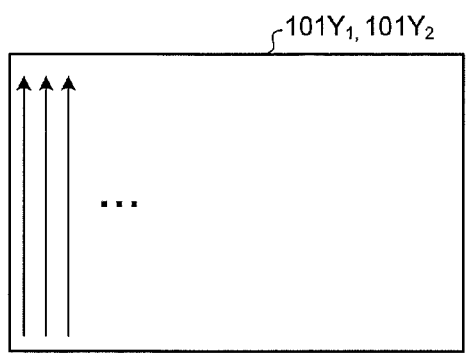
FIG. 14C is a schematic diagram illustrating the access control of a memory according to the embodiment.

As illustrated in FIG. 14C, the image cutting out unit 100 reads the image data item D$_1$, which is written on the memory Y$_1$, out of the memory Y$_1$ at timing RD$_1$ at the same time when the vertical synchronization signal VD subsequent to the vertical synchronization signal VD, at which the image data item D$_1$ is written, is started (at timing RD$_1$ in the chart 213 in FIG. 13).

At this time, the image cutting out unit 100 reads the image data item D$_1$ for the individual pixels sequentially across the lines in the vertical direction as the pixel at the lower left corner of the image is a pixel to start read. The pixel at the top end of the image is read, and then the pixels are read in the vertical direction as the pixel on the right side of the pixel at the read start position in the vertical direction is the pixel to start read. This operation is repeated until the read of the pixel at the upper right corner of the image is finished.

In other words, the image cutting out unit 100 sequentially reads the image data item D$_1$ out of the memory Y$_1$ for the individual pixels from the left end to the right end of the image for the individual lines in the vertical direction as the line direction is the vertical direction directed from the lower end to the top end of the image.

Figure 15A:
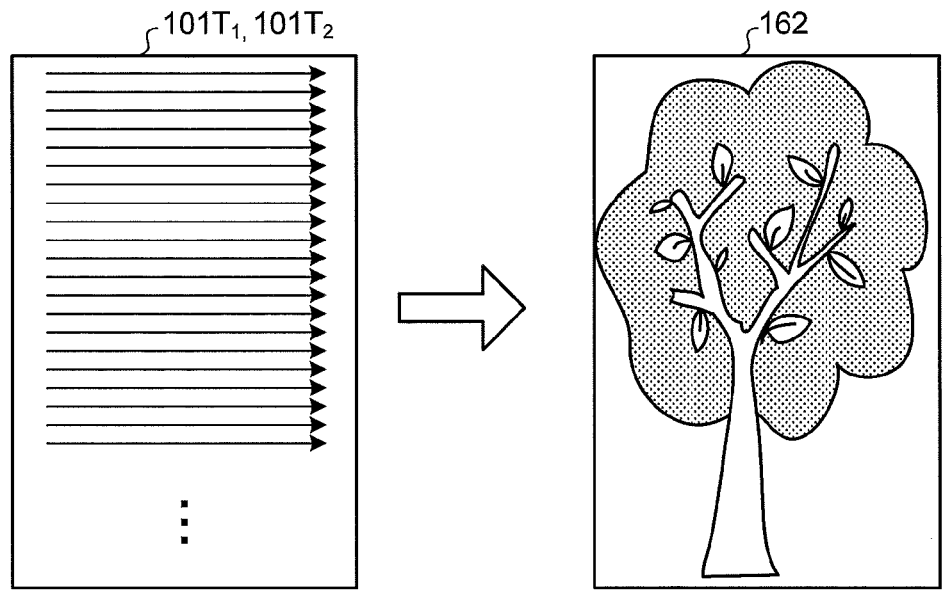
FIG. 15A is a schematic diagram illustrating the access control of a memory according to the embodiment.

The image cutting out unit 100 sequentially writes the pixels of the image data item D$_1$ read out of the memory Y$_1$ in this manner on the memory T$_1$ for the individual pixels in the line direction as illustrated in the left side in FIG. 15A (at timing WD$_1$ in the chart 214 in FIG. 13). In other words, the image cutting out unit 100 writes a single read pixel on the memory T$_1$ every time when reading a single pixel out of the memory Y$_1$, for example.

The right side in FIG. 15A is an image of an image 162 formed of the image data item D$_1$ thus written on the memory T$_1$. The image data item D$_1$ is the image 162 written on the memory T$_1$ in the size of an array of 1,080 pixels wide×1,920 pixels (lines) high in which the image 160 in input is rotated clockwise at an angle of 90° and the horizontal direction is replaced by the vertical direction.

The image cutting out unit 100 specifies the addresses of the cut-out region specified in the image control unit 103 to the memory T$_1$, and reads the image data of the region specified as the cut-out region out of the memory T$_1$. The timing of reading is delayed by two vertical synchronization signals VD with respect to the timing of inputting the image data item D$_1$ to the image cutting out unit 100 as the timing RD$_1$ illustrated in the chart 214 in FIG. 13.

As described above, in the projector apparatus 1 according to the embodiment, the drum unit 10 is rotated, the projection angle θ of the projector lens 12 is changed to move the projection position of the projection image, and the read position of the image data is specified in accordance with the projection angle θ. For example, the image data item D$_1$ is inputted to the image cutting out unit 100 at the timing of the projection angle θ$_1$. It is likely that the projection angle θ at the timing of practically projecting the image formed of the image data item D$_1$ is changed from the projection angle θ$_1$ to a projection angle θ$_3$ different from the projection angle θ$_1$.

Therefore, the cut-out region in reading the image data item D$_1$ out of the memory T$_1$ is read in the range greater than the region of the image data corresponding to the image to be projected with a margin of a change in the projection angle θ.

Figure 15B:
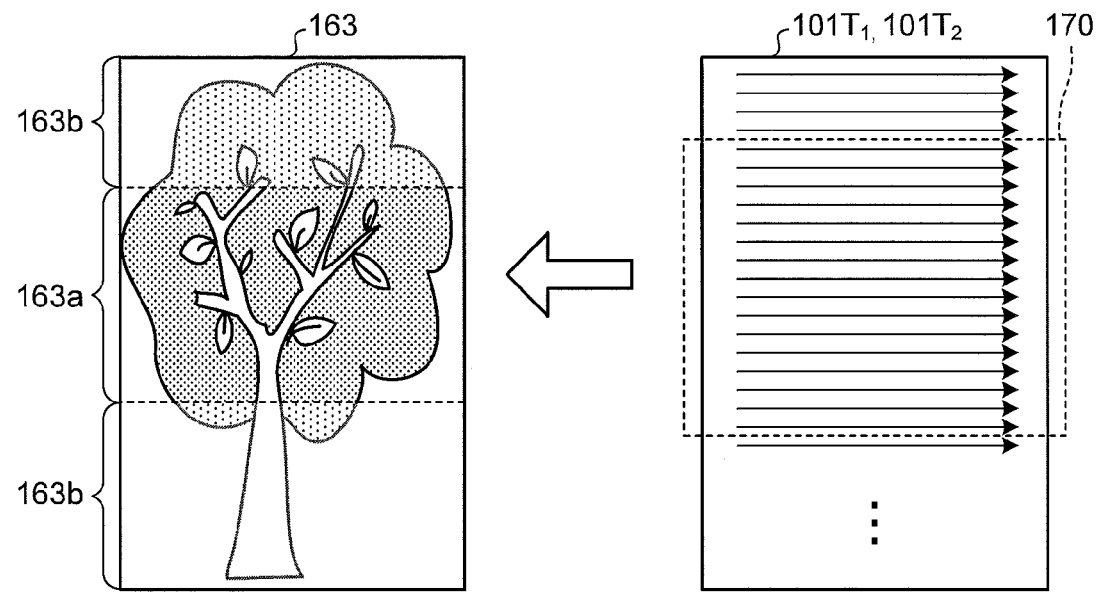
FIG. 15B is a schematic diagram illustrating the access control of a memory according to the embodiment.

This will be described more in detail with reference to FIG. 15B. The left side in FIG. 15B is an image of an image 163 formed of the image data item D$_1$ stored on the memory T$_1$. In the image 163, suppose that the region to be practically projected is a projection region 163a and the other regions 163b are regions not to be projected. In this case, the image control unit 103 specifies, to the memory T$_1$, a cut-out region 170 greater by the number of lines corresponding to a change in the case where the projection angle θ of the projector lens 12 is changed at the maximum in the period of at least two vertical synchronization signals VD than the region of the image data corresponding to the image of the projection region 163a.

The image cutting out unit 100 reads the image data out of the cut-out region 170 at the timing of the vertical synchronization signal VD subsequent to the vertical synchronization signal VD at which the image data item D$_1$ is written on the memory T$_1$. In this manner, the image data to be projected is read out of the memory T$_1$ at the timing of the projection angle θ$_3$, supplied to the display device 114 through the image processing unit 102 in the subsequent stage, and projected from the projector lens 12.

The image data item D$_2$ is inputted to the image cutting out unit 100 at the timing of the vertical synchronization signal VD subsequent to the vertical synchronization signal VD at which the image data item D$_1$ is inputted. At this timing, the image data item D$_1$ is written on the memory Y$_1$. Therefore, the image cutting out unit 100 writes the image data item D$_2$ on the memory Y$_2$ (at timing WD$_2$ in the chart 215 in FIG. 13). The order of writing the image data item D$_2$ on the memory Y$_2$ at this time is the same as the order of writing the image data item D$_1$ on the memory Y$_1$ described above, and the image is also the same (see FIG. 14B).

In other words, the image cutting out unit 100 reads the image data item D$_2$ to the pixel at the top end of the image for the individual pixels sequentially across the lines in the vertical direction as the pixel at the lower left corner of the image is a pixel to start read, and then reads the pixels in the vertical direction as the pixel on the right side of the pixel at the read start position in the vertical direction is the pixel to start read (at timing $RD_2$ in the chart 215 in FIG. 13). This operation is repeated until the read of the pixel at the upper right corner of the image is finished. The image cutting out unit 100 sequentially writes the pixels of the image data item $D_2$ read out of the memory $Y_2$ in this manner on the memory $T_2$ for the individual pixels toward the line direction (at timing $WD_2$ in the chart 216 in FIG. 13) (see the left side in FIG. 15A).

The image cutting out unit 100 specifies, to the memory $T_2$, the addresses of the cut-out region specified to the image control unit 103, and reads the image data of the region to be the cut-out region out of the memory $T_2$ at timing $RD_2$ in the chart 216 in FIG. 13. At this time, as described above, the image control unit 103 specifies, to the memory $T_2$, the region greater than the region of the image data corresponding to the image to be projected with a margin of a change in the projection angle θ as the cut-out region 170.

The image cutting out unit 100 reads the image data out of the cut-out region 170 at the timing of the vertical synchronization signal VD subsequent to the vertical synchronization signal VD at which the image data item $D_2$ is written on the memory $T_2$. In this manner, the image data of the cut-out region 170 of the image data item $D_2$ inputted to the image cutting out unit 100 at the timing of the projection angle $\theta_2$ is read out of the memory $T_2$ at the timing of the projection angle $\theta_4$, supplied to the display device 114 through the image processing unit 102 in the subsequent stage, and projected from the projector lens 12.

After that, similarly, the image data item $D_3$, $D_4$, $D_5$, and so on are sequentially processed alternately using a set of the memories $Y_1$ and $T_2$ and a set of the memories $Y_2$ and $T_2$.

As described above, in the embodiment, the memory 101 is provided with the regions of the memories $Y_1$ and $Y_2$ in the size of an array of 1,920 pixels wide×1,080 pixels (lines) high for use in writing and reading image data and the regions of the memories $T_2$ and $T_2$ in the size of an array of 1,080 pixels wide×1,920 pixels (lines) high for use in writing and reading image data. This is because generally, a DRAM (Dynamic Random Access Memory) for use in an image memory has an access speed slower in access in the vertical direction than access in the horizontal direction. Such a configuration may be fine in which as different from the DRAM, in the case of using another memory capable of easy random access in which an equivalent access speed is obtained in the horizontal direction and in the vertical direction, two faces of the memory are used in the capacity matched with image data.

Figure 16A:
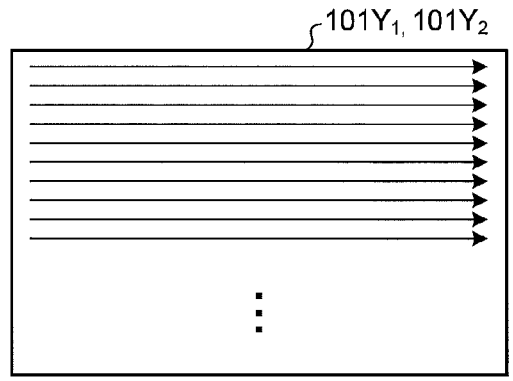
FIG. 16A is a schematic diagram illustrating the access control of a memory according to the embodiment.
Figure 16B:
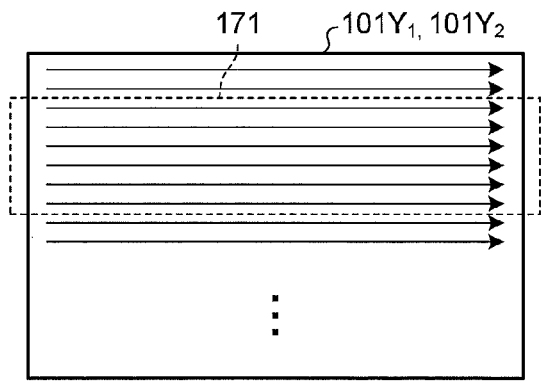
FIG. 16B is a schematic diagram illustrating the access control of a memory according to the embodiment.

It may be fine that in the case where the image data inputted to the image cutting out unit 100 is in the size of an array of 1,920 pixels wide×1,080 pixels (lines) high, as illustrated in FIG. 16A, the image cutting out unit 100 writes the image data on the memory $101Y_1$ (or the memory $101Y_2$) without replacing the horizontal direction by the vertical direction, and as illustrated in FIG. 16B, the image control unit 103 specifies the region of a plurality of lines of the image data as a cut-out region 171, not limited to the description above. In this case, the image of the image data read out of the cut-out region 171 by the image cutting out unit 100 is projected from the projector lens 12.

Figure 16C:
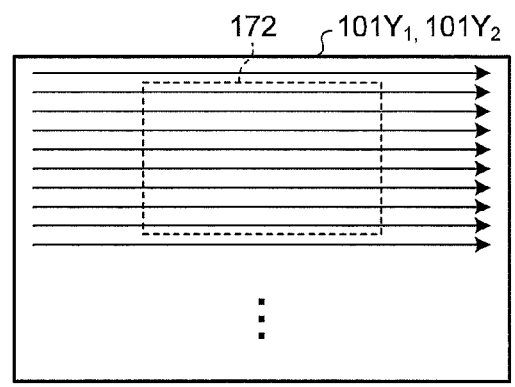
FIG. 16C is a schematic diagram illustrating the access control of a memory according to the embodiment.

Moreover, it may be fine that as illustrated in FIG. 16C, the image control unit 103 specifies a given rectangular region 172 as a cut-out region with respect to the image data written on the memory $101Y_1$. In this case, the image data read out of the memory $101Y_1$ by the image cutting out unit 100 as the cut-out region of this rectangular region 172 is supplied to the image processing unit 102. As described above, the image processing unit 102 applies image processing to the supplied image data, and the image data of the cut out region is projected from the projector lens 12. In the case of FIGS. 16B and 16C, the memories $101Y_1$ and $101Y_2$ are used as sequentially switched, which are in the size of an array of 1,920 pixels wide×1,080 pixels (lines) high for use in writing and reading the image data.

Furthermore, in this case, in the case where the region that the image data inputted to the image cutting out unit 100 is cut out is set in advance, it is unnecessary to write all the region of the inputted image data on the memory $101Y_1$, for example. In other words, the image cutting out unit 100 writes, on the memory $101Y_1$, for example, image data added with image data including the lines of the projection angle θ delayed by access control described above with respect to the image data in the region corresponding to the image to be projected.

Figure 17A:
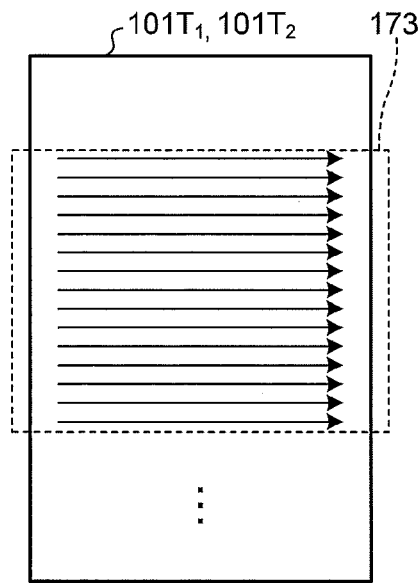
FIG. 17A is a schematic diagram illustrating the access control of a memory according to the embodiment.
Figure 17B:
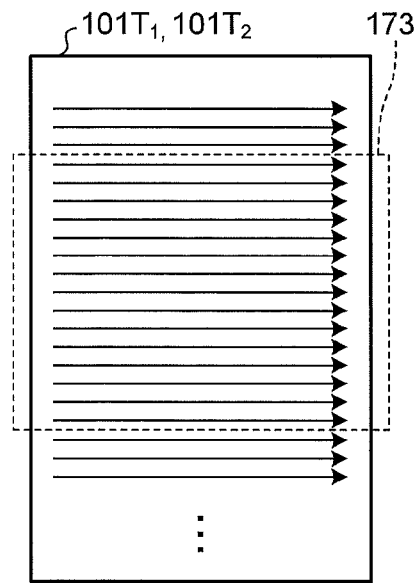
FIG. 17B is a schematic diagram illustrating the access control of a memory according to the embodiment.
Figure 17C:
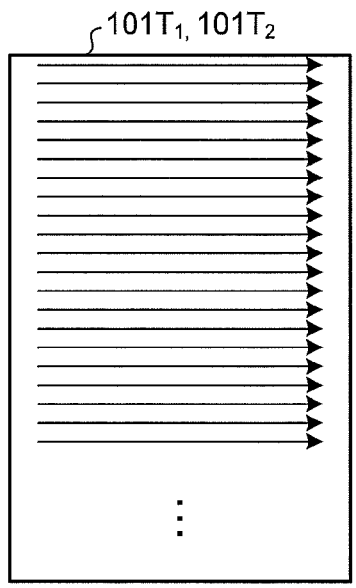
FIG. 17C is a schematic diagram illustrating the access control of a memory according to the embodiment.

The writing data on and reading data out of the memory $101T_1$ and $101T_2$ are the same. In other words, in the case where the region that the image data inputted to the image cutting out unit 100 is cut out is set in advance, it is unnecessary to write all the region of the inputted image data on the memory $101T_1$, for example. In other words, as illustrated in FIG. 17A, the image cutting out unit 100 writes, on the memory $101T_1$, for example, image data 173 added with the lines of the projection angle θ delayed by access control described above with respect to the image data in the region corresponding to the image to be projected. Similarly in the case of reading, the image cutting out unit 100 reads only the image data 173 written on the memory $101T_1$, for example (FIG. 17B).

Figure 17D:
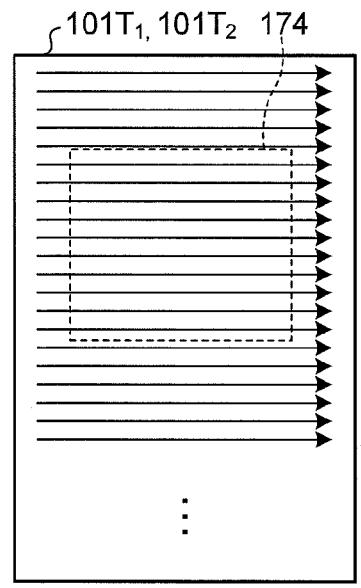
FIG. 17D is a schematic diagram illustrating the access control of a memory according to the embodiment.

In addition, it may be fine that in the case where the image data in the size of an array of 1,920 pixels wide×1,080 pixels (lines) high inputted to the image cutting out unit 100 is written on the memory $T_1$ as the horizontal direction is replaced by the vertical direction according to the method described with reference to FIGS. 14A to 14C (see FIG. 17C), as illustrated in FIG. 17D, the image control unit 103 specifies a given rectangular region 174 as a cut-out region to the memory T. In this case, the image data read out of the memory $101T_1$ as this rectangular region 174 is the cut-out region by the image cutting out unit 100 is supplied to the image processing unit 102. As described above, the image processing unit 102 applies image processing to the supplied image data, and the image data of the cut out region is projected from the projector lens 12.

Flow of a Process of Projecting Image Data

Figure 18:
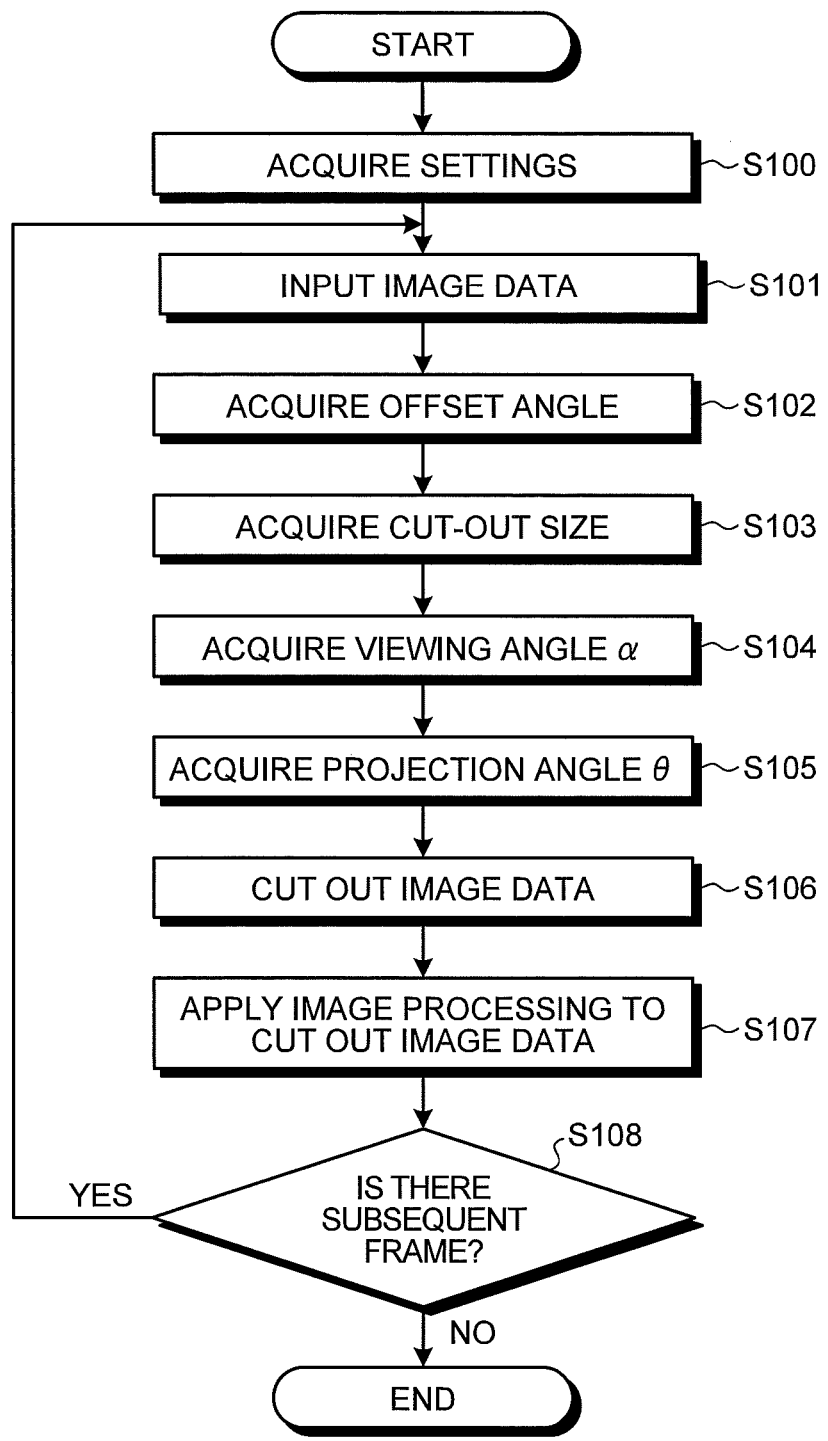
FIG. 18 is a flowchart illustrating an exemplary process flow in projecting an image formed of image data in the projector apparatus according to the embodiment.

Next, a flow of a process in projecting the image formed of image data in the projector apparatus 1 will be described with reference to a flowchart in FIG. 18.

In step S100, in association with the input of image data, various set values for projecting the image of the image data are inputted to the projector apparatus 1. The various inputted set values are acquired by the CPU 120, for example. These various set values acquired here include a value expressing whether the image of the image data is rotated, for example, that is, a value expressing whether the horizontal direction of the image is replaced by the vertical direction, the magnification of the image, and the offset angle $\theta_{ofst}$ in projecting the image. It may be fine that these various set values are inputted to the projector apparatus 1 as data in association with the input of image data to the projector apparatus 1 or inputted by manipulating the manipulating unit 14.

In subsequent step S101, the image data of a single frame is inputted to the projector apparatus 1, and the image cutting out unit 100 acquires the inputted image data. The acquired image data is written on the memory 101.

In subsequent step S102, the image control unit 103 acquires the offset angle $\theta_{ofst}$. In subsequent step S103, the image control unit 103 acquires the cut-out size, that is, the size of the cut-out region in the inputted image data. The image control unit 103 may acquire the size of the cut-out region from the set values acquired in step S100 or may acquire the size of the cut-out region according to the manipulation of the manipulating unit 14. In subsequent step S104, the image control unit 103 acquires the viewing angle α of the projector lens 12. The image control unit 103 acquires the viewing angle α of the projector lens 12 from the viewing angle control unit 106, for example. Moreover, in subsequent step S105, the image control unit 103 acquires the projection angle θ of the projector lens 12 from the rotation control unit 104, for example.

In subsequent step S106, the image control unit 103 finds the cut-out region with respect to the inputted image data using Expression (3) to Expression (8) described above based on the offset angle $\theta_{ofst}$, the size of the cut-out region, the viewing angle α, and the projection angle θ acquired in step S102 to step S105. The image control unit 103 instructs the image cutting out unit 100 to read image data out of the found cut-out region. The image cutting out unit 100 follows the instruction from the image control unit 103, and reads the image data in the cut-out region out of the image data stored on the memory 101. The image cutting out unit 100 supplies the image data of the cut-out region read out of the memory 101 to the image processing unit 102.

In step S107, the image processing unit 102 applies the size conversion process to the image data supplied from the image cutting out unit 100 according to Expression (1) and Expression (2) described above, for example. The image data subjected to the size conversion process at the image processing unit 102 is supplied to the display device 114. The display device 114 modulates light from the light source 111 in accordance with the image data, and emits the light. The emitted light is projected from the projector lens 12.

In subsequent step S108, the CPU 120 determines whether there is the input of image data of the frame subsequent to the image data inputted in step S101 described above. In the case where it is determined that there is the input of image data of the subsequent frame, the CPU 120 returns the process to step S101, and applies the processes in step S101 to step S107 described above to the image data of the subsequent frame. In other words, the processes in step S101 to step S107 are repeated in the unit of the frame of image data according to the vertical synchronization signal VD of the image data, for example. Therefore, the projector apparatus 1 can follow the processes with respect to a change in the projection angle θ in units of frames.

On the other hand, in step S108, in the case where it is determined that the image data of the subsequent frame is not inputted, the CPU 120 stops the operation of projecting the image in the projector apparatus 1. For example, the CPU 120 controls the light source 111 to be turned off and instructs the rotating mechanism unit 115 to return the attitude of the drum unit 10 to the initial attitude. After the attitude of the drum unit 10 is returned to the initial attitude, the CPU 120 then stops the fan that cools the light source 111 or the like.

As described above, according to the projector apparatus 1, the image projection can be performed in which the user easily grasps the position of the projected subject image in the image of the inputted image data while maintaining the resolution of image data.

It is noted that in the foregoing embodiment, the example is shown in which the drum unit 10 included in the projector apparatus 1 is rotated only in the vertical direction with respect to the base 20, and the projecting direction of the projector lens 12 is changed only in the vertical direction. However, the rotation and the change are not limited to the vertical direction. For example, the present invention is applied also to a projector having a configuration in which panning and tilting can be performed and in which the projecting direction of the projecting unit can be changed in the horizontal direction or in the vertical direction, and the effect can be obtained.

A Heat Dissipation Structure Applicable to the Embodiment

Next, a heat dissipation structure applicable to the embodiment will be described. As already explained, in the projector apparatus 1 according to the embodiment, the cooling unit such as a fan is provided in the drum unit 10 for cooling the optical engine unit 110 or the like. Here, for example, when the amount of rotation of the fan is made uniform and ventilation by the fan or the like is performed regardless of a change in the projection attitude, it is likely that heat dissipation efficiency is degraded depending on the projection attitude due to the relationship of the position of the air intake and exhaust hole 23 provided on the drum unit 10. Moreover, when the rotation direction of the fan is made uniform, the discharge direction of an exhaust air blow is changed every time for the main body of the projector apparatus 1 in association with the rotation of the drum unit 10, and it is likely that the user directly receives a hot blast depending on the attitude.

In a first example of a heat dissipation structure applicable to the embodiment and a second example and a third example of a heat dissipation structure applicable to the embodiment, described later, the projector apparatus 1 according to the embodiment described above is added with a configuration in consideration of heat dissipation, and the problem described above is solved.

Figure 19:
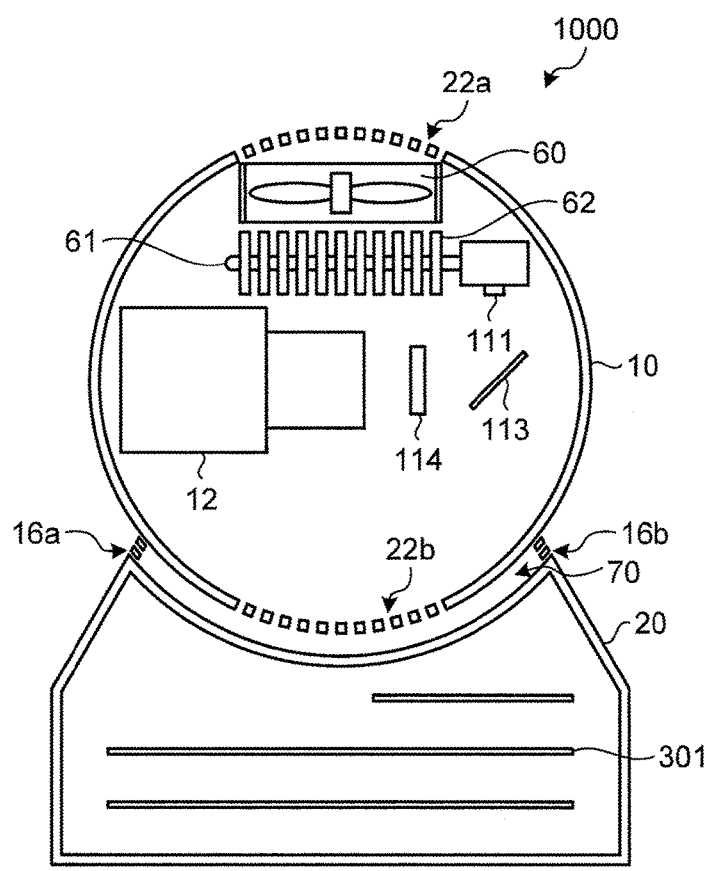
FIG. 19 is a cross sectional view illustrating the internal structure of a projector apparatus according to a first example of a heat dissipation structure applicable to the embodiment.

The Internal Configuration of a Projector Apparatus According to a First Example of a Heat Dissipation Structure Applicable to the Embodiment The internal structure of a projector apparatus according to a first example of a heat dissipation structure applicable to the embodiment will be described. FIG. 19 is a cross sectional view illustrating the internal structure of a projector apparatus 1000 according to the first example of the heat dissipation structure. It is noted that in FIG. 19, components common in the components in FIGS. 1A, 1B, 2A, 2B, 4, and the like are designated the same reference numerals and signs, and the detailed description is omitted.

In the projector apparatus 1000 according to the first example of the heat dissipation structure, a drum unit 10 includes a light source 111, a projector lens 12, a display device 114, a mirror 113, a light source 111, a heat sink formed of a heat pipe 61 and a fin 62 as a heat dissipation member, and a fan 60 in the inside of the drum unit 10.

Here, the projector lens 12, the display device 114, and the mirror 113 configure an optical engine unit 110 as an optical mechanism that modulates light emitted from the light source 111 based on the image data of a projection object and projects the light to the outside of the projector apparatus 1000.

As illustrated in FIG. 19, an air intake and exhaust hole 22a is provided on the circumferential surface of the drum unit 10 upward from the projecting direction of light through the projector lens 12 at an angle of 90°. An air intake and exhaust hole 22b is provided on the circumferential surface of the drum unit 10 downward from the projecting direction of light through the projector lens 12 at an angle of 90° in symmetry to the air intake and exhaust hole 22a. It is noted that the positions of the air intake and exhaust hole 22a and the air intake and exhaust hole 22b are not limited to at an angle of 90° upward and downward from the projecting direction as long as the air intake and exhaust hole 22a and the air intake and exhaust hole 22b are disposed in such a manner that the air intake and exhaust hole 22a and the air intake and exhaust hole 22b are provided in symmetry to the rotating shaft of the drum unit 10 at the center position and an efficient air flow is obtained for air intake and exhaust at an angle different from the projecting direction of light.

The projector lens 12 is disposed toward the outer circumference of the drum unit 10 in such a manner that the optical axis of the projector lens 12 is passed through the rotating shaft of the drum unit 10 at the center position and perpendicular to the line segment connecting the centers of the two air intake and exhaust holes 22a and 22b on the outer circumference of the drum unit 10. The display device 114 and the mirror 113 are disposed in the radial direction of the drum unit 10 along the optical axis of the projector lens 12 with respect to the center position of the drum unit 10.

The light source 111 is connected to the heat pipe 61 in a nearly straight shape, and mounted at the end portion located on the opposite side of the projector lens 12 in the orientation in which light is emitted toward the mirror 113.

The heat sink formed of the heat pipe 61 and the fin 62 is disposed between the optical axis and the air intake and exhaust hole 22a. The heat pipe 61 is provided with a plurality of the fins 62 that improves heat dissipation efficiency.

The fan 60 is disposed between the heat pipe 61 and the air intake and exhaust hole 22a on the outer circumference of the drum unit 10, and the blade portion of the fan 60 is directed to the air intake and exhaust hole 22a. Thus, the fan 60 can suck air from the air intake and exhaust hole 22a and exhaust air to the air intake and exhaust hole 22b, or can suck air from the air intake and exhaust hole 22b and exhaust air to the air intake and exhaust hole 22a.

As illustrated in FIG. 19, a plurality of substrates 301 is provided in the base 20 on which circuit units are mounted for controlling various units and for image processing, for example. The base 20 rotatably supports the drum unit 10 in the state in which a gap 70 is provided, which is formed between the upper wall surface of the base 20 and the outer circumferential surface of the drum unit 10.

The gap 70 serves as a duct in a heat dissipation control process of the projector apparatus 1000 described later. In other words, a hot blast discharged from the air intake and exhaust holes 22a and 22b of the drum unit 10 is flowed in the gap 70 and discharged from air intake and exhaust hole 16a or 16b of the base 20. At this time, the upper wall surface of the base 20 can prevent the event that a hot blast discharged from the air intake and exhaust holes 22a and 22b of the drum unit 10 is flowed into the base 20 and affects the substrates 301 in the inside in association with the heat dissipation control process. Moreover, the gap 70 also serves as a passage in the supply of outside air taken from the air intake and exhaust holes 16a and 16b to the inside of the drum unit 10 through the air intake and exhaust holes 22a and 22b. In the following, the gap 70 is sometimes referred to as a duct 70.

As described above, in the first example of the heat dissipation structure, the drum unit 10 is rotatably provided on the base 20 including the manipulating unit 14 in order to improve the ease of user manipulation, and thus the gap 70 is provided between the drum unit 10 and the base 20. The heat dissipation of the drum unit 10 and the heat dissipation of the base 20 are independently performed using the gap 70. In other words, in the drum unit 10, it is possible that the number of revolutions of the fan 60 is controlled according to the ratio of the overlap between the air intake and exhaust hole 22a or 22b and the gap 70 independently from the base 20 and heat dissipation efficiency is improved, whereas in the base 20, heat dissipation efficiency can be improved separately from the heat dissipation process of the drum unit 10.

The spacing between the outer wall of the drum unit 10 and the upper wall surface of the base 20, that is, the gap is 3 mm or less. The gap 70 is surrounded by the drum unit 10 and the upper wall surfaces of the base 20 and the wall surface including the air intake and exhaust holes 16a and 16b formed of a large number of holes in a small diameter. Thus, such an event can be prevented that the user accidentally inserts a finger between the drum unit 10 and the base 20 in rotationally driving the drum unit 10.

The Attitude of the Drum Unit 10

Figure 20:
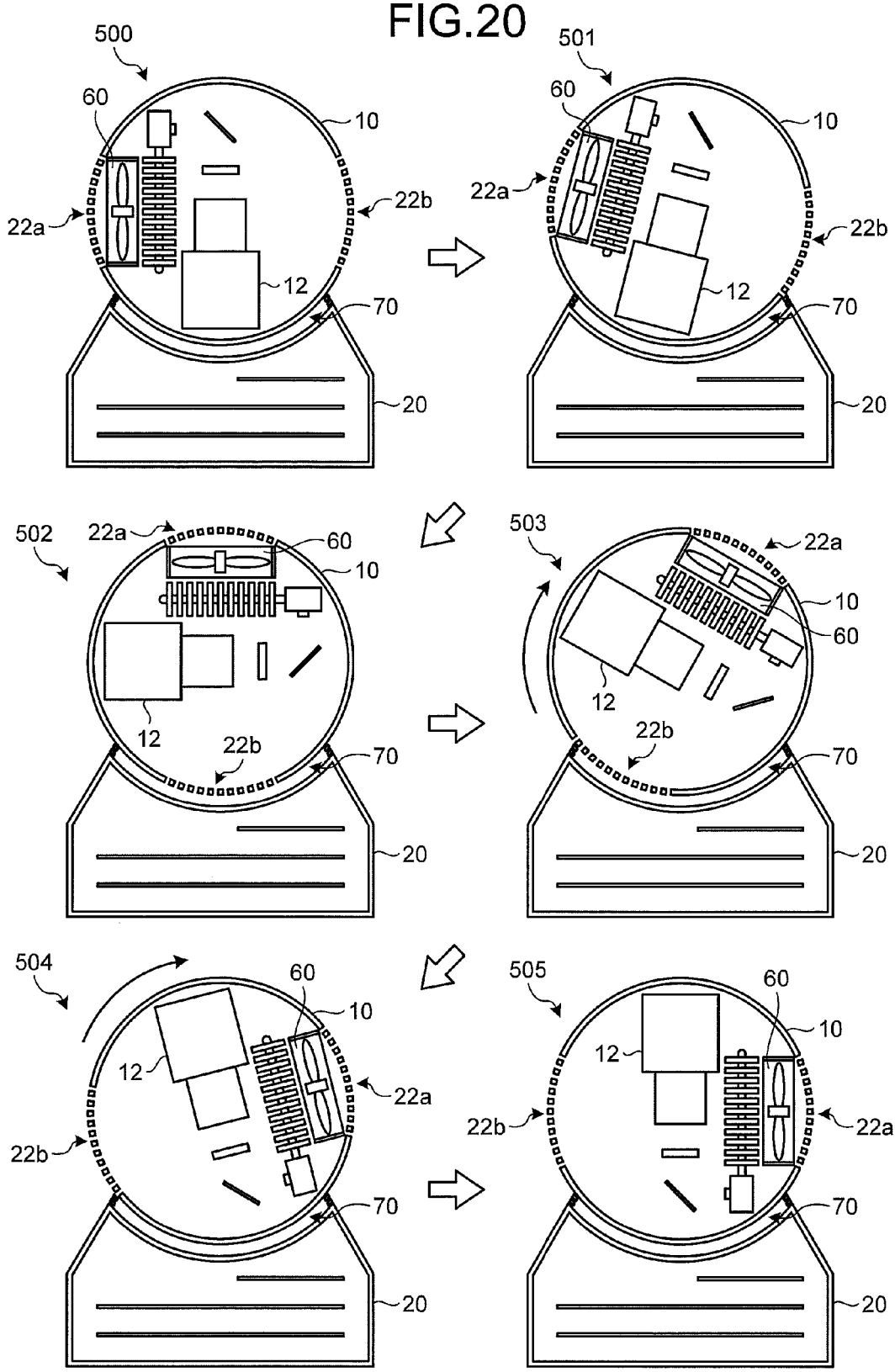
FIG. 20 is a diagram illustrating the attitude of a drum unit according to the first example of the heat dissipation structure applicable to the embodiment.
Figure 21:
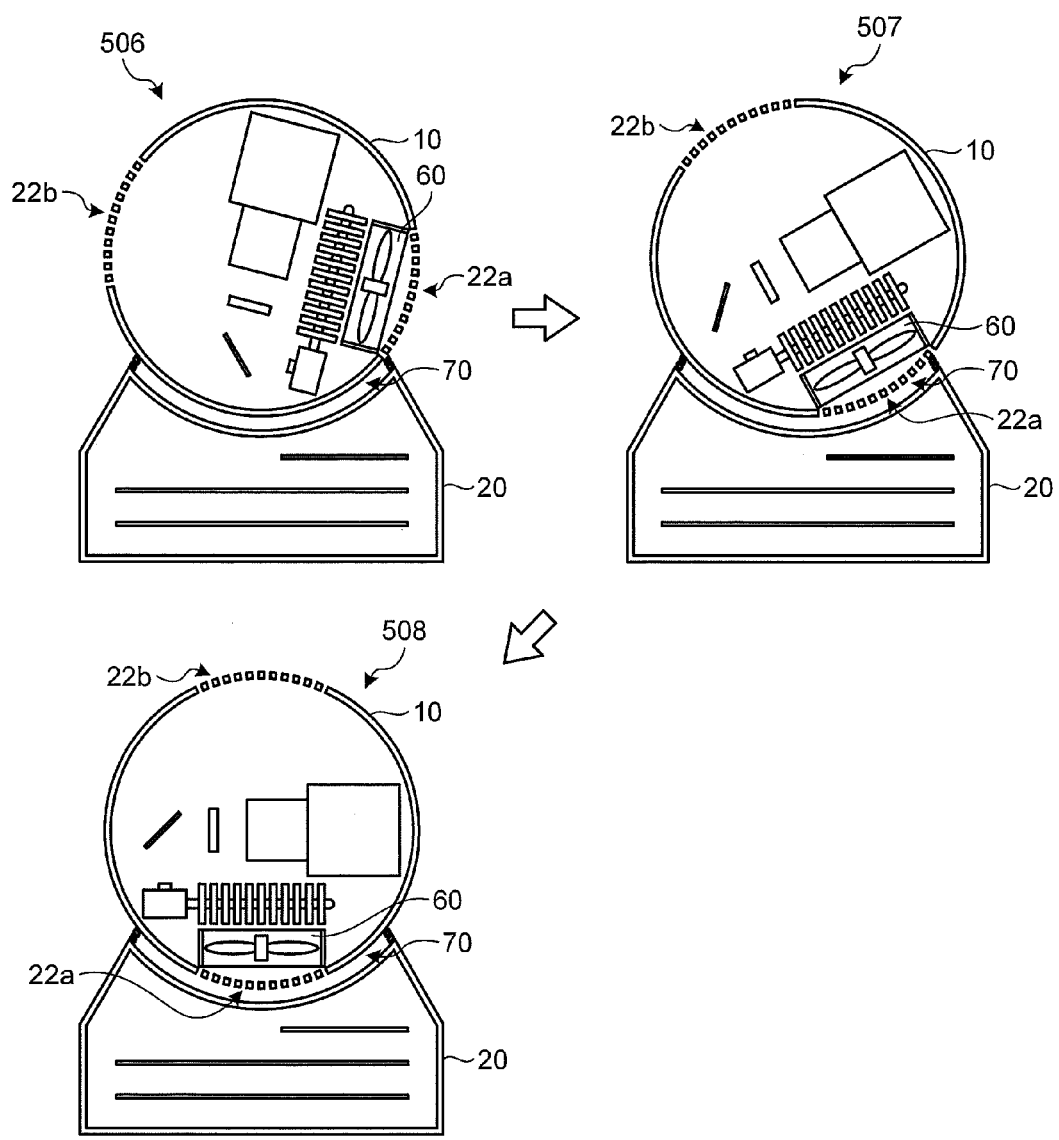
FIG. 21 is a diagram illustrating the attitude of the drum unit according to the first example of the heat dissipation structure applicable to the embodiment.

In the configuration as described above, the attitude of the drum unit 10 by rotating the drum unit 10 will be described. FIGS. 20 and 21 are diagrams illustrating the attitude of the drum unit 10.

In the first example of the heat dissipation structure, the initial attitude of the drum unit 10 is defined as the attitude that the projecting direction of the projector lens 12 is directed to the vertical direction. The position of the projector lens 12 in the initial attitude is referred to as a reference position. Therefore, in the initial attitude, the projector lens 12 is completely hidden behind the base 20. In FIG. 20, the state of the drum unit 10 in the initial attitude is illustrated as a state 500. In the first example of the heat dissipation structure, a projection 46a is detected by a photointerrupter 51b in the initial attitude, and an angle derivation unit 116, described later, determines that the drum 30 reaches the starting point of the rotation operation.

It is noted that in the following, the drum angle means the rotation angle from the reference position of the projector lens 12 in the initial attitude described above.

When the projector apparatus 1000 is started, the drive unit 32 starts the rotation of the drum unit 10 in such a manner that the drum unit 10 is directed to the first face side. After that, in the drum unit 10, the air intake and exhaust hole 22b starts to overlap with the duct 70, and the area of the air intake and exhaust hole 22b overlapping with the duct 70 is gradually increased. The attitude of the drum unit 10 at this time is referred to as a first attitude, and is illustrated as a state 501 in FIG. 20.

Moreover, when the drum unit 10 is rotated, the direction of the drum unit 10, that is, the projecting direction of the projector lens 12 is at a position horizontal on the first face side. The drum angle is at an angle of 90° from the reference position of the projector lens 12 in the case where the projecting direction of the projector lens 12 becomes horizontal on the first face side. The attitude of the drum unit 10 at this time is referred to as a second attitude, and illustrated as a state 502 in FIG. 20. As illustrated in the state 502, in the second attitude, the air intake and exhaust hole 22b is fully overlapped with the duct 70.

The drum unit 10 temporarily stops the rotation when the drum unit 10 is rotated and in the second attitude. The user manipulates the manipulating unit 14 to turn on the light source 111, and in the drum unit 10, light emitted from the light source 111 is modulated by the display device 114 driven by the drive circuit in accordance with image data inputted to the projector apparatus 1000, and entered into the optical system. The light modulated in accordance with image data is then projected in the horizontal direction from the projector lens 12 onto a projected medium such as a screen and a wall surface.

The user manipulates the manipulating unit 14, so that the drum unit 10 can be further rotated about the rotating shaft 36 while performing projection from the projector lens 12 in accordance with the image data. When the drum unit 10 is further rotated in the normal direction from the second attitude, the air intake and exhaust hole 22b does not overlap with the duct 70 when the drum angle from the reference position takes an angle of about 135°, and the area of the air intake and exhaust hole 22b overlapping with the duct 70 is gradually reduced. The attitude of the drum unit 10 at this time is referred to as a third attitude, and illustrated as a state 503 in FIG. 20.

The drum unit 10 is further rotated in the normal direction from the third attitude, and the air intake and exhaust hole 22b is not fully overlapped with the duct 70 when the drum angle from the reference position takes an angle of about 160°. The attitude of the drum unit 10 at this time is referred to as a fourth attitude, and illustrated as a state 504 in FIG. 20.

When the drum unit 10 is further rotated in the normal direction from the fourth attitude, the drum angle from the reference position takes an angle of 180°, and light from the projector lens 12 can be projected in the vertically upward orientation. The attitude of the drum unit 10 at this time is referred to as a fifth attitude, and illustrated as a state 505 in FIG. 20. In the fifth attitude, as illustrated in the state 505, the air intake and exhaust hole 22b is not fully overlapped with the duct 70.

The drum unit 10 is further rotated in the normal direction from the fifth attitude, the end portion of the air intake and exhaust hole 22a starts to overlap with the duct 70 when the drum angle from the reference position takes an angle of about 200°, and the area of the air intake and exhaust hole 22a overlapping with the duct 70 is gradually increased. The attitude of the drum unit 10 at this time is referred to as a sixth attitude, and illustrated as a state 506 in FIG. 21.

The drum unit 10 is further rotated in the normal direction from the sixth attitude, the air intake and exhaust hole 22a does not overlap with the duct 70 when the drum angle from the reference position takes an angle of 225°, and the area of the air intake and exhaust hole 22a is fully overlapped with the duct 70. The attitude of the drum unit 10 at this time is referred to as a seventh attitude, and illustrated as a state 507 in FIG. 21.

The drum unit 10 is further rotated in the normal direction from the seventh attitude, and then the drum angle from the reference position takes an angle of 270°. In this case, the projector lens 12 is directed to the second face side opposite to the first face side on which the manipulating unit 14 is provided. The attitude of the drum unit 10 at this time is referred to as an eighth attitude, and illustrated as a state 508 in FIG. 21. In the eighth attitude, the projection 46b is detected by the photointerrupter 51a, and the angle derivation unit 116, described later, determines that the end point of the rotation operation of the drum 30 is reached.

In the projector apparatus 1000 according to the first example of the heat dissipation structure, the drum unit 10 is rotated as illustrated in the state 500 to the state 508 for example, while performing projection, so that the projection region of image data can be moved according to the drum angle of the projector lens 12. Moreover, the content of the projected image and a change in the projection position of the projected image on the projected medium may be associated with the content of a cut-out image region which is an image to be projected in the entire image region of the inputted image data and a change in the position.

When the user ends the projection of the projection image by the projector apparatus 1000 and stops the projector apparatus 1000 by manipulating "the end button" of the manipulating unit 14, for example, the rotation of the drum unit 10 is first controlled in such a manner that the drum unit 10 is returned to the initial attitude. When it is detected that the drum unit 10 is directed to the vertical direction and returned in the initial attitude, the light source is turned off, and the power supply is turned off after a lapse of a predetermined time period necessary to cool the light source.

The Functional Configuration of the Projector Apparatus 1000

Figure 22:
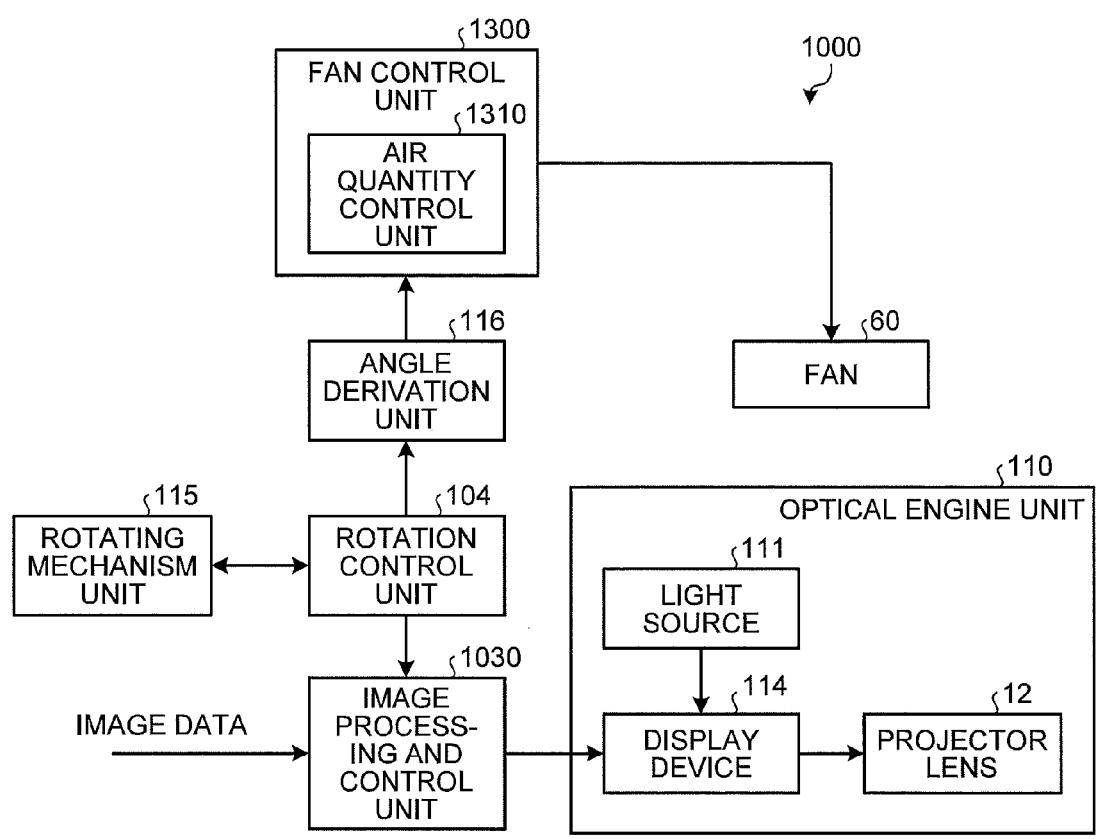
FIG. 22 is a block diagram illustrating the functional configuration of the projector apparatus according to the first example of the heat dissipation structure applicable to the embodiment.

Next, the configuration that implements the functions and operations of the projector apparatus 1000 according to the first example of the heat dissipation structure as described above will be described. FIG. 22 is a block diagram illustrating the functional configuration of the projector apparatus 1000. It is noted that in FIG. 22, components common in the components in FIG. 4 described above are designated the same reference numerals and signs, and the detailed description is omitted.

As illustrated in FIG. 22, in the projector apparatus 1000 according to the first example of the heat dissipation structure, the angle derivation unit 116 and a fan control unit 1300 are added with respect to the projector apparatus 1 according to the embodiment illustrated in FIG. 4. Here, an image processing and control unit 1030, a rotation control unit 104, a fan control unit 1300, and the angle derivation unit 116 are mounted on the substrate 301 of the base 20 as the circuit units.

It is noted that the image processing and control unit 103 includes the image cutting out unit 100, the memory 101, the image processing unit 102, and the image control unit 103 illustrated in FIG. 4 described above. The optical engine unit 110 includes the light source 111, the mirror 113, the display device 114, and the projector lens 12 as described above.

As described above, the optical engine unit 110 is provided in the drum unit 10 that can be rotated at a drum angle of 0° to a drum angle of 270° from the reference position by the rotating mechanism unit 115. The rotating mechanism unit 115 includes the drive unit 32 and the gear 35 which is the configuration on the drum unit 10 side described with reference to FIGS. 2A and 2B and rotates the drum unit 10 in a predetermined manner using the rotation of the motor 40.

The rotation control unit 104 receives the output signals of the photointerrupters 51a and 51b from the rotating mechanism unit 115. The rotation control unit 104 then determines that the attitude of the drum unit 10 is the attitude that the end point of the rotation operation is reached from the output signal expressing that the projection 46b is detected by the photointerrupter 51a. Moreover, the rotation control unit 104 determines that the attitude of the drum unit 10 is the attitude that the starting point of the rotation operation is reached, that is, the initial attitude from the output signal expressing that the projection 46a is detected by the photointerrupter 51b. In this case, the rotation control unit 104 sends a detection signal expressing that the attitude is the initial attitude to the angle derivation unit 116. Furthermore, the rotation control unit 104 supplies rotation instruction information expressing that the drum unit 10 is rotated to the image processing and control unit 1030.

The image processing and control unit 1030 performs image processing such as distortion correction for the inputted image data of the projection object based on the supplied rotation instruction information, and outputs the image data to be projected to the display device 114.

The angle derivation unit 116 receives the detection signal from the rotation control unit 104 expressing that the attitude is the initial attitude and the number of drive pulses sequentially sent from the motor 40. The angle derivation unit 116 then counts the number of drive pulses from the point in time when receiving the detection signal expressing the initial attitude, and derives the rotation angle of the drum unit 10 from the initial attitude, that is, the drum angle from the reference position of the projector lens 12 from the counted number of drive pulses.

More specifically, the angle derivation unit 116 stores the number of drive pulses and the drum angle from the reference position in association with each other in advance, and derives the drum angle corresponding to the counted number of drive pulses as the present drum angle from the initial attitude.

The fan control unit 1300 controls the drive of the fan 60. The fan control unit 1300 includes an air quantity control unit 1310. The air quantity control unit 1310 determines the positional relationship of the air intake and exhaust hole 22a or 22b to the duct 70 from the drum angle from the reference position of the projector lens 12 detected at the angle derivation unit 116, and controls the air quantity of the ventilation of the fan 60 from the positional relationship of the air intake and exhaust hole 22a or 22b to the duct 70. The air quantity control unit 1310 varies the drive voltage to the fan 60 to change the rotation speed of the fan 60, and thus controls the air quantity of ventilation. In other words, the air quantity control unit 1310 raises the voltage to increase the rotation speed of the fan 60, and thus increases the air quantity. On the other hand, the air quantity control unit 1310 drops the voltage to reduce the rotation speed of the fan 60, and thus decreases the air quantity.

In the case where the air quantity control unit 1310 according to the first example of the heat dissipation structure determines that the drum unit 10 is in the attitude at the position at which the air intake and exhaust hole 22a or 22b overlaps with the duct 70 from the drum angle derived at the angle derivation unit 116, the air quantity control unit 1310 sets the drive voltage of the fan 60 to a high voltage in such a manner that the rotation speed of the fan 60 is raised to increase the air quantity in proportion to the area of the air intake and exhaust hole 22a or 22b overlapping with the duct 70.

More specifically, in the case where the air quantity control unit 1310 determines that the drum unit 10 is in the attitude at the position at which the air intake and exhaust hole 22a or 22b overlaps with the duct 70 in the entire range, that is, the air intake and exhaust hole 22a or 22b is fully housed in the duct 70 from the drum angle, the air quantity control unit 1310 sets the drive voltage of the fan 60 to the highest voltage in such a manner that the rotation speed of the fan 60 is set at the maximum speed and the air quantity is at the maximum.

In the case where the air quantity control unit 1310 then determines that the area of the air intake and exhaust hole 22a or 22b overlapping with the duct 70 becomes gradually narrow from the drum angle, the air quantity control unit 1310 gradually sets the drive voltage of the fan 60 to the low voltage in such a manner that the rotation speed of the fan 60 is gradually reduced and the air quantity is made small. In this case, such a configuration may be fine in which the air quantity control unit 1310 gradually reduces the drive voltage of the fan 60 step by step, in addition to continuously and gradually reducing the drive voltage of the fan 60.

Moreover, in the case where the air quantity control unit 1310 determines that the drum unit 10 is in the attitude at the position at which the air intake and exhaust hole 22a or 22b does not overlap with the duct 70 in the entire range from the drum angle, the air quantity control unit 1310 sets the drive voltage of the fan 60 to the lowest voltage in such a manner that the rotation speed of the fan 60 is set to the lowest speed and the air quantity is at the minimum.

In the case where the air quantity control unit 1310 then determines that the area of the air intake and exhaust hole 22a or 22b overlapping with the duct 70 is gradually increased from the drum angle, the air quantity control unit 1310 gradually sets the drive voltage of the fan 60 to a high voltage in such a manner that the rotation speed of the fan 60 is gradually raised and the air quantity is increased. In this case, such a configuration may be fine in which the air quantity control unit 1310 gradually increases the drive voltage of the fan 60 step by step, in addition to continuously and gradually increasing the drive voltage of the fan 60.

Here, the correspondence between the drum angle and the state (the positional relationship) in which the air intake and exhaust hole 22a or 22b overlaps with the duct 70 is set in advance in the air quantity control unit 1310 as angle and overlap state correspondence table data. Suppose that the case where the air intake and exhaust hole 22a or 22b does not overlap with the duct 70 is referred to as "no overlap", the case where the air intake and exhaust hole 22a or 22b overlaps with the duct 70 in a part of the range is referred to as "a partial overlap", and the case where the entire range of the air intake and exhaust hole 22a or 22b is housed in (overlaps with) the duct 70 is referred to as "a full overlap", in the embodiment of the structure illustrated in FIG. 19, the drum angle and the overlapping range are in the correspondence relationship as shown in the angle and overlap state correspondence table data below. The air quantity control unit 1310 makes reference to the angle and overlap state correspondence table data below, determines the state in which the air intake and exhaust hole 22a or 22b of the drum unit 10 overlaps with the duct 70 from the drum angle sent from the angle derivation unit 116, and then performs the air quantity control.

Range of the Drum Angle: Overlapping State

Figure 23:
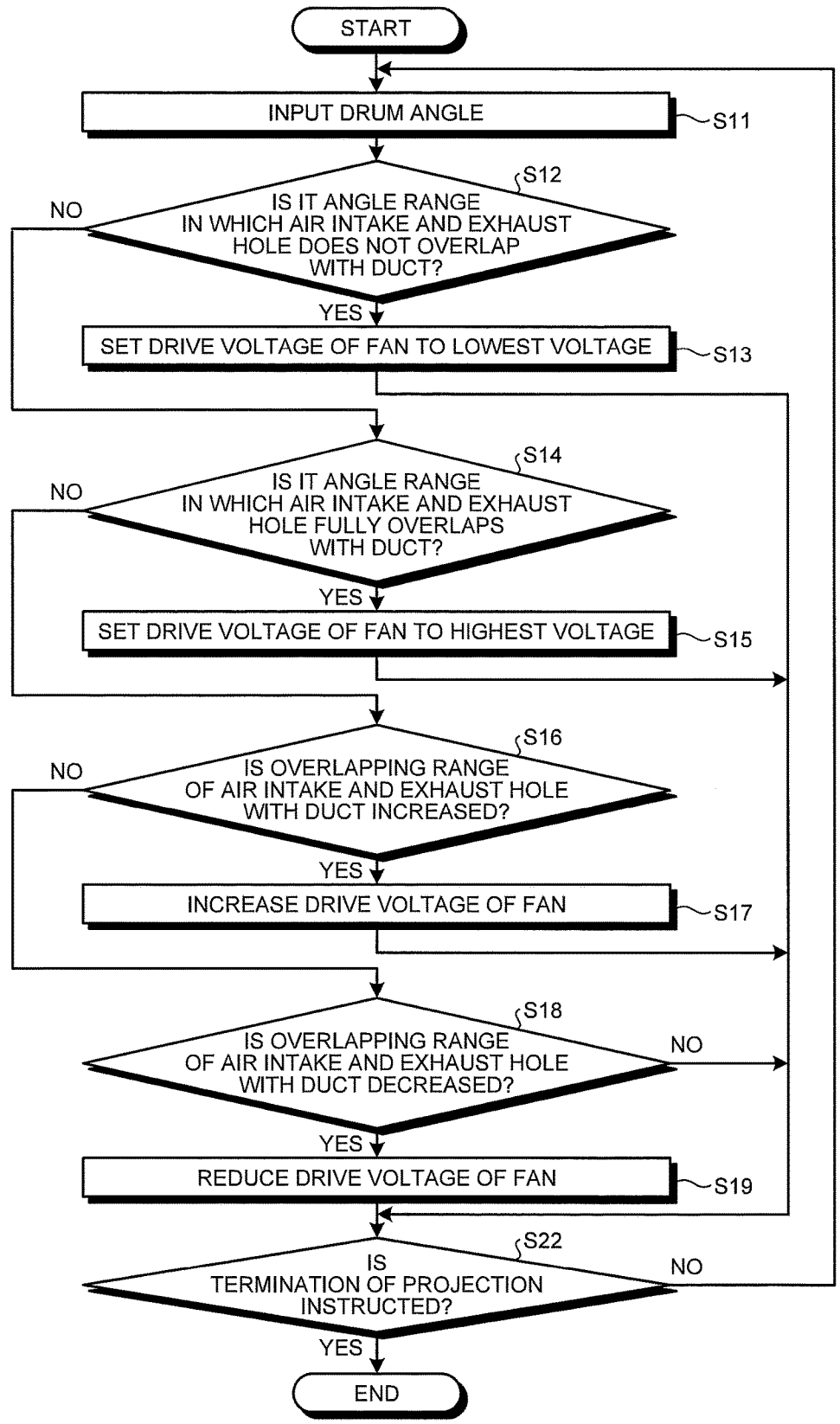
FIG. 23 is a flowchart illustrating the procedures of a fan control process according to the first example of the heat dissipation structure applicable to the embodiment.

A drum angle of 0° (the initial attitude) to an angle of about 10° (the first attitude): no overlap An angle of about 10° (the first attitude) to an angle of about 20°: partial overlap An angle of about 20° to an angle of about 135° (the third attitude): full overlap An angle of about 135° (the third attitude) to an angle of about 160° (the fourth attitude): partial overlap An angle of about 160° (the fourth attitude) to an angle of about 200° (the sixth attitude): no overlap An angle of about 200° (the sixth attitude) to an angle of 225° (the seventh attitude): partial overlap An angle of about 225° (the seventh attitude) to an angle of 270° (the seventh attitude): full overlap Next, the heat dissipation control process of the projector apparatus 1000 will be described. The projector apparatus 1000 can perform control to make heat dissipation efficiency appropriate in accordance with a change in the projecting direction by rotationally driving the drum unit 10. FIG. 23 is a flowchart illustrating the procedures of the heat dissipation control process by the projector apparatus 1000.

As described above, the angle derivation unit 116 derives the amount of a change in the angle of the projector lens 12 from the initial attitude caused by the rotation of the drum unit 10 as the drum angle from the reference position, and inputs the detected drum angle to the air quantity control unit 1310 of the fan control unit 1300 (step S11).

The air quantity control unit 1310 then determines whether the drum angle falls in the range included in the angle range in which the air intake and exhaust hole 22*a* or 22*b* does not overlap with the duct 70 with reference to the angle and overlap state correspondence table data (step S12). In the case where it is determined that the drum angle is included in the angle range in which the air intake and exhaust hole 22*a* or 22*b* does not overlap with the duct 70 (step S12: Yes), the air quantity control unit 1310 sets the drive voltage of the fan 60 to a settable lowest voltage (step S13), reduces the rotation speed of the fan 60 to the lowest speed, and sets the air quantity at the minimum.

In the case of the drum angle at which the air intake and exhaust hole 22*a* or 22*b* does not overlap with the duct 70, the fan 60 directly takes all the outside air from the air intake and exhaust hole 22*a* or 22*b* into the drum unit 10, not through the duct 70, and exhausts air from the other air intake and exhaust hole 22*b* or 22*a*. Thus, the air quantity of the fan 60 is at the minimum air quantity.

The fan control unit 1300 then determines the presence or absence of an instruction to terminate projection (step S22), and when the instruction to terminate projection is not made (step S22: No), the process is returned to step S11.

In step S12, in the case where it is determined that the drum angle is not included in the angle range in which the air intake and exhaust hole 22*a* or 22*b* does not overlap with the duct 70, that is, the drum angle is included in the angle range in which the air intake and exhaust hole 22*a* or 22*b* overlaps with the duct 70 (step S12: No), the air quantity control unit 1310 determines whether the drum angle is included in the angle range in which the air intake and exhaust hole 22*a* or 22*b* fully overlaps with the duct 70, that is, the drum angle is included in the angle range in which the entire range of the air intake and exhaust hole 22*a* or 22*b* is housed in the duct 70 with reference to the angle and overlap state correspondence table data (step S14).

In the case where it is determined that the drum angle is included in the angle range in which the air intake and exhaust hole 22*a* or 22*b* fully overlaps with the duct 70 (step S14: Yes), the air quantity control unit 1310 sets the drive voltage of the fan 60 to a settable highest voltage (step S15), increases the rotation speed of the fan 60 at the maximum speed, and the air quantity is set at the maximum. The fan control unit 130 then determines the presence or absence of the instruction to terminate projection (step S22), and when the instruction to terminate projection is not made (step S22: No), the process is returned to step S11.

In the case of the drum angle at which the entire range of the air intake and exhaust hole 22*a* or 22*b* is housed in the duct 70, it is necessary that the outside air of the projector apparatus 1000 be entered from the air intake and exhaust holes 16*a* and 16*b* of the duct 70 into the projector apparatus 1000, passed through the duct 70, taken from the air intake and exhaust hole 22*a* or 22*b* into the drum unit 10, and exhausted from the other air intake and exhaust hole 22*b* or 22*a*. Thus, it is necessary to increase the air quantity of the fan 60 more than a typical air quantity, and in the embodiment, the maximum air quantity is set.

In step S14, in the case where it is determined that the drum angle is not included in the angle range in which the air intake and exhaust hole 22*a* or 22*b* fully overlaps with the duct 70 (step S14: No), this expresses that a part of the range of the air intake and exhaust hole 22*a* or 22*b* overlaps with the duct 70. Thus, the air quantity control unit 1310 determines whether the area of the air intake and exhaust hole 22*a* or 22*b* overlapping with the duct 70 is increased since when the previous determination is made with reference to the angle and overlap state correspondence table data from the drum angle this time and the drum angle when the previous determination is made (step S16).

In the case where it is determined that the area of the air intake and exhaust hole 22*a* or 22*b* overlapping with the duct 70 is increased since when the previous determination is made from the drum angle when the previous determination is made (step S16: Yes), the air quantity control unit 1310 raises the drive voltage of the fan 60, and increases the air quantity (step S17). The fan control unit 130 then determines the presence or absence of the instruction to terminate projection (step S22), and when the instruction to terminate projection is not made (step S22: No), the process is returned to step S11.

In the case where the area of the air intake and exhaust hole 22*a* or 22*b* overlapping with the duct 70 is increased, the air quantity taken through the duct 70 is gradually increased as compared with the air taken from the outside, and the air quantity greater than the previous one is necessary. Thus, the air quantity control unit 1310 gradually raises the drive voltage of the fan 60, and gradually increases the air quantity.

In step S16, in the case where it is determined that the area of the air intake and exhaust hole 22*a* or 22*b* overlapping with the duct 70 is not increased since when the previous determination is made from the drum angle when the previous determination is made (step S16: No), the air quantity control unit 1310 determines whether the area of the air intake and exhaust hole 22*a* or 22*b* overlapping with the duct 70 is reduced since when the previous determination is made from the drum angle when the previous determination is made with reference to the angle and overlap state correspondence table data from the drum angle this time and the drum angle when the determination is made (step S18).

In the case where it is determined that the area of the air intake and exhaust hole 22*a* or 22*b* overlapping with the duct 70 is reduced since when the previous determination is made from the drum angle when the previous determination is made (step S18: Yes), the air quantity control unit 1310 drops the drive voltage of the fan 60, and reduces the air quantity (step S19). The fan control unit 130 then determines the presence or absence of the instruction to terminate projection (step S22), and when the instruction to terminate projection is not made (step S22: No), the process is returned to step S11.

In the case where the area of the air intake and exhaust hole 22*a* or 22*b* overlapping with the duct 70 is reduced, the air quantity directly taken from the outside is gradually increased as compared with the air taken from the duct 70, so that the air quantity as large as the previous one is unnecessary. Thus, the air quantity control unit 1310 gradually drops the drive voltage of the fan 60, and gradually reduces the air quantity.

In step S18, in the case where it is determined that the area of the air intake and exhaust hole 22*a* or 22*b* overlapping with the duct 70 is not reduced since when the previous determination is made from the drum angle when the previous determination is made (step S18: No), the fan control unit 130 determines the presence or absence of the instruction to terminate projection (step S22), and when the instruction to terminate projection is not made (step S22: No), the process is returned to step S11.

Here, in step S22, in the case where the instruction to terminate projection is made (step S22: Yes), the air quantity control unit 1310 ends the air quantity control process.

In the following, air quantity control in conformity with the rotation of the drum unit 10 according to the first example of the heat dissipation structure will be described. FIGS. 24 to 33 are diagrams illustrating an air flow of heat dissipation for the individual projection attitudes based on a change in the drum angle of the projector lens 12 from an angle of 0° to an angle of 270°.

Figure 24:
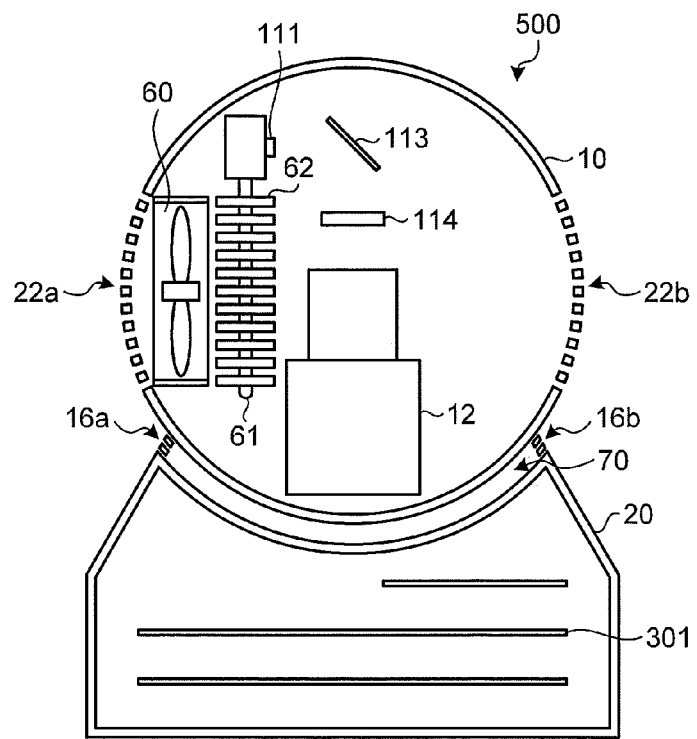
FIG. 24 is a diagram illustrating an air flow of heat dissipation for individual projection attitudes based on a change in a drum angle according to the first example of the heat dissipation structure applicable to the embodiment.

FIG. 24 is a diagram illustrating the projection attitude when the power supply of the projector apparatus 1000 is off, or when the projector apparatus 1000 is in a so-called standby state. It is noted that strictly speaking, although the projector apparatus 1000 does not perform projection at this time, a state 500 is also referred to as a projection attitude for convenience, and in the following, the description will be made in which in the state 500, the drum angle from the reference position of the projector lens 12 is at an angle of 0°. Moreover, as described above, the attitude of the drum unit 10 in the state 500 is referred to as the initial attitude.

In the case where the projector apparatus 1000 is in the initial attitude illustrated in FIG. 24, the power supply of the projector apparatus 1000 is off, or in a so-called standby state, and the fan 60 is stopped. When the power supply of the projector apparatus 1000 is then turned on, projection is started to rotate the drum unit 10, and thus the process by the fan control unit 1300 is started.

When the fan 60 is rotated from the initial attitude illustrated in FIG. 24, the air intake and exhaust hole 22a or 22b does not yet overlap with the duct 70, and the air quantity control unit 1310 controls the air quantity of the fan 60 at the minimum (step S13), and exhausts air from the air intake and exhaust hole 22b to the direction of the air intake and exhaust hole 22a.

Figure 25:
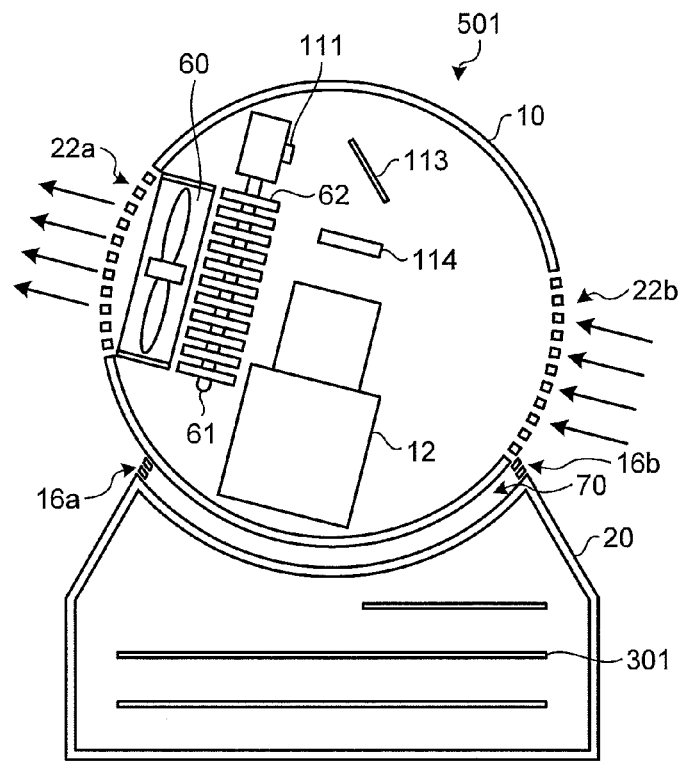
FIG. 25 is a diagram illustrating an air flow of heat dissipation for individual projection attitudes based on a change in the drum angle according to the first example of the heat dissipation structure applicable to the embodiment.

When the drum unit 10 is then further rotated in the normal direction and is in a state 501 in the first attitude illustrated in FIG. 25, the air intake and exhaust hole 22b starts to overlap with the duct 70, the drum unit 10 is further rotated in the normal direction, and the area of the air intake and exhaust hole 22b overlapping with the duct 70 is gradually increased. Thus, the air quantity control unit 1310 controls the air quantity of the fan 60 to gradually increase from the minimum air quantity (step S17).

Figure 26:
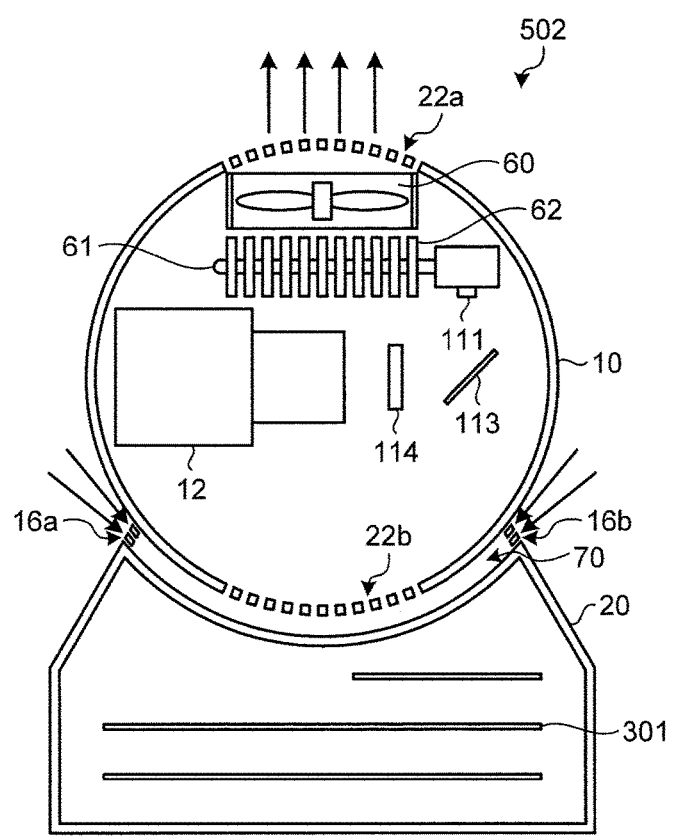
FIG. 26 is a diagram illustrating an air flow of heat dissipation for individual projection attitudes based on a change in the drum angle according to the first example of the heat dissipation structure applicable to the embodiment.

When the drum unit 10 is then rotated in the normal direction from the first attitude and in a state 502 in the second attitude illustrated in FIG. 26, the entire range of the air intake and exhaust hole 22b is housed in the duct 70 (a full overlap). Thus, in this state, the air quantity control unit 1310 controls the air quantity of the fan 60 at the maximum air quantity (step S15).

Figure 27:
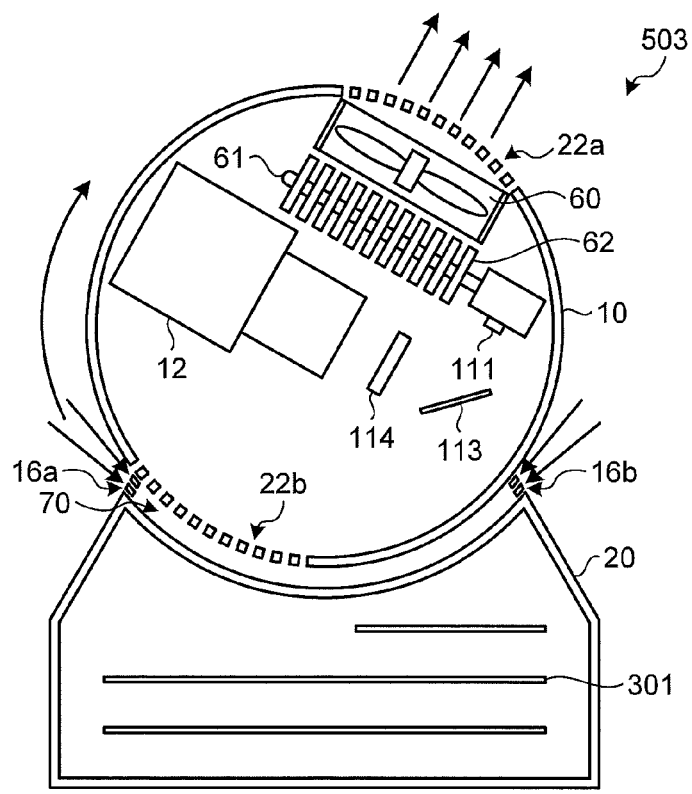
FIG. 27 is a diagram illustrating an air flow of heat dissipation for individual projection attitudes based on a change in the drum angle according to the first example of the heat dissipation structure applicable to the embodiment.

When the drum unit 10 is then rotated in the normal direction from the second attitude and in a state 503 in the third attitude illustrated in FIG. 27, the state in which the entire range of the air intake and exhaust hole 22b is housed in the duct 70 is changed to the state in which the end portion of the air intake and exhaust hole 22b goes out of the range of the duct 70. When the drum unit 10 is then further rotated in the normal direction from the third attitude and in the state in the attitude illustrated in FIG. 28, the area of the air intake and exhaust hole 22b overlapping with the duct 70 is gradually reduced. Thus, the air quantity control unit 1310 controls the air quantity of the fan 60 to gradually reduce from the maximum air quantity (step S19).

Figure 28:
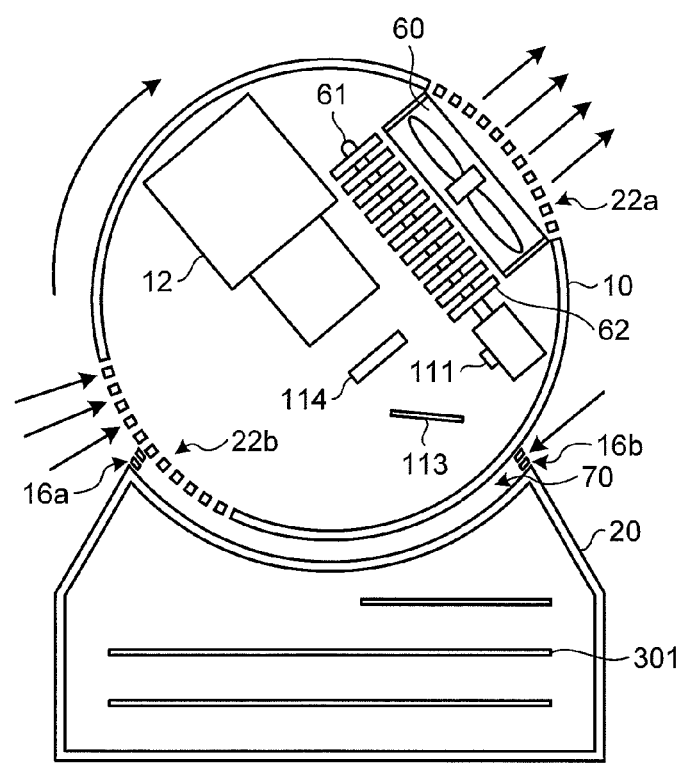
FIG. 28 is a diagram illustrating an air flow of heat dissipation for individual projection attitudes based on a change in the drum angle according to the first example of the heat dissipation structure applicable to the embodiment.
Figure 29:
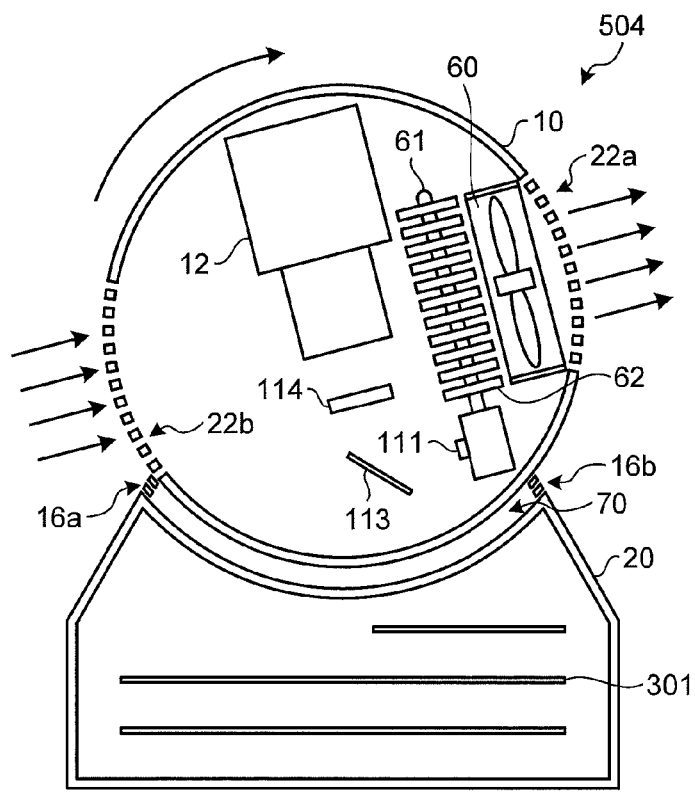
FIG. 29 is a diagram illustrating an air flow of heat dissipation for individual projection attitudes based on a change in the drum angle according to the first example of the heat dissipation structure applicable to the embodiment.
Figure 30:
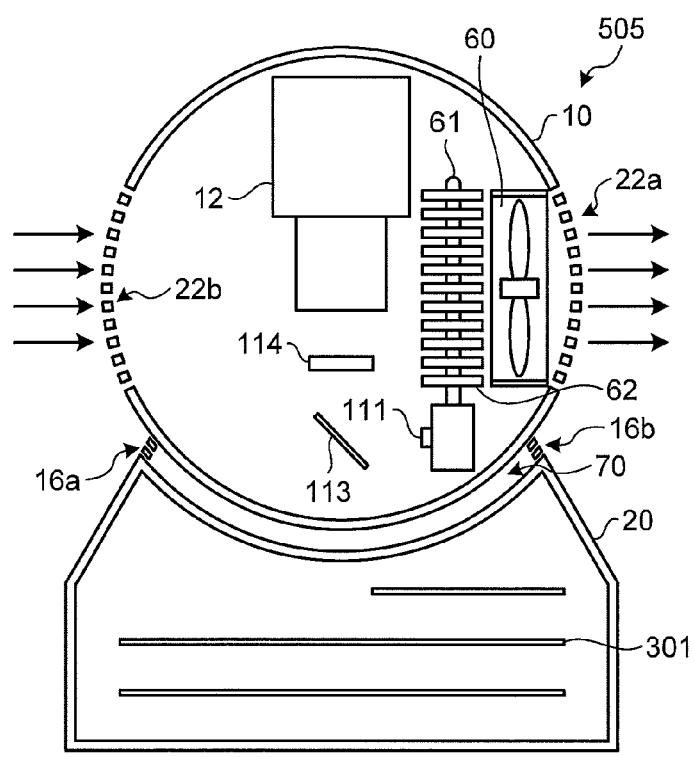
FIG. 30 is a diagram illustrating an air flow of heat dissipation for individual projection attitudes based on a change in the drum angle according to the first example of the heat dissipation structure applicable to the embodiment.

When the drum unit 10 is then further rotated in the normal direction from the attitude illustrated in FIG. 28 and in a state 504 in the fourth attitude illustrated in FIG. 29 and in a state 505 in the fifth attitude illustrated in FIG. 30, the entire range of the air intake and exhaust hole 22b goes out of the range of the duct 70, and the air intake and exhaust hole 22b does not overlap with the duct 70. The air quantity control unit 1310 controls the air quantity of the fan 60 at the minimum (step S13).

Figure 31:
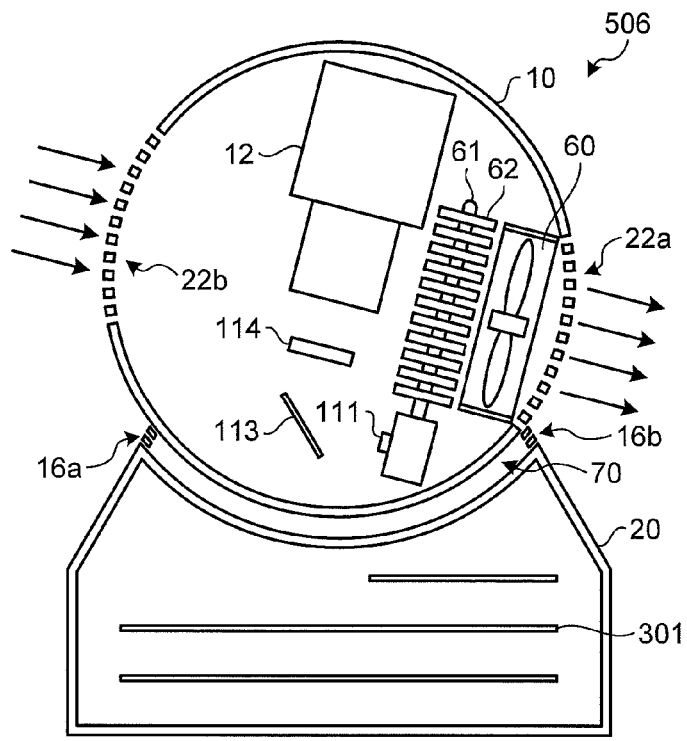
FIG. 31 is a diagram illustrating an air flow of heat dissipation for individual projection attitudes based on a change in the drum angle according to the first example of the heat dissipation structure applicable to the embodiment.

When the drum unit 10 is then further rotated in the normal direction and in a state 506 in the sixth attitude illustrated in FIG. 31, the air intake and exhaust hole 22a starts to overlap with the duct 70, and the drum unit 10 is further rotated in the normal direction, so that the area of the air intake and exhaust hole 22a overlapping with the duct 70 is gradually increased. Thus, the air quantity control unit 1310 controls the air quantity of the fan 60 to gradually increase from the minimum air quantity (step S17).

Figure 32:
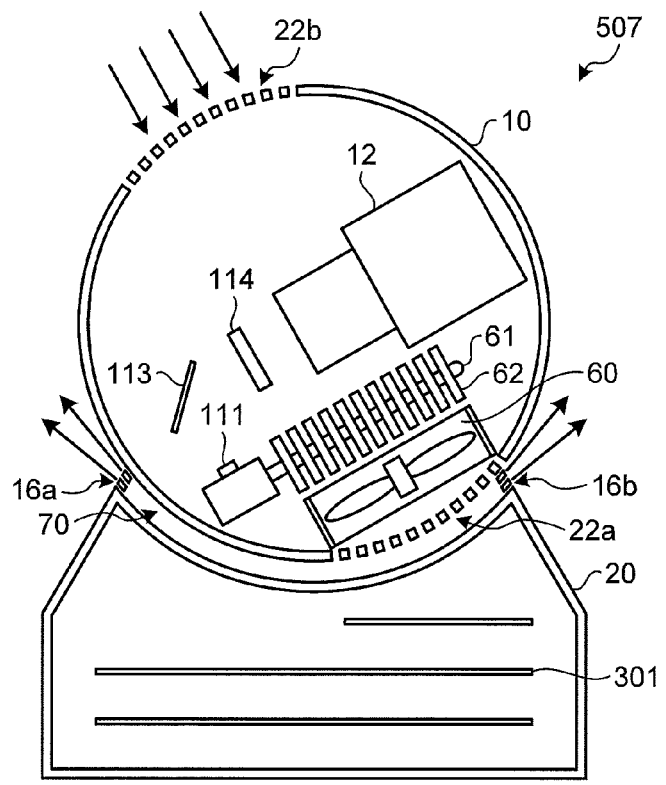
FIG. 32 is a diagram illustrating an air flow of heat dissipation for individual projection attitudes based on a change in the drum angle according to the first example of the heat dissipation structure applicable to the embodiment.
Figure 33:
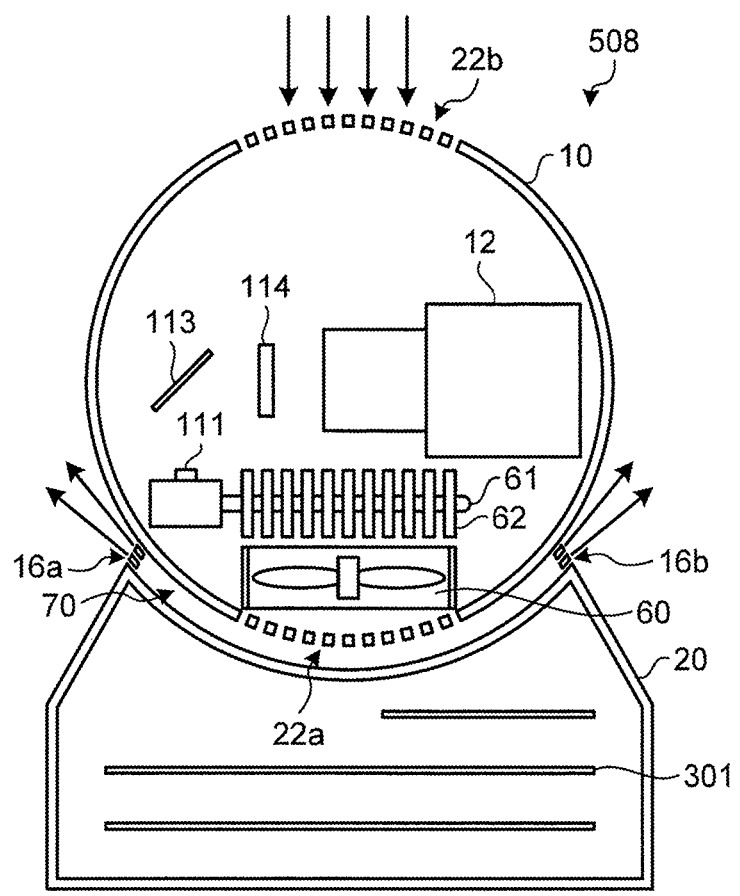
FIG. 33 is a diagram illustrating an air flow of heat dissipation for individual projection attitudes based on a change in the drum angle according to the first example of the heat dissipation structure applicable to the embodiment.

When the drum unit 10 is then rotated in the normal direction from the sixth attitude and in a state 507 in the seventh attitude illustrated in FIG. 32 and in a state 508 in the eighth attitude illustrated in FIG. 33, the entire range of the air intake and exhaust hole 22a is housed in the duct 70 (a full overlap). Thus, in this state, the air quantity control unit 1310 controls the air quantity of the fan 60 at the maximum air quantity (step S15).

As described above, in the first example of the heat dissipation structure, the attitude of the drum unit 10 is determined from the drum angle of the projector lens 12, and the air quantity of the fan 60 is controlled to change according to the area of the air intake and exhaust hole 22a or 22b overlapping with the duct 70 in the attitude, so that electric power consumption can be reduced as compared with the case where the fan 60 is driven at a constant air quantity all the time. Moreover, in the embodiment, the fan 60 is not driven all the time, so that noise caused by the fan 60 can be made at the minimum.

Figure 41:
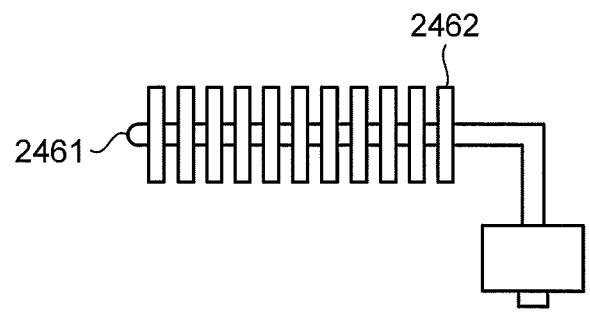
FIG. 41 is a diagram illustrating an example of a conventional heat sink.

Furthermore, in the first example of the heat dissipation structure, the heat pipe 61 is in a nearly straight shape and disposed nearly in parallel with the optical axis of the projector lens 12 between the optical engine and the fan 60, and the light source 111 is connected on the back face side in the inside of the projector apparatus 1000, so that the light source 111 is disposed near the air intake and exhaust hole 22a. Thus, as different from the conventional technology using a heat pipe 2461 in an L-shape and a fin 2462 as illustrated in FIG. 41, in the embodiment, the fin 62 is positioned on the upper side with respect to the light source 111 in the drum angle from the reference position of the projector lens 12 ranging from an angle of 90° to an angle of 270° as illustrated in FIGS. 24 to 33. Thus, in the first example of the heat dissipation structure, the air from the fan 60 is flowed from the air intake and exhaust hole 22b to the air intake and exhaust hole 22a near the light source 111, and it can be avoided that a hot blast caused by the light source 111 blows against the optical engine such as the projector lens 12.

It is noted that in the first example of the heat dissipation structure, the air quantity control unit 1310 controls the air quantity of the fan 60 in the air quantity below the maximum air quantity in the case where the air intake and exhaust hole 22a or 22b does not overlap with the duct 70 or in the case where a part of the range of the air intake and exhaust hole 22a or 22b overlaps with the duct 70. However, the control is not limited thereto. For example, even in the projection attitude in which the fan 60 is rotated in the air quantity below the maximum air quantity as in the case where the air intake and exhaust hole 22a or 22b does not overlap with the duct 70 or in the case where the air intake and exhaust hole 22a or 22b overlaps with the duct 70 in a part of the range, such a configuration may be fine in which the air quantity control unit 1310 changes the air quantity of the fan 60 at the maximum air quantity according to a projection period as in the case where the projection period in the projection attitude elapses for a certain period or more.

Moreover, in the first example of the heat dissipation structure, the air quantity control unit 1310 controls the air quantity of the fan 60 at the maximum air quantity in the case where the entire range of the air intake and exhaust hole 22a or 22b is housed in the range of the duct 70. However, the control is not limited thereto. For example, such a configuration may be fine in which the air quantity control unit 1310 changes the air quantity of the fan 60 below the maximum air quantity according to the image data of the content to be projected or audio data of the content being projected. For example, even in the case where the entire range of the air intake and exhaust hole 22a or 22b is housed in the range of the duct 70, the air quantity control unit 1310 can be configured to reduce the rotation speed of the fan 60 in such a manner that the air quantity control unit 1310 recognizes that the content being projected is images and sounds watched in a quiet environment and reduces the air quantity of the fan 60 from the maximum air quantity. In this case, it is possible to implement air quantity control according to the content.

Furthermore, in the first example of the heat dissipation structure, the rotation speed of the fan 60 is set to the lowest speed and the air quantity of the fan 60 is set at the minimum in the case where the air intake and exhaust hole 22a or 22b does not overlap with the duct 70. However, such a configuration may be fine in which the fan 60 is rotated at the rotation speed of at a certain speed or less and the air quantity is set at a certain air quantity or less, not the lowest speed and the lowest air quantity.

For example, in the first example of the heat dissipation structure, in the case of the fifth attitude in which the drum angle from the reference position of the projector lens 12 is at an angle of 180° and the projector lens 12 is directed to the ceiling (see FIG. 30), both of the air intake and exhaust holes 22a and 22b do not overlap with the range of the duct 70, so that the rotation speed of the fan 60 is set to the lowest speed and the air quantity of the fan 60 is set to the minimum. However, the air quantity control unit 1310 can be configured in which the fan 60 is rotated at a predetermined rotation speed at a certain speed or less and the air quantity is set to a predetermined air quantity at a certain air quantity or less.

In this case, such a configuration may be fine in which the projector apparatus 1000 is further provided with a sound collecting unit such as a microphone, a sound level measurement unit that measures the sound level of the collected sound, and an illuminance sensor that detects the ambient illuminance, and the air quantity control unit 1310 is configured to further control the air quantity of the fan 60 according to the sound level and the illuminance in the surroundings.

For an example, the air quantity control unit 1310 can be configured in such a manner that in the case where the sound level in the surroundings measured during projection in which the drum unit 10 is in the fifth attitude is a certain sound level or less, or the brightness in the surroundings is a certain illuminance or less, the fan 60 is rotated at the rotation speed at the predetermined rotation speed or less, and the air quantity is set to the air quantity at the predetermined air quantity or less. In this case, images can be viewed in priority of quiet sounds in the case where the projector apparatus 1000 under projection is placed in a quiet environment.

Moreover, in the first example of the heat dissipation structure, in the case where the entire range of the air intake and exhaust hole 22a or 22b is housed in the duct 70, the rotation speed of the fan 60 is set to the maximum speed and the air quantity of the fan 60 is set to the maximum. However, such a configuration may be fine in which the fan 60 is rotated at the rotation speed at a certain speed or more and the air quantity is set to a certain air quantity or more, not the maximum speed and the maximum air quantity.

For example, in the first example of the heat dissipation structure, in the case where the drum angle from the reference position of the projector lens 12 is at an angle of 90° in the second attitude in which the projector lens 12 is directed to the front (see FIG. 26), the entire range of the air intake and exhaust hole 22a or 22b is housed in the range of the duct 70 and fully overlaps with the duct 70, so that the rotation speed of the fan 60 is set to the maximum speed and the air quantity of the fan 60 is set to the maximum. However, the air quantity control unit 1310 can be configured in which the fan 60 is rotated at a predetermined rotation speed at a certain speed or more and the air quantity is set to a predetermined air quantity at a certain air quantity or more.

Also in this case, such a configuration may be fine in which the projector apparatus 1000 is further provided with a sound collecting unit such as a microphone, a sound level measurement unit that measures the sound level of the collected sound, and an illuminance sensor that detects the ambient illuminance, and the air quantity control unit 1310 controls the air quantity of the fan 60 according to the sound level or the illuminance in the surroundings.

For an example, in the case where the drum unit 10 is in the second attitude and the sound level in the surroundings measured during projection is at a certain sound level or more or the brightness in the surroundings is a certain illuminance or more, the air quantity control unit 1310 can be configured in such a manner that the fan 60 is rotated at the rotation speed at the predetermined rotation speed or more and the air quantity is set to the air quantity at the predetermined air quantity or more. In this case, it is assumed that the surrounding environment of the projector apparatus 1000 is an environment in which audiences have a discussion while watching the content projected onto the front in the meeting, so that it is unnecessary to provide a quiet state on one hand, and it is possible to promote cooling the inside of the drum unit 10 on the other hand.

A Second Example of the Heat Dissipation Structure Applicable to the Embodiment

In the heat dissipation control process of the projector apparatus 1000 described above, the rotation speed of the fan 60 is adjusted to control the air quantity. However, the ventilation direction of the fan 60 is not controlled more specifically. In a second example of the heat dissipation structure applicable to the embodiment, in addition to air quantity control according to the first example of the heat dissipation structure described above, the ventilation direction of a fan 60 is controlled according to the drum angle from the reference position of a projector lens 12.

The appearance configuration of a projector apparatus 1500 according to the second example of the heat dissipation structure applicable to the embodiment, the structures of a rotating mechanism unit 115 and an angle derivation unit 116, and the internal structure of the projector apparatus 1500 are the same as the first example of the heat dissipation structure described with reference to FIGS. 1A, 1B, 2A, 2B, and 19.

Figure 34:
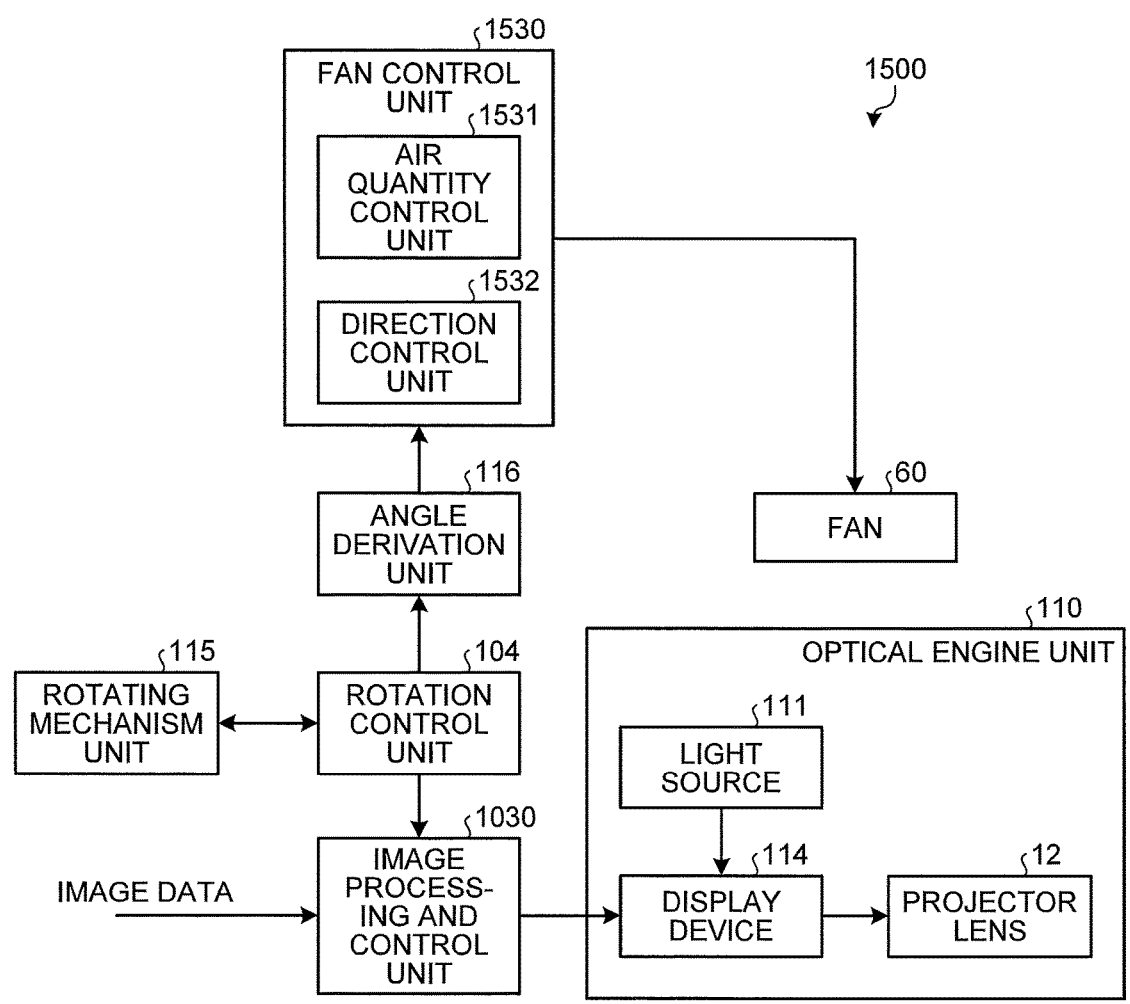
FIG. 34 is a block diagram illustrating the functional configuration of a projector apparatus according to a second example of a heat dissipation structure applicable to the embodiment.

FIG. 34 is a block diagram illustrating the functional configuration of the projector apparatus 1500 according to the second example of the heat dissipation structure. As illustrated in FIG. 34, the projector apparatus 1500 according to the second example of the heat dissipation structure mainly includes an optical engine unit 110, a fan 60, a rotating mechanism unit 115, an angle derivation unit 116, an image processing and control unit 1030, a fan control unit 1530, and a rotation control unit 104. Here, the configurations other than the fan control unit 1530 are the same as the first example of the heat dissipation structure described above.

As illustrated in FIG. 34, the fan control unit 1530 according to the embodiment includes an air quantity control unit 1531 and a direction control unit 1532.

Similarly to the first example of the heat dissipation structure described above, the air quantity control unit 1531 controls the air quantity of the ventilation of the fan 60 according to the positional relationship between air intake and exhaust holes 22a and 22b and a duct 70. The detail of air quantity control by the air quantity control unit 1531 is the same as the first example of the heat dissipation structure described above.

The direction control unit 1532 switches to the direction in which air is exhausted from the air intake and exhaust holes 22a and 22b by the fan 60 to the direction to avoid audiences. More specifically, in the configuration in which a hot blast is exhausted from the air intake and exhaust hole 22a, the direction control unit 1532 switches the ventilation direction by the fan 60 from the second face side of the projector apparatus 1500 to the direction on the first face side, in the case where the drum unit 10 is at the drum angle corresponding to the attitude in which a hot blast is exhausted by the fan 60 toward the second face side on which the user exists.

Here, in the second example of the heat dissipation structure, the range of the drum angle corresponding to the attitude of the drum unit 10 in which a hot blast is exhausted by the fan 60 to the second face side is the range greater than an angle of 90° from the reference position. It is noted that for switching the ventilation direction by the fan 60, it may be fine that the direction control unit 1532 switches the rotation direction of the fan 60 to the reverse direction.

Figure 35:
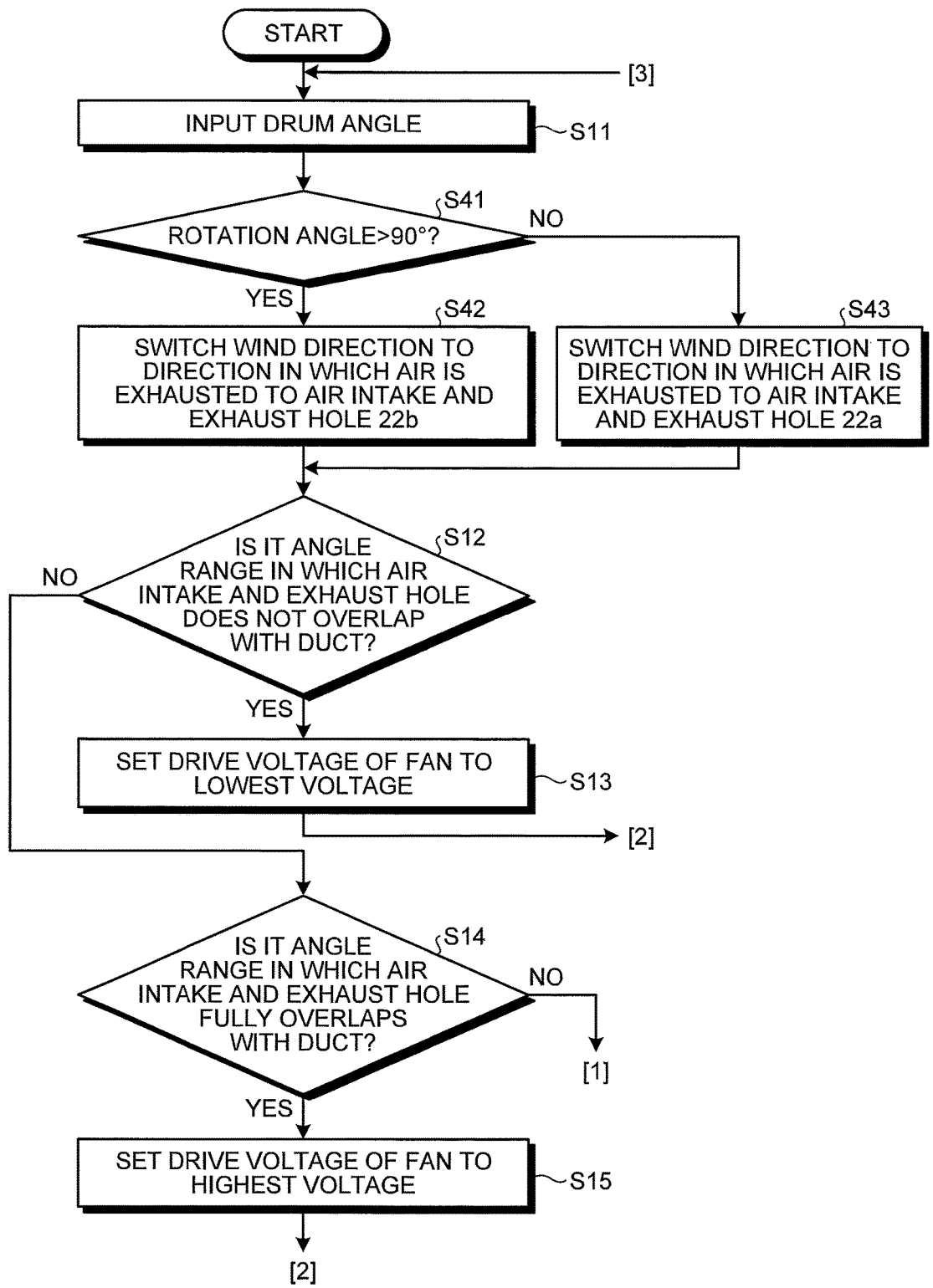
FIG. 35 is a flowchart illustrating the procedures of a fan control process according to the second example of the heat dissipation structure applicable to the embodiment.
Figure 36:
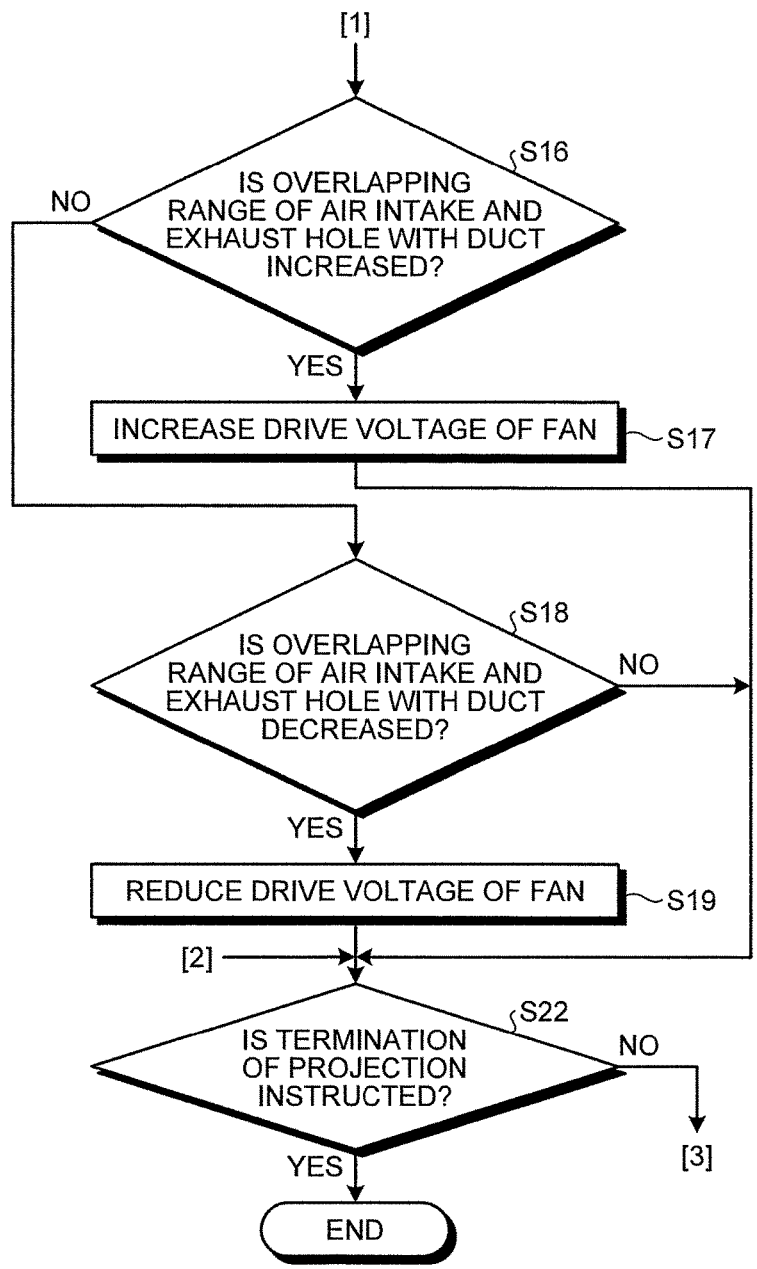
FIG. 36 is a flowchart illustrating the procedures of the fan control process according to the second example of the heat dissipation structure applicable to the embodiment.

Next, the fan control process according to the second example of the heat dissipation structure thus configured will be described. FIGS. 35 and 36 are flowcharts illustrating the procedures of the fan control process according to the second embodiment.

Similarly to the first example of the heat dissipation structure described above, first, the angle derivation unit 116 derives the amount of a change in the angle of the projector lens 12 from the initial attitude caused by the rotation of the drum unit 10 as the drum angle from the reference position, and inputs the detected drum angle to the air quantity control unit 1531 and the direction control unit 1532 of the fan control unit 1530 (step S11).

The direction control unit 1532 then determines whether the inputted drum angle is greater than an angle of 90° (step S41). In the case where the drum angle is greater than an angle of 90° (step S41: Yes), the direction control unit 1532 sets the air exhaust direction by the fan 60 to the direction in which air is exhausted from the air intake and exhaust hole 22a (the second face side) to the air intake and exhaust hole 22b (the first face side) so as not to exhaust a hot blast by the fan 60 to the second face side on which the user exists (step S42).

On the other hand, in the case where the drum angle is an angle of 90° or less (step S41: No), the air exhaust direction by the fan 60 is set to the direction in which air is exhausted from the air intake and exhaust hole 22b (the second face side) to the air intake and exhaust hole 22a (the first face side) so as not to exhaust a hot blast by the fan 60 to the second face side on which the user exists (step S43).

From steps S12 to S22, similarly to the first example of the heat dissipation structure described above, air quantity control is performed by the air quantity control unit 1531.

In the case of the fifth attitude in which the drum angle from the reference position of the projector lens 12 is an angle of 180°, in the first embodiment, since a hot blast is exhausted from the air intake and exhaust hole 22a (see FIG. 30), a hot blast blows against the user located on the second face side.

However, in the second example of the heat dissipation structure, control is performed in which the direction control unit 1532 rotates in the rotation direction of the fan 60 inversely to the present rotation at the point in time when the drum angle exceeds an angle of 90° to switch the wind direction and a hot blast is exhausted from the air intake and exhaust hole 22b.

Figure 37:
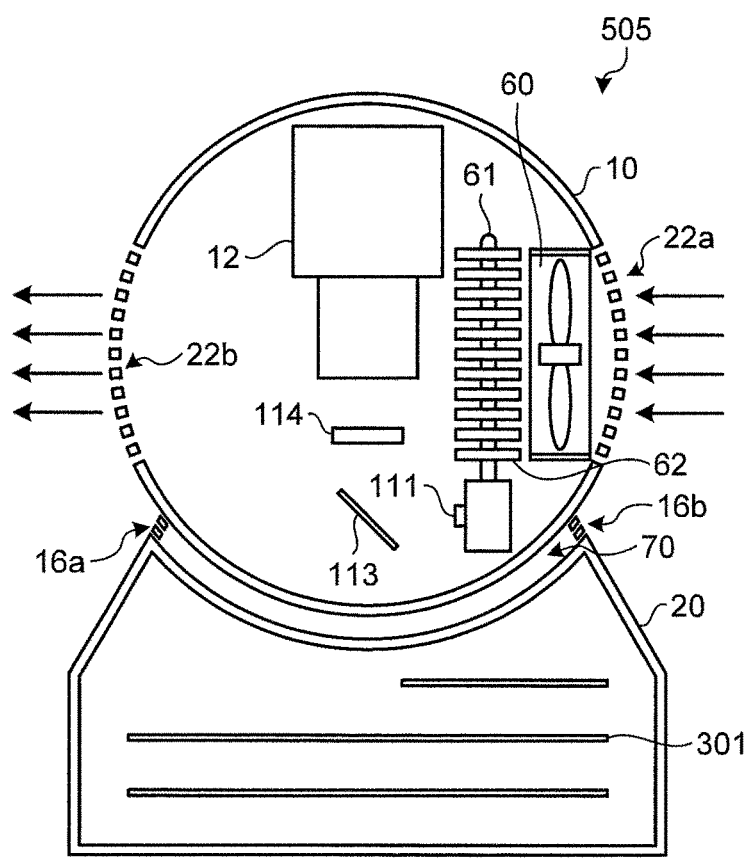
FIG. 37 is a diagram illustrating the state of the inside of a drum unit rotated at an angle of 180° from the reference position of a projector lens according to the second example of the heat dissipation structure applicable to the embodiment.

FIG. 37 is a diagram illustrating the state of ventilation by the fan 60 in the case of the fifth attitude according to the second example of the heat dissipation structure. As illustrated in FIG. 37, the direction control unit 1532 switches the rotation direction of the fan 60, and the air flowed from the air intake and exhaust hole 22b to the direction of the air intake and exhaust hole 22a up to now is switched to the direction from the air intake and exhaust hole 22a to the air intake and exhaust hole 22b. In other words, the air for cooling is sucked by the fan 60 from the air intake and exhaust hole 22a on the second face side of the projector apparatus 1500, and exhausted from the air intake and exhaust hole 22b on the first face side.

In this manner, in the second example of the heat dissipation structure, the ventilation direction of the fan 60 is switched according to the drum angle from the reference position of the projector lens 12, so that it is possible to avoid the event that exhaust air caused by the fan 60 blows against audiences in addition to the effect of the first example of the heat dissipation structure described above.

A Third Example of a Heat Dissipation Structure Applicable to the Embodiment

In the second example of the heat dissipation structure described above, control is performed to switch the wind direction of a hot blast exhausted by the fan 60 between the direction from the air intake and exhaust hole 22a to the air intake and exhaust hole 22b and the inverse direction according to the drum angle of the projector lens 12. However, in a third example of a heat dissipation structure applicable to the embodiment, the wind direction of a hot blast from a fan 60 is changed by tilting the fan 60 itself according to the positional relationship between an air intake and exhaust hole 22a or 22b and a duct 70.

The appearance configuration of a projector apparatus 1000 according to the third example of the heat dissipation structure applicable to the embodiment and the structures of a rotating mechanism unit 115 and an angle derivation unit 116 are the same as the first example of the heat dissipation structure described with reference to FIGS. 1A, 1B, 2A, 2B, and 19. Moreover, the functional configuration of the projector apparatus 1000 is the same as the first example of the heat dissipation structure described with reference to FIG. 22.

In the third example of the heat dissipation structure, the configuration of the fan 60 is different from that of the first example of the heat dissipation structure described above in the internal structure of a drum unit 10. In the embodiment, the fan 60 itself is tilted by providing a weight on a fan case that houses the fan 60. In other words, the fan 60 is configured in which in the case where the drum unit 10 is rotated to reach the attitude in which the fan 60 is positioned on the duct 70 side and the air exhaust direction from the fan 60 is directed to the duct 70, the center of gravity of the fan 60 is moved upward to tilt the fan 60 by the self weight of the weight, and exhaust air from the fan 60 is directed to the air intake and exhaust hole 16a or 16b of the duct 70.

Figure 38:
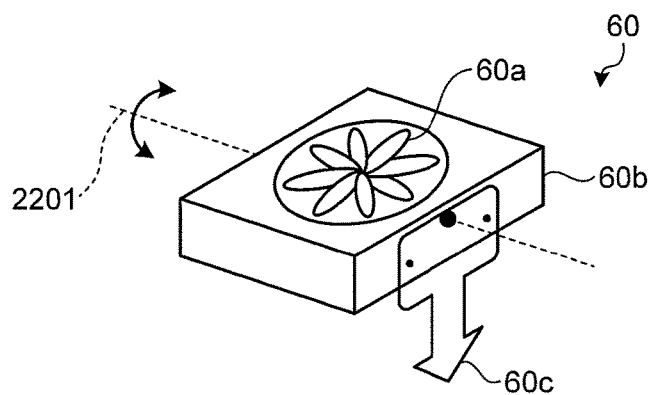
FIG. 38 is a perspective view illustrating the configuration of a fan according to a third example of a heat dissipation structure applicable to the embodiment.

FIG. 38 is a perspective view illustrating the configuration of the fan 60 according to the third example of the heat dissipation structure. In the third example of the heat dissipation structure, a weight 60c is provided on the side surface of a fan case 60b that houses a blade portion 60a of the fan 60, and the center of gravity of the fan 60 is moved below the fan 60 in FIG. 38. Moreover, the fan 60 is disposed in the drum unit 10 rotatably about a rotation axis 2201 perpendicular to the rotating shaft of the blade portion 60a.

In the case where the drum unit 10 is then rotated, the fan 60 is in the state in which the fan 60 is upside down from the state in FIG. 38, and the fan 60 is moved near the duct 70 in the lower part in the drum unit 10, the position of the center of gravity is located above the fan 60, so that the fan 60 is rotated about the rotation axis 2201 by the self weight of the weight 60c. As a result, the orientation of the fan 60 is tilted, and the blade portion 60a is directed to the air intake and exhaust hole 22a or 22b of the duct 70. Thus, a hot blast flowing from the blade portion 60a obliquely blows against the duct 70, and air is exhausted from the air intake and exhaust hole 16a or 16b while reducing the resistance caused by an exhausted hot blast blowing against the duct 70.

Figure 39:
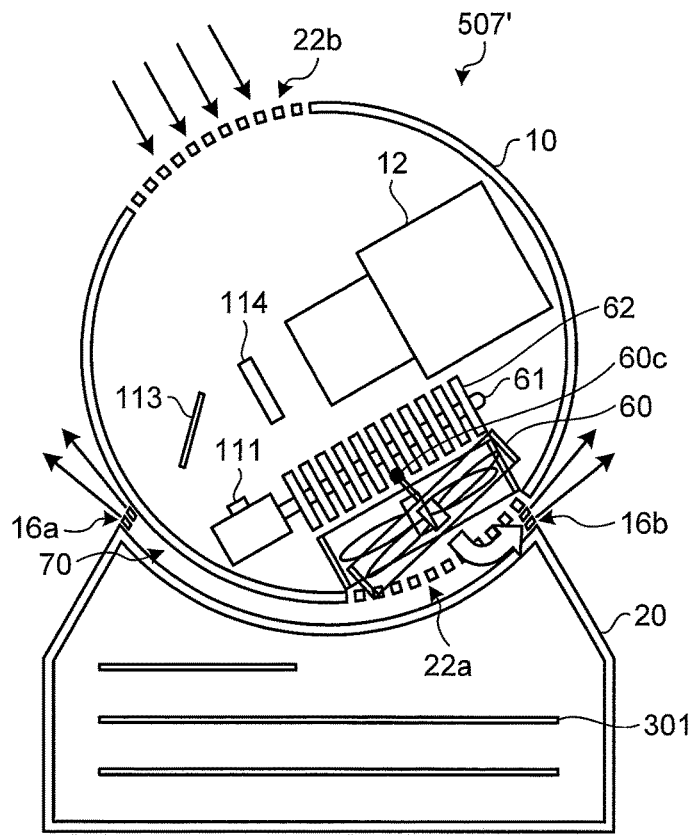
FIG. 39 a diagram illustrating the state of a drum unit in a seventh attitude according to the third example of the heat dissipation structure applicable to the embodiment.
Figure 40:
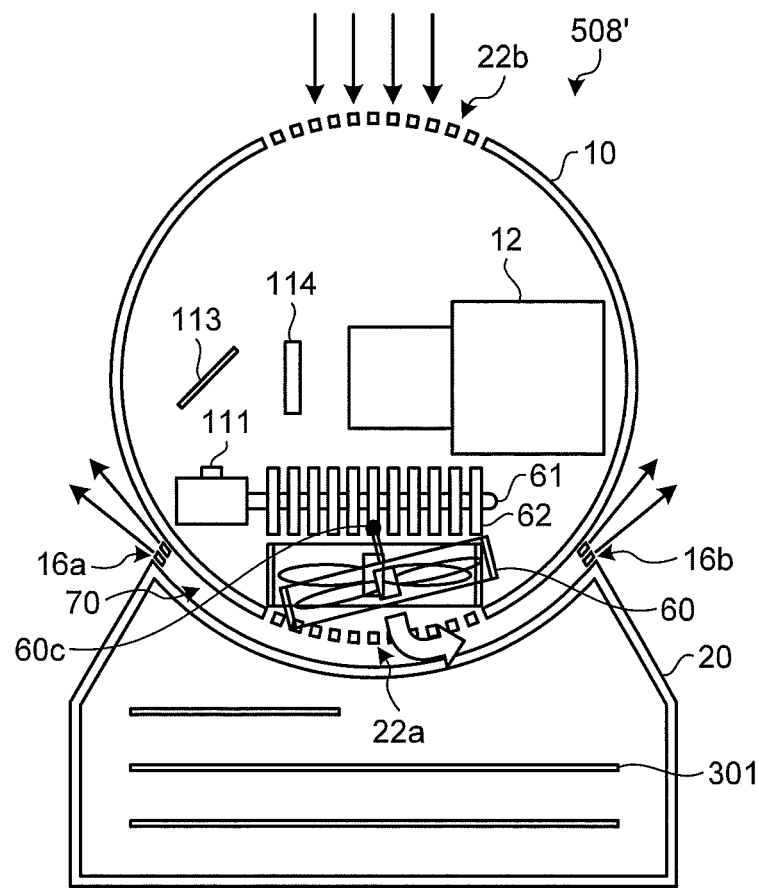
FIG. 40 is a diagram illustrating the state of the drum unit in an eighth attitude according to the third example of the heat dissipation structure applicable to the embodiment.

FIG. 39 is a diagram illustrating a state 507' of the drum unit 10 in the seventh attitude according to the third example of the heat dissipation structure. FIG. 40 is a diagram illustrating a state 508' of the drum unit 10 in the eighth attitude according to the third example of the heat dissipation structure.

As illustrated in FIGS. 39 and 40, in the case where the drum unit 10 is rotated and in the seventh attitude and the air intake and exhaust hole 22a overlaps with the range of the duct 70, the center of gravity of the fan 60 is positioned diagonally to the upper left in FIG. 39 by the self weight of the weight 60c, so that the fan 60 is rotated on the left side about the axis perpendicular to the rotating shaft, and the orientation of the blade portion 60a is directed to the air intake and exhaust hole 16b side of the exhaust duct 70.

Thus, a hot blast to be exhausted from the fan 60 obliquely blows against the duct 70 to reduce the resistance, and air can be exhausted from the air intake and exhaust hole 16b.

It is noted that in the third example of the heat dissipation structure, the fan 60 is provided with the weight 60c to tilt the fan 60. However, a method for tilting the fan 60 is not limited thereto.

For example, the fan control unit 1300 can be configured in which in the case where an actuator that rotates the fan 60 about the rotation axis 2201 perpendicular to the rotating shaft of the blade portion 60a is provided in the drum unit 10 and the drum angle derived at the angle derivation unit 116 takes an angle at which the air intake and exhaust hole 22a overlaps with the range of the duct 70, the actuator is driven to rotate the fan 60 on the left side about the axis perpendicular to the rotating shaft as illustrated in FIGS. 39 and 40.

In this case, the fan control unit 1300 can be configured to control the rotation angle of the fan 60 to be reduced as the area of the air intake and exhaust hole 22a overlapping with the duct 70 is increased.

As described above, in the third example of the heat dissipation structure, in the case where the air intake and exhaust hole 22a or 22b overlaps with the range of the duct 70 and the air exhaust direction from the fan 60 is directed to the duct 70, the fan 60 is rotated about the axis perpendicular to the rotating shaft and a hot blast to be exhausted from the fan 60 obliquely blows against the duct 70, so that it is possible that the resistance when air is exhausted is reduced, the degradation of cooling efficiency is suppressed, and noise is reduced.

In the first to the third examples of the heat dissipation structure described above, the image processing and control unit 1030, the fan control units 1300 and 1530, and the rotation control unit 104 are configured in which the units are mounted on the substrate 301 of the base 20 as the circuit units of hardware, and the units can be implemented by software.

In this case, a control program executed on the projector apparatus 1000 or 1500 according to the first to the third examples of the heat dissipation structure is offered as the control program is installed on a ROM, for example.

Such a configuration may be fine in which the control program executed on the projector apparatus 1000 or 1500 according to the first to the third examples of the heat dissipation structure is offered as the control program is recorded on a computer readable recording medium such as a CD-ROM, flexible disk (FD), CD-R, and DVD (Digital Versatile Disk) in a file in an installable format or feasible format.

Moreover, such a configuration may be fine in which the control program executed on the projector apparatus 1000 or 1500 according to the first to the third examples of the heat dissipation structure is offered as the control program is stored on a computer connected to a network such as the Internet and downloaded via the network. Furthermore, such a configuration may be fine in which the control program executed on the projector apparatus 1000 or 1500 according to the first to the third examples of the heat dissipation structure is offered or distributed via a network such as the Internet.

The control program executed on the projector apparatus 1000 or 1500 according to the first to the third examples of the heat dissipation structure is in a module configuration including the units described above (the image processing and control unit 1030, the fan control units 1300 and 1530, and the rotation control unit 104). For practical hardware, the CPU (the processor) reads the control program out of the ROM and executes the control program, and the units are loaded on the main storage device to generate the image processing and control unit 1030, the fan control units 1300 and 1530, and the rotation control unit 104 on a main storage device.

Other Embodiments

A projector (a projector apparatus) according to another embodiment includes: a rotational case including an air intake and exhaust hole on a circumferential surface; and a base configured to rotatably support the rotational case. The rotational case includes: a light source; an optical mechanism configured to externally project an image of a projection object using light emitted from the light source; a heat dissipation member connected to the light source; and a fan unit configured to cool the heat dissipation member. In the rotational case, the rotational case houses the light source, the optical mechanism, and the fan unit; the air intake and exhaust hole includes a first air intake and exhaust hole and a second air intake and exhaust hole provided on the circumferential surface in symmetry at an angle different from a projecting direction of light; the fan unit is provided near the circumferential surface as corresponding to the first air intake and exhaust hole; the optical mechanism is disposed at a center part in the rotational case; and the heat dissipation member is disposed between the fan unit and the optical mechanism or between the fan unit and the first air intake and exhaust hole. The base includes: a rotation mechanism configured to move the projecting direction of light by rotating the rotational case; an angle derivation unit configured to detect a rotation angle from a reference position of the rotational case; and at least one of an air quantity control unit configured to control an air quantity of ventilation from the fan unit based on the detected rotation angle and a direction control unit configured to switch a ventilation direction of air by the fan unit. In the base, the base supports the rotational case as a predetermined gap is provided; air is sucked into the rotational case from the gap through the air intake and exhaust hole using the fan unit; and air is discharged from the rotational case to the gap through the air intake and exhaust hole using the fan unit.

Moreover, in the projector, the air quantity control unit performs at least one control of: controlling the air quantity at an air quantity greater than a predetermined quantity when the rotational case is at a rotation angle at which air sucked from the second air intake and exhaust hole by the fan unit is passed through the gap and sucked into the rotational case; controlling the air quantity at an air quantity lower than a predetermined quantity when the rotational case is at a rotation angle at which air sucked from the second air intake and exhaust hole by the fan unit is not passed through the gap and sucked into the rotational case; controlling the air quantity at an air quantity greater than a predetermined quantity when the rotational case is at a rotation angle at which air discharged from the first air intake and exhaust hole by the fan unit is passed through the gap and discharged to an outside; and controlling the air quantity at an air quantity lower than a predetermined quantity when the rotational case is at a rotation angle at which air discharged from the first air intake and exhaust hole by the fan unit is not passed through the gap and discharged to an outside.

Furthermore, the projector includes a sound collecting unit such as a microphone and a sound level measurement unit that measures the sound level of the collected sound, or an illuminance sensor that detects an ambient illuminance, in which the air quantity control unit is configured to control the air quantity of ventilation from the fan unit according to a sound level in the surroundings or an illuminance.

In addition, in the projector, the fan unit is rotatably disposed about a rotation axis perpendicular to a rotating shaft of a blade portion, and the direction control unit is configured to control a rotation angle of the fan unit based on a rotation angle derived at the angle derivation unit.

Moreover, a projector includes: a rotational case including an air intake and exhaust hole on a circumferential surface; and a base configured to rotatably support the rotational case. The rotational case includes: a light source; an optical mechanism configured to externally project an image of a projection object using light emitted from the light source; a heat dissipation member connected to the light source; and a fan unit configured to cool the light source, the optical mechanism, and the heat dissipation member. In the rotational case, the rotational case houses the light source, the optical mechanism, and the fan unit. The base includes a rotation mechanism configured to move the projecting direction of light by rotating the rotational case. A control method for cooling a projector includes the steps of: detecting a rotation angle from a reference position of a rotational case; and controlling an air quantity of ventilation from a fan unit based on the detected rotation angle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projector comprising:
   a projecting unit including a light source and a projector lens and configured to convert image data into light and project the light at a variable angle of view;
   a rotatable case that accommodates the projecting unit;
   a projecting direction changing unit including a motor and configured to drive the motor to rotate the rotatable case and move a projecting direction of the projecting unit from a first projecting direction to a second projecting direction; and
   a processor including,
      projection angle derivation circuitry configured to derive a projection angle between the first projecting direction and a projecting direction moved by the projecting direction changing unit;
      storage circuitry configured to store inputted image data that is inputted; and
      image cutting out circuitry configured to generate cut-out image data that a part of a region of an image of the inputted image data stored on the storage circuitry is cut out as the image data projected by the projecting unit based on at least the projection angle and a number of pixels corresponding to a unit angle in the variable angle of view and an angle variation of the variable angle of view, when the projecting unit projects the image of the inputted image data stored on the storage circuitry from the first projecting direction to the second projecting direction,
   wherein the image cutting out circuitry is configured to change a center position of the cut-out image data depending on the angle variation of the variable angle of view.

2. The projector according to claim 1, wherein the processor further comprises image processing circuitry configured to apply a scale-down process based on the projection angle for individual pixels of the cut-out image data when a distance from the projecting unit to a projection plane is increased as the projecting direction is changed from the first projecting direction to the second projecting direction.

3. The projector according to claim 1, wherein the processor further comprises image processing circuitry configured to apply a scale-up process based on the projection angle for individual pixels of the cut-out image data when a distance from the projecting unit to projection plane is reduced as the projecting direction is changed from the first projecting direction to the second projecting direction.

* * * * *